(12) United States Patent
Daily et al.

(10) Patent No.: US 9,365,676 B2
(45) Date of Patent: Jun. 14, 2016

(54) SYNTHETIC POLYMERS AND METHODS OF MAKING AND USING THE SAME

(71) Applicant: Battelle Memorial Institute, Richland, WA (US)

(72) Inventors: Michael D. Daily, Richland, WA (US); Jay W. Grate, Richland, WA (US); Kai-For Mo, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 14/556,021

(22) Filed: Nov. 28, 2014

(65) Prior Publication Data

US 2016/0068635 A1 Mar. 10, 2016

Related U.S. Application Data

(60) Provisional application No. 62/045,499, filed on Sep. 3, 2014.

(51) Int. Cl.
*C08G 18/08* (2006.01)
*C08G 73/06* (2006.01)

(52) U.S. Cl.
CPC .......... *C08G 73/0644* (2013.01); *C08G 73/065* (2013.01)

(58) Field of Classification Search
CPC ........................ H01L 51/0067; H01L 51/0072
USPC .................................................. 528/53, 186
See application file for complete search history.

(56) References Cited

U.S. PATENT DOCUMENTS

| | | | |
|---|---|---|---|
| 5,200,445 A | 4/1993 | Cipolli et al. | |
| 5,389,707 A * | 2/1995 | Cipolli ................. | C07D 251/70 524/100 |
| 6,596,461 B1 | 7/2003 | Lazzari et al. | |

FOREIGN PATENT DOCUMENTS

EP 3777324 * 7/1990 ........... C07D 401/14

OTHER PUBLICATIONS

Yuki et al. (Polymer Journal, vol. 28, 6, 553-555, 1996).*
Beijer et al., "Self-Complementarity Achieved through Quadruple Hydrogen Bonding," *Angewandte Chemie International Edition* 37:75-78, Dec. 1998.
Blotny, "Recent applications of 2,4,6-trichloro-1,3,5-triazine and its derivatives in organic synthesis," *Tetrahedron* 62:9507-9522, Aug. 2006.
Chaleix et al., "Pseudo porphyrinyl amino acids based on 1,3,5-triazine scaffold: new tools for the synthesis of peptidic porphyrins," *Tetrahedron Letters* 52:2977-2979, Apr. 2011.
Dawson et al., "The Reactions of Cold-dyeing Procion Dyes with Cellulose," *Journal of the Society of Dyers and Colourists* 76:210-217, Apr. 1960.
Helbert et al., "Fluorescent cellulose microfibrils as substrate for the detection of cellulose activity," *Biomacromolecules* 4:481-487, Mar. 2003.
Liang et al., "Elegant Chemistry to Directly Anchor Intact Saccharides on Solid Surfaces Used for the Fabrication of Bioactivity-Conserved Saccharide Microarrays," *Bioconjugate Chemistry* 23(6):1300-1308, May 2012.
Lim et al., "Preparation of Microporous Polymers Based on 1,3,5-Triazine Units Showing High CO2 Adsorption Capacity," *Macromolecular Chemistry and Physics* 213:1385-1390, May 2012.
Liu et al., "Refolding foldamers: Triazene-Arylene Oligomers that Change Shape with Chemical Stimuli," *Journal of the American Chemical Society* 129:11232-11241, Aug. 2007.
Pan et al., "Synthesis and characterization of a new hyperbranched organic-inorganic solid polymer electrolyte with cyanuric chloride as a core element," *Electrochimical Acta* 56:8519-8529, Jul. 2011.
Patrushev et al., "The use of triazine polymer as a structurized sorbent for chromatography," *Physical Chemistry* 449:75-77, Oct. 2012.
Přichystalová et al., "Synthesis, characterization and antibacterial activity of new fluorescent chitosan derivatives," *International Journal of Biological Macromolecules* 65:234-240, Jan. 2014.
Rattee, "Reactive Dyes in the Coloration of Cellulosic Materials," *Journal of the Society of Dyers and Colourists* 85:23-31, Jan. 1969.
Reimschuessel et al., "Linear Polymers Containing the 1,3,5-Triazine Nucleus," *Journal of Polymer Science* 40:270-272, Oct. 1959.
Ren et al., "Functional conjugated microporous polymers: from 1,3,5-benzene to 1,3,5-triazine," *Polymer Chemistry* 3:928-934, Jan. 2012.
Saito et al., "Synthesis of polyguanamines from 2,N,N-dibutylamino-4,6-dichloro-1,3,5-triazine with aromatic diamines," *Reactive & Functional Polymers* 72:756-763, Mar. 2013.
Zhao et al., "Synthesis, structural investigation and computational modelling of water-binding aquafoldamers," *Organic & Biomolecular Chemistry* 10:1172-1180, Nov. 2011.
Archer et al., "Duplex Oligomers Defined via Covalent Casting of a One-Dimensional Hydrogen-Bonding Motif," *J. Am. Chem. Soc.* 124(18):5074-5083, 2002.
Bourguet et al., "Synthesis and conformational studies of pseudopeptides containing an unsymmetrical triazine scaffold," *Journal of Peptide Science* 14:596-609, Nov. 2007.
Hensley et al., "Triazinyl-Amino Acids, New Building Blocks for Pseudopeptides," *Synlett* 4:557-560, 2002.
Schmitt et al., "Helicity-Encoded Molecular Strands: Efficient Access by the Hydrozone Route and Structural Features," *Helvetica Chimica Acta* 86:1598-1624, 2003.
Simanek et al., "The 8 year thicket of triazine dendrimers: strategies, targets and applications," *Proceedings of the Royal Society A* 466:1445-1468, May 2009.
Menicagli et al., "2-Alkyl-4,6-dailkylamino-1,3,5-triazines via Grignard Alkylation of Cyanuric Chloride: An Aged Reaction Revisited," *Tetrahedron*, 56, 9705-9711, 2000.
International Search Report and Written Opinion issued in related PCT Application No. PCT/US2015/048127, dated Nov. 13, 2015.

* cited by examiner

*Primary Examiner* — Shane Fang
(74) *Attorney, Agent, or Firm* — Klarquist Sparkman, LLP

(57) ABSTRACT

Monomer embodiments that can be used to make polymers, such as homopolymers, heteropolymers, and that can be used in particular embodiments to make sequence-defined polymers are described. Also described are methods of making polymers using such monomer embodiments. Methods of using the polymers also are described.

24 Claims, 15 Drawing Sheets
(14 of 15 Drawing Sheet(s) Filed in Color)

SYNTHETIC POLYMERS AND METHODS OF MAKING AND USING THE SAME

CROSS-REFERENCE TO RELATED APPLICATION

This application claims priority to U.S. Provisional Application No. 62/045,499, filed on Sep. 3, 2014, which is herein incorporated by reference in its entirety.

ACKNOWLEDGMENT OF GOVERNMENT SUPPORT

This invention was made with Government support under Contract DE-AC05-76RLO1830 awarded by the U.S. Department of Energy. The Government has certain rights in the invention.

FIELD

The present disclosure concerns embodiments of sequence-defined polymers and methods of making and using such sequence-defined polymers.

BACKGROUND

Sequence-defined polymers are epitomized in nature by polypeptides and poly(nucleic acids). In nature, these sequence-defined polymers can create biomaterials, encode information, perform biocatalysis, participate in molecular recognition, and shuttle species across membranes. Artificial sequence-defined polymers prepared by chemical synthesis likewise have the potential to create tremendous structural diversity and functionality based on monomer sequence, if such synthetic polymers can be developed.

To date the vast majority of synthetic sequence-defined polymers are polypeptides, pseudopeptides, and/or peptoids made in laboratories using in vitro application of macromolecular machines, solution chemical synthesis, or solid phase synthesis. Conventional sequence-defined polymers typically include amino acid structures with non-natural side chains and peptide bonds to achieve the reactivity associated with naturally-occurring polypeptides. A need exists in the art, however, for polymers that overcome shortcomings associated with conventional sequence-defined polymers, which are discussed herein. Methods for readily synthesizing such polymers also are needed, such as methods implementing readily available starting materials.

A need exists in the art for polymers that overcome the structural, and hence functional, limitations associated with current synthetically-accessible sequence-defined polymers. There exists a need in the art for more diverse polymer structures that can be readily synthesized, where a diversity of side chain structures can be incorporated onto the polymer chain, where the length of the polymer is defined, and where the sequence of monomers can be defined in a predetermined fashion. There is a need for such polymers such that the backbone and side chain structures may provide for intramolecular and/or intermolecular interactions that determine macromolecular conformation and/or self-assembly into materials. Discussed herein are novel polymer structures different from peptides, peptoids, poly(nucleic acids), or other conventional sequence-defined polymers, methods for readily synthesizing such polymers, and methods that can be implemented from readily available starting materials.

SUMMARY

Disclosed herein are novel synthetic polymers with monomer units assembled in specific sequences and numbers, comprising diverse side chain functional groups and linker sections creating unique, defined structures. In some embodiments, the polymers satisfy a formula:

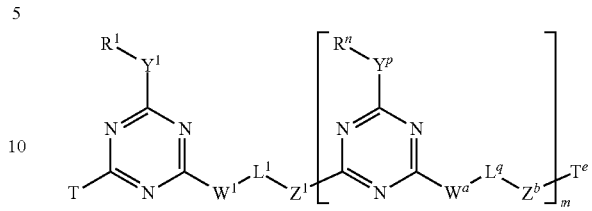

wherein each of T and $T^e$ is a terminal group selected from heteroaliphatic, aliphatic, aryl, heteroaryl, aliphatic-aryl, aliphatic-heteroaryl, heteroaliphatic-aryl, or heteroaliphatic-heteroaryl; $R^1$ and each $R^n$ independently is selected from heteroaliphatic, aliphatic, aryl, heteroaryl, aliphatic-aryl, aliphatic-heteroaryl, heteroaliphatic-aryl, or heteroaliphatic-heteroaryl; $Y^1$ and each $Y^p$ independently is selected from a bond, —C($R^4$)$_2$, oxygen, sulfur, or $NR^4$, wherein each $R^4$ independently is selected from hydrogen, aliphatic, heteroaliphatic, aryl, or heteroaryl and wherein $R^4$ of $NR^4$ and at least one of $R^1$ or $R^n$ are different; $W^1$ and each $W^a$ independently is selected from —C($R^4$)$_2$, oxygen, sulfur, or $NR^4$, wherein each $R^4$ independently is selected from hydrogen, aliphatic, heteroaliphatic, aryl, or heteroaryl; $Z^1$ and each $Z^b$ independently is selected from heteroaryl, oxygen, sulfur, or $NR^4$, wherein $R^4$ is selected from hydrogen, aliphatic, heteroaliphatic, heteroaryl, or aryl; $L^1$ and each $L^q$ independently is selected from aliphatic, heteroaliphatic, aryl, or heteroaryl; and m ranges from 2 to 1000. In some embodiments, two or more $R^n$ groups are different. In some embodiments, two or more $W^a$ groups, $L^q$ groups, or $Z^b$ groups are different. In some embodiments, T and $T^e$ independently are selected from an amine, an alkylene oxide, an alkylene amino, or an alkylene thio. In some other embodiments, T and $T^e$ independently can be or comprise a solid support. In some embodiments, $R^1$ and each of $R^n$ independently is selected from $C_{1-25}$alkyl, $C_{1-25}$heteroalkyl, or $C_{6-15}$aryl. In particular embodiments, $R^1$ and each of $R^n$ independently is selected from methyl, ethyl, propyl, butyl, pentyl, hexyl, septyl, octyl, nonyl, decyl, phenyl, propyne, —(CH$_2$)—C$_6$H$_4$—Cl, —(CH$_2$)$_2$NH$_2$, —(CH$_2$)$_2$NHBOC, —(CH$_2$)$_2$COOH, or —(CH$_2$)$_2$COO$^t$Bu. In other particular embodiments, each of $W^1$, $W^a$, $Z^1$, and $Z^b$ independently are selected from NH, S, or O. In some embodiments, each of $L^1$ and $L^q$ independently are selected from —(CH$_2$)$_2$—, —(CH$_2$)$_3$—, —C(Me)H—CH$_2$—, —CH$_2$—C(Me)H—, —C(Me)H—C(Me)H—, —C(Naphthyl)H—C(Naphthyl)H—, and —(CH$_2$)$_2$—O—(CH$_2$)$_2$—.

In some embodiments, the polymers have a formula

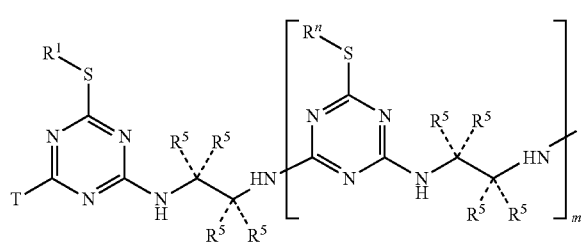

wherein each $R^5$ independently is selected from aliphatic, heteroaliphatic, heteroaryl, or aryl. In some embodiments, the polymer comprises at least one $R^5$ group and $R^5$ is ethyl and naphthyl. Other exemplary polymer formulas include

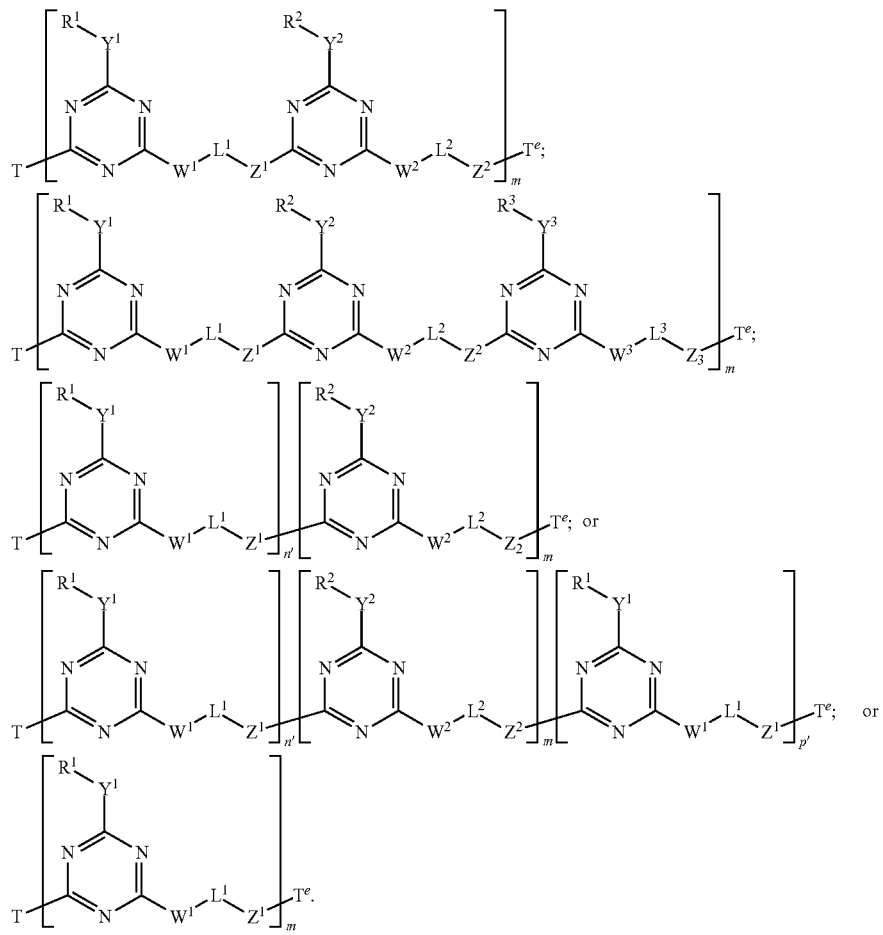

In some embodiments, the polymers form a membrane, amorphous particles, or crystals.

Disclosed herein are multiple methods of assembling the components disclosed herein into defined polymer structures. Given this flexibility in synthetic approaches for the novel polymer materials disclosed herein, method embodiments may be selected or adapted to obtain specific polymers of predetermined defined structure. These embodiments include methods of synthesis in solution or by solid phase synthesis, such that syntheses may be automated by synthesis machines in particular embodiments.

In one embodiment of polymer synthesis disclosed herein, the polymer chain is extended by the addition of a molecular precursor having a protected functional group. The protected functional group is then deprotected before the addition of the next protected molecular precursor.

In another embodiment of polymer synthesis disclosed herein, a set of reactions is used to assemble submonomers or starting materials onto a growing polymer chain, each such submonomer being less than a molecular precursor and/or a monomer unit, as disclosed herein. These method embodiments reduce the amount of prior synthesis of molecular precursors used to make the polymers, and in some embodiments may eliminate the use of protecting groups that are subsequently removed and discarded as waste. Multiple method embodiments disclosed herein concern beginning with a starting material having three displaceable groups and no substituents, or submonomers having, for example, one substituent and two remaining displaceable groups.

In one submonomer method of polymer synthesis disclosed herein, no protecting groups are used in the synthesis. Just two repetitive steps assemble submonomers onto the growing polymer chain.

In another such embodiment of polymer synthesis disclosed herein, submonomer methods are described that also use protecting groups as part of the synthesis method.

In some submonomer embodiments disclosed herein the pendant side chain is added during the submonomer polymer synthesis, such that libraries of side chain-substituted molecular precursors need not be synthesized in advance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5B is a magnified view of the conformer shown illustrated in FIG. 5A.

FIG. 12C is a trace of height versus distance along a portion of the sample (red line traversing an island of assembled material), which further illustrates steps of approximately 4 nm and 8 nm above the bare mica surface.

FIG. 14A shows the AFM image of the sample after 5 days and FIG. 14B shows the AFM image of a droplet of solution after 1 minute of incubation with the mica.

FIG. 15A shows the AFM image of the sample after 5 days; FIG. 15B is a trace of height versus distance along a portion of the sample (red line traversing an island of assembled material); and FIG. 15C shows the AFM image of a droplet of solution after 1 minute of incubation with the mica.

FIG. 16A show the AFM image of the sample after 7 days; FIG. 16B shows the AFM image of a droplet of solution after 1 minute.

DETAILED DESCRIPTION

Figure 1:
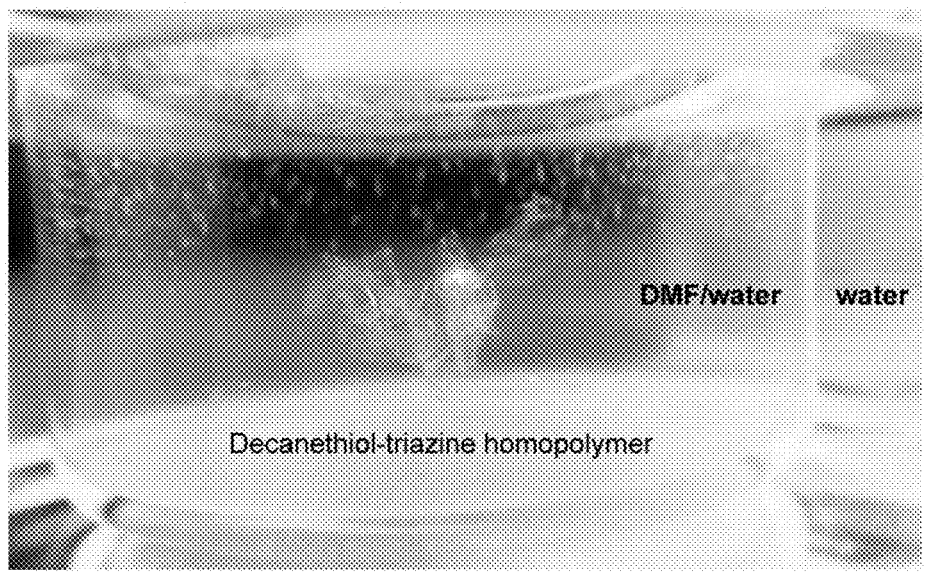
FIG. 1 shows a triazine homopolymer embodiment wherein water vapor has been diffused into a DMF solution of the polymer, inducing assembly into a solid membrane structure suspended in the fluid.

Disclosed herein are novel synthetic polymers with diverse side chain functional groups whose unique, defined structures lead to properties and functionality lending to their use in materials science, nanotechnology, separation science, membranes, molecular recognition, assays, chemical or biomolecular sensors, biomedical therapy, pharmaceuticals, catalysis, and information storage.

In some embodiments the polymers exhibit high thermostability, resistance to hydrolytic degradation, and/or resistance to enzymatic or biological degradation, in comparison to natural or conventional sequence-defined polymers. Deficiencies in these areas can limit the usefulness of such natural or conventional sequence-defined polymers, which have peptide or other bonds subject to hydrolytic cleavage with or without enzymatic catalysis. Conventional sequence-defined polymers include polypeptides, pseudopeptides, and/or peptoids, which typically include linkers and/or peptide bonds that can be cleaved by under high temperatures and/or by enzymatic action thereby resulting in polymer degradation.

In some embodiments the polymers comprise hydrogen bond accepting atoms (such as nitrogens in the polymer backbones), hydrogen bond donating groups (such as N—H groups in the polymer backbones), or aromatic rings in the polymer backbones. In some embodiments, the polymers comprise interactive functional groups in the side chains that can participate in intramolecular or intermolecular interactions between monomer units, such that the polymers can self-organize into particular conformations or self-assemble to form materials. These conformations and materials may include artificial alpha helices, artificial beta sheets, and/or particular spatial arrangements of pendant side chains. Polymers that self-organize into particular conformations may participate in molecular recognition, have therapeutic or other pharmacologic biomedical effects, be useful in assays, sensors or separations, target bacteria, kill pathogens, or perform catalysis. Polymers that self-assemble through intermolecular interactions may form membranes, nanosheets, crystals, nanocapsules, microcapsules, nanotubules, microtubules, liquid crystals, fibers, nanofibers, or composite materials that contain additional components such as ions, minerals, or molecules and macromolecules.

Also disclosed herein are embodiments of defined polymer structures, and methods of synthesizing them, wherein molecular precursors, submonomers, and/or molecular monomers are assembled together using inexpensive starting materials that can produce diverse polymer structures comprising monomer units having various pendant side chains or linker sections by adaptive, scalable synthesis methods. In contrast to the polymerization methods disclosed herein, conventional methods of making sequence-defined peptide polymers typically require one-by-one addition of natural or non-natural amino acid groups to supports using repetitive deprotection and addition steps, which requires using rigid reaction conditions and a pre-assembled library of amino acids, thereby inhibiting large-scale adaptations of these methods. As disclosed herein, the inventors have developed molecular precursors, submonomers, and molecular monomers, and methods of constructing polymers using these components that eliminate the need to use protection/deprotection steps, expensive reagents, and/or pre-made libraries of monomers.

Embodiments of the presently disclosed methods utilize the starting materials to provide a molecular architecture with multiple reactive sites that can be sequentially acted upon in a pre-determined, well-controlled manner to create molecular precursors or submonomers disclosed herein. In certain embodiments, one and only one of the original or non-functionalized reactive sites is reactive at a given temperature. Accordingly, the starting material is only functionalized at a given position and not at additional positions in the same reaction; these additional positions can then be altered or functionalized under different conditions with different reagents. This sequential reactivity provides an advancement over prior methods used to form conventional sequence-defined peptide polymers as it provides completely new polymeric architectures, as compared to conventional peptide, peptoid, or nucleic acid polymers. At the same time, molecular precursors, submonomers, and monomers with diverse pendant sides chains, or even different linker sections, can be prepared in a straightforward manner from readily available or synthesized starting materials. A new molecular precursor, submonomer, or monomer prepared by this chemistry is more easily synthesized than, for example, unnatural alpha amino acids, which are required in conventional peptide-like polymers.

In certain disclosed embodiments, polymer structures comprising at least three monomer units are made. In such embodiments, the polymer is of a certain defined length, and has a defined, predetermined sequence of structurally different monomer units, where the sequence of monomer units arises from a predetermined plan, rather than as a result of a random copolymerization reaction.

Different types of predetermined sequences of monomers are contemplated by the present disclosure. In some embodiments, a predetermined sequence may be free of, or have no repeating patterns that exist consistently throughout the entire polymer. Solely by way of example, a hexamer of the sequence ABCADAC or ABCDEF is an example of a predetermined sequence without a repeating pattern, wherein A, B, C, D, E, and F represent monomer units disclosed herein.

In other disclosed embodiments, the predetermined sequence of monomers may have monomers that are present in repeating patterns, such as (AB)n, or (ABC)n, or (ABCBA)n, but that are monodisperse, or substantially monodisperse. The repeating patterns (AB)n, or (ABC)n, or (ABCBA)n are solely presented as examples and are not intended to be limiting. Predetermined sequences with repeating patterns can be made using the methods disclosed herein, and in some embodiments the methods of making can be used to produce polymers having a defined length, thereby producing a monodisperse or substantially monodisperse polymer. Such sequence-defined polymers are distinguished from those produced using conventional methods of making, such as batch polymerizations. These conventional methods can be used to produce polymers having repeating patterns; however, polymers produced using such methods do not have a defined length, and thereby are polydisperse.

In some other embodiments, the predetermined sequence of monomers can comprise monomers in blocks, such as (A)n(B)n, or (A)n(B)n(A)n, or (A)n(B)n(C)n, which are solely presented as exemplary patterns and are not intended to limit the present disclosure. Such embodiments are referred to herein as block copolymers. These block copolymers have a defined length and therefore are monodisperse or substantially monodisperse. These sequence-defined block copolymers are distinguished from those in the art that are produced from batch polymerizations, as polymers produced from batch polymerizations do not produce block copolymers having a defined length, and thereby are polydisperse.

The structurally different monomer units of any of the above-mentioned polymers may be different, or "defined," as a result of having different pendant side chains, different linker sections, or a combination thereof. The linker section itself may have substituents on it. In some embodiments, the pendant side chain may simply be a hydrogen atom.

In yet other embodiments, polymers having a certain defined length, and a defined sequence of identical monomer units are disclosed. Such polymers are referred to herein as homopolymers. The homopolymers disclosed herein are monodisperse or substantially monodisperse in contrast to polydisperse homopolymers produced from conventional batch polymerization reactions.

Also disclosed herein are methods for determining the ability of the novel polymers to conform and/or assemble into different configurations and materials. These methods can be used to facilitate particular desired monomer and/or polymer designs. For example, computer simulations can be used to determine the forces and/or interactions that govern folding and assembly of the polymers. These simulations demonstrate that the polymers may fold into conformations in solution that resemble protein three dimensional structure, such as alpha-helices or beta sheets. These simulations can be used to show how backbone-backbone interactions by hydrogen bonding and pi-pi interactions may contribute to folding into conformations or self-assembly into materials. The simulations also may be used as a preliminary step in determining the appropriate molecular fragments to combine to form the desired polymers as well as methods to identify particular polymer structures useful for obtaining a particular desired configuration and/or polymer material. Also disclosed are experiments in which polymers assemble from solution into solid phase materials, demonstrating the potential for self-assembly into materials.

I. TERMS AND DEFINITIONS

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

To facilitate review of the various embodiments of the disclosure, the following explanations of specific terms are provided:

Aliphatic: A hydrocarbon, or a radical thereof, having at least one carbon atom to 50 carbon atoms, such as one to 25 carbon atoms, or one to ten carbon atoms, and which includes alkanes (or alkyl), alkenes (or alkenyl), alkynes (or alkynyl), including cyclic versions thereof, and further including straight- and branched-chain arrangements, and all stereo and position isomers as well.

Aldehyde: $R^aC(O)H$, wherein $R^a$ is the atom of the formulas disclosed herein to which the aldehyde group is attached.

Alkyl: A saturated monovalent hydrocarbon having at least one carbon atom to 50 carbon atoms, such as one to 25 carbon atoms, or one to ten carbon atoms, wherein the saturated monovalent hydrocarbon can be derived from removing one hydrogen atom from one carbon atom of a parent compound (e.g., alkane). An alkyl group can be branched, straight-chain, or cyclic (e.g., cycloalkyl).

Alkenyl: An unsaturated monovalent hydrocarbon having at least two carbon atoms 50 carbon atoms, such as two to 25 carbon atoms, or two to ten carbon atoms, and at least one carbon-carbon double bond, wherein the unsaturated monovalent hydrocarbon can be derived from removing one hydrogen atom from one carbon atom of a parent alkene. An alkenyl group can be branched, straight-chain, cyclic (e.g., cylcoalkenyl), cis, or trans (e.g., E or Z).

Alkynyl: An unsaturated monovalent hydrocarbon having at least two carbon atoms 50 carbon atoms, such as two to 25 carbon atoms, or two to ten carbon atoms and at least one carbon-carbon triple bond, wherein the unsaturated monovalent hydrocarbon can be derived from removing one hydrogen atom from one carbon atom of a parent alkyne. An alkynyl group can be branched, straight-chain, or cyclic (e.g., cycloalkynyl).

Aliphatic-aryl: An aryl group that is or can be coupled to a starting material, molecular precursor, submonomer, molecular monomer, or polymer embodiment disclosed herein, wherein the aryl group is or becomes coupled through an aliphatic group.

Alkylaryl/Alkenylaryl/Alkynylaryl: An aryl group that is or can be coupled to a starting material, molecular precursor, submonomer, molecular monomer, or polymer embodiment disclosed herein, wherein the aryl group is or becomes coupled through an alkyl, alkenyl, or alkynyl group, respectively.

Aliphatic-heteroaryl: A heteroaryl group that is or can be coupled to a starting material, molecular precursor, submonomer, molecular monomer, or polymer embodiment disclosed herein, wherein the heteroaryl group is or becomes coupled through an aliphatic group.

Alkylheteroaryl/Alkenylheteroaryl/Alkynylheteroaryl: A heteroaryl group that is or can be coupled to a starting material, molecular precursor, submonomer, molecular monomer, or polymer embodiment disclosed herein, wherein the heteroaryl group is or becomes coupled through an alkyl, alkenyl, or alkynyl group, respectively.

Alkoxy: —O-alkyl, with exemplary embodiments including, but not limited to, methoxy, ethoxy, n-propoxy, isopropoxy, n-butoxy, t-butoxy, sec-butoxy, n-pentoxy.

Amide: $R^aC(O)NR^bR^c$ wherein $R^a$ is the atom of the formulas disclosed herein to which the amide is attached, and each of $R^b$ and $R^c$ independently is selected from hydrogen, aliphatic, heteroaliphatic, aryl, heteroaryl, or any combination thereof.

Amine: $R^aNR^bR^c$, wherein $R^a$ is the atom of the formulas disclosed herein to which the amine is attached, and each of $R^b$ and $R^c$ independently is selected from hydrogen, alkyl, alkenyl, alkynyl, aryl, heteroalkyl, heteroalkenyl, heteroalkynyl, heteroaryl, and any combination thereof.

Aryl: An aromatic carbocyclic group comprising at least five carbon atoms to 15 carbon atoms, such as five to ten carbon atoms, having a single ring or multiple condensed rings, which condensed rings can or may not be aromatic provided that the point of attachment is through an atom of the aromatic carbocyclic group.

Carboxyl: $R^aC(O)OR^b$, wherein $R^a$ is the atom of the formulas disclosed herein to which the carboxyl group is attached and wherein $R^b$ is alkyl, alkenyl, alkynyl, aryl, heteroalkyl, heteroalkenyl, heteroalkynyl, heteroaryl, hydrogen, and any combination thereof.

Haloaliphatic: An aliphatic group wherein one or more hydrogen atoms, such as one to 10 hydrogen atoms, independently is replaced with a halogen atom, such as fluoro, bromo, chloro, or iodo.

Haloalkyl: An alkyl group wherein one or more hydrogen atoms, such as one to 10 hydrogen atoms, independently is replaced with a halogen atom, such as fluoro, bromo, chloro, or iodo. In an independent embodiment, haloalkyl can be a $CX_3$ group, wherein each X independently can be selected from fluoro, bromo, chloro, or iodo.

Heteroaliphatic: An aliphatic group comprising at least one heteroatom to 20 heteroatoms, such as one to 15 heteroatoms, or one to 5 heteroatoms, which can be selected from, but not limited to oxygen, nitrogen, sulfur, selenium, phosphorous, and oxidized forms thereof within the group.

Heteroalkyl/Heteroalkenyl/Heteroalkynyl: An alkyl, alkenyl, or alkynyl group (which can be branched, straight-chain, or cyclic) comprising at least one heteroatom to 20 heteroatoms, such as one to 15 heteroatoms, or one to 5 heteroatoms, which can be selected from, but not limited to oxygen, nitrogen, sulfur, selenium, phosphorous, and oxidized forms thereof within the group.

Heteraliphatic-aryl: An aryl group that is or can be coupled to a starting material, molecular precursor, submonomer, molecular monomer, or polymer embodiment disclosed herein, wherein the aryl group is or becomes coupled through a heteroaliphatic group.

Heteroalkylaryl/Heteroalkenylaryl/Heteroalkynylaryl: An aryl group that is or can be coupled to a starting material, molecular precursor, submonomer, molecular monomer, or polymer embodiment disclosed herein, wherein the aryl group is or becomes coupled through a heteroalkyl, heteroalkenyl, or heteroalkynyl group, respectively.

Heteroalkylheteroaryl/Heteroalkenylheteroaryl/Heteroalkynylheteroaryl: A heteroaryl group that is or can be coupled to a starting material, molecular precursor, submonomer, molecular monomer, or polymer embodiment disclosed herein, wherein the aryl group is or becomes coupled through a heteroalkyl, heteroalkenyl, or heteroalkynyl group, respectively.

Heteroaryl: An aryl group comprising at least one heteroatom to six heteroatoms, such as one to four heteroatoms, which can be selected from, but not limited to oxygen, nitrogen, sulfur, selenium, phosphorous, and oxidized forms thereof within the ring. Such heteroaryl groups can have a single ring or multiple condensed rings, wherein the condensed rings may or may not be aromatic and/or contain a heteroatom, provided that the point of attachment is through an atom of the aromatic heteroaryl group.

Heteropolymer: A polymer comprising multiple different monomer units, wherein the multiple different monomer units are be distinguished by a side chain, a linker group, a terminal group, or a combination thereof and at least two monomer units are not the same. In particular disclosed embodiments, a heteropolymer is linear and is not, and does not constitute, a dendrimer, such as a triazine-containing dendrimer. Such dendrimers consist of multiple branches, rather than just one branching point.

Homopolymer: A polymer comprising identical monomer units and that is monodisperse or substantially monodisperse. In independent embodiments, the homopolymer is linear and is not, and does not constitute, a dendrimer, such as a triazine-containing dendrimer. Such dendrimers consist of multiple branches, rather than just one branching point.

Ketone: $R^aC(O)R^b$, wherein $R^a$ is the atom of the formulas disclosed herein to which the ketone is attached, and $R^b$ is selected from aliphatic, heteroaliphatic, aryl, heteroaryl, and any combination thereof.

Molecular Precursor: In some embodiments, this term encompasses a functionalized starting material wherein at least one of the reactive positions of the starting material has been functionalized with a side chain, linker group, or a terminal group and a third reactive position comprises a reactive group. In particular disclosed embodiments, a molecular precursor can be a functionalized starting material wherein at least two of the reactive positions of the starting material have each been functionalized with a side chain, linker group, or a terminal group and a third reactive position comprises a reactive group.

Monodisperse: A monodisperse polymer is a polymer as contemplated by the present disclosure wherein the length (or number of monomer units) obtained in a final polymer product is defined by a specific number of starting materials, molecular precursors, or submonomers attached during synthesis of the polymer and substantially all the polymer chains (e.g., at least 80% to 99% of the polymer chains, such as at least 80%, 85%, 90%, 95%, or 99% of the polymer chains) are of the same length defined by the synthesis. As an example, in a method embodiment wherein 6 molecular precursors (or 6 submonomers, or 6 starting material units) are combined to form a polymer, at least 80% of the polymer chains formed in the method will consist of 6 monomer units, with particular embodiments having at least 90% of the polymer chains consisting of exactly 6 monomer units.

Monomer Unit: A moiety present in a polymer that comprises a starting material that has been functionalized at all three reactive positions. Some monomer units can be external monomer units, which comprise (a) a side chain group, (b) a terminal group, and (a) a linker group, wherein the terminal group constitutes one end of the polymer and the linker group couples the monomer unit to another monomer unit. Some monomer units can be internal monomer units, which comprise (a) a side chain group and (b) at least one linker group, wherein the linker group couples the monomer unit to at least one other monomer unit (a terminal monomer unit, an internal monomer unit, two terminal monomer units, two internal monomer units, or a combination of a terminal monomer unit and an internal monomer unit).

Sequence-Defined Polymer: A heteropolymer comprising at least three monomers, wherein each monomer can have a different side chain, linker group, and/or terminal group, and wherein the monomers are arranged in a pre-determined specific sequence, with the pre-determined specific sequence being determined prior to synthesis of the heteropolymer.

Solid Support: A solid, inorganic or organic material that is appended to one end of a molecular precursor, monomer, or polymer disclosed herein and that typically is inert to the reaction conditions used to form a polymer chain thereby allowing the solid support to remain attached to the growing polymer chain. The solid support can be selectively cleaved to free the polymer.

Submonomer: This term refers to a functionalized starting material functionalized with a side chain, a linker group, or a terminal group, and further comprising at least two reactive groups that can each be replaced with a linker, a terminal group, or a side chain. This term also can be used to refer to the linker, terminal group, or side chain that is used to replace one or more of the two reactive groups of the functionalized starting material.

Sulfonyl/Sulfonate: A functional group having a formula $R^aSO_2R^b$, wherein $R^a$ is the atom of the formulas disclosed herein to which the sulfonyl or sulfonate is attached, and $R^b$ is selected from hydrogen, aliphatic, heteroaliphatic, aryl, heteroaryl, and any combination thereof.

A person of ordinary skill in the art would recognize that the definitions provided above are not intended to include impermissible substitution patterns (e.g., methyl substituted with 5 different groups, and the like). Such impermissible substitution patterns are easily recognized by a person of ordinary skill in the art. Any functional group disclosed herein and/or defined above can be substituted or unsubstituted, unless otherwise indicated herein. Also, in particular embodiments, the use of the terms "(hetero)alkyl," "(hetero)alkenyl," "(hetero)alkynyl," "(hetero)aryl," "(hetero)alkyl(hetero)aryl," "(hetero)alkenyl(hetero)aryl," and "(hetero)alkynyl(hetero)aryl" can be used to indicate that the functional group can be a heteroatom-containing or a non-heteroatom-containing version of the particular designated alkyl, alkenyl, alkynyl, or aryl group. For example, "(hetero)alkyl" can encompass "heteroalkyl" or "alkyl" unless otherwise specifically indicated.

II. POLYMERS

Disclosed herein are embodiments of molecular precursors and submonomers that can be used to make polymers, such as heteropolymers and homopolymers. The diverse selection of molecular precursors and/or submonomers that can comprise various different types of functionalized groups provides the ability to obtain defined polymers with monomer units having specific pendant side chains, linker groups, and/or terminal groups. Such polymers can be "defined," wherein the polymer is defined by a pre-determined sequence of different monomer units. In some embodiments, the pendant side chain group or the linker groups can be selected and used to define the polymer sequence. The polymers described herein exhibit superior stability in comparison to sequence-defined peptide polymers, which are defined by the side chains of amino acid monomers. Without being bound to a particular theory, it is currently believed that the lack of hydrolysable peptide bonds in the polymer chain can contribute the stability of the polymers disclosed herein.

The disclosed polymers also have substantially different structures from sequence peptide polymers, thereby providing the ability to produce functional macromolecules and materials for the applications described herein. In some embodiments, the polymers can be assembled to have a specific pre-determined number of monomer units, and hence a defined length, thereby contributing to the monodispersity of particular polymers disclosed herein. Such monodispersity confers to the polymers the ability to assemble into materials with ordered structures.

The polymers disclosed herein can have the type formula illustrated below in Formula 1.

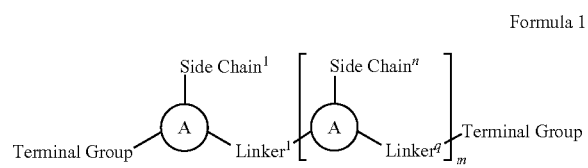

Formula 1

With respect to Formula 1, the polymer comprises terminal groups, which can be the same or different and attached to each terminus of the polymer. Terminal groups can be an atom or group of atoms (such as a functional group), or they can include atoms that tether the polymer to a solid phase support. In some embodiments, one or more terminal groups can be a solid phase support.

The polymers also can comprise monomer units having side chains, which can be the same or different. A side chain can be an atom or a group of atoms, which can comprise one or more functional groups. As indicated previously, the side chains can be used to define the polymeric sequence.

The polymers also comprise linkers, which may be the same or different. A linker can be an atom or group of atoms (such as a functional group) that joins the consecutive monomers having a core ring A in the polymer. The linker can be derived from any suitable molecule or reagent that can be used to functionalize a starting material having a core ring A, and can subsequently bond to an additional submonomer or molecular precursor in polymer synthesis.

Core ring A can be a 5-membered or 6-membered ring, such as a 5-membered aromatic or 6-membered aromatic ring system. Core ring A can comprise one or more heteroatoms, with particular embodiments comprising three nitrogen atoms.

In particular disclosed embodiments, the polymers can have any one of the formulas illustrated below.

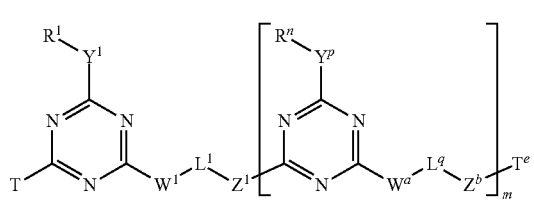

Formula 2

In some embodiments, the monomer units of the polymers satisfying Formula 2 can have any of the types of predetermined sequences disclosed herein, such as a non-repeating unit sequence, a repeating unit sequence, a block copolymer sequence, or a homopolymer sequence. In particular disclosed embodiments, polymers satisfying Formula 2 are sequence-defined polymers that are heteropolymers having a defined length and comprising multiple different monomer units arranged in a specific predetermined sequence. Each monomer of the polymer unit can be distinguished by having different side chains pendant to the polymer chain. In other embodiments, each monomer unit of the polymer can be distinguished by having different sequences of atoms in the linker section between the triazine rings in the polymer backbone. In some other embodiments, monomer units of the polymer can be distinguished by a terminal group. Sequence-defined polymers comprise at least three monomer units, wherein each monomer unit can have a different side chain group, linker section, and/or terminal group and wherein the monomer units are arranged in a pre-determined sequence, and are not arranged randomly. These polymers are distinguished from a polymer where the monomers are arranged randomly resulting from a batch polymerization of a mixture of monomers.

Other exemplary polymers disclosed herein can have a Formula 3 or 4 illustrated below. The polymers illustrated in Formulas 2 and 3 have repeating patterns of the form (AB)n and (ABC)n respectively. These polymers are provided solely as illustrative examples as other repeating patterns can be used. The methods of making polymers, disclosed herein, can make sequences that repeat in this way while also defining the length of the polymer, in contrast to sequence controlled polymers that have repeating sequences of this type but whose lengths are not defined.

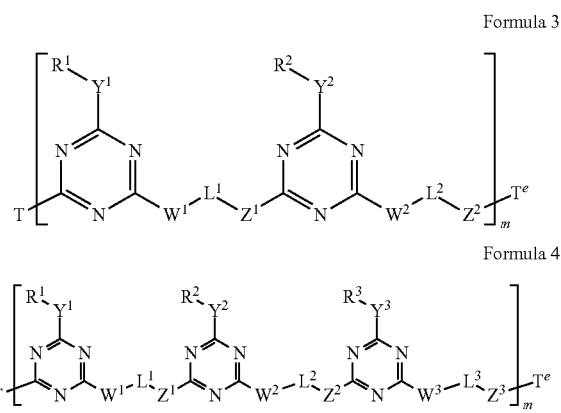

In some embodiments, the polymers can satisfy Formulas 5 and 6. Such polymers are block copolymers have repeating patterns, such as in the form of (A)n(B)m and (A)n(B)m(C)p, respectively. Again, these examples are provided for illustrative purposes. The methods of making polymers, disclosed herein, can make sequences that repeat in this way while also defining the length of the polymer, in contrast to block copolymers that have repeating sequences of this type but whose lengths are not defined.

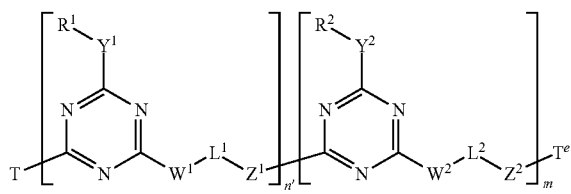

Formula 5

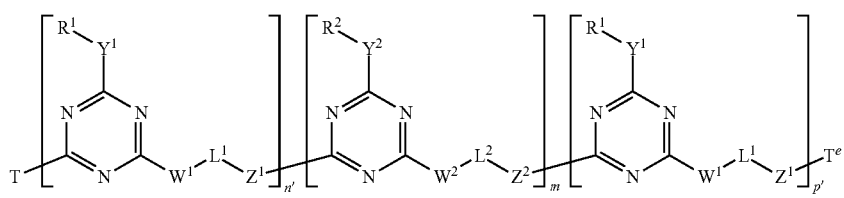

Formula 6

In some embodiments, the polymers disclosed herein can be homopolymers that satisfy Formula 7 illustrated below. The methods of making polymers, disclosed herein, can be used to make these homopolymers while also defining the length of the polymer, so that it is monodisperse or substantially monodisperse, in contrast to polydisperse homopolymers, which are obtained from conventional batch polymerizations.

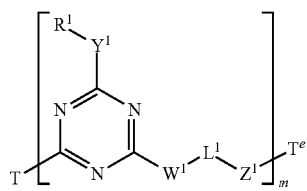

Formula 7

With reference to any one of Formulas 2-7, the "R—Y" groups are side chains that are pendant to the overall polymer backbone. The polymer backbone includes a core with an architecture around which the other components are assembled. In some embodiments, this core, as illustrated Formulas 2-7, can be a triazine ring. In an independent embodiment, the core can be a pyridine or diazine ring system. The core is part of the starting material, which is described in more detail below. The side chains are attached to this core through covalent linkages. Also illustrated in Formulas 2-7 are "W-L-Z" sections that represent linker sections between the cores of sequential monomers or repeat units. The "T" group illustrated in the above formulas is a terminal group. Superscripts on the variables of Formulas 1-7 indicate that the atoms and structures of these variables can vary from one monomer to another, such as in a heteropolymer (e.g., a sequence-defined polymer).

In particular embodiments, the variables of Formulas 2-7 can be selected from any combination of the following:

T can be a terminal group as disclosed above which may or may not be bound to a solid support;

$T^e$ can be a terminal group as disclosed above, a linker group, or any other atomic or molecular structure that can be substituted onto the core of the final core that becomes the final monomer unit;

each of $R^1$, $R^2$, $R^3$, and $R''$ independently can be selected from aliphatic, heteroaliphatic, aryl, heteroaryl, aliphatic-aryl, haloaliphatic, and heteroaliphatic-aryl;

each of $Y^1$, $Y^2$, $Y^3$, and $Y^p$ independently can be selected from a bond, carbon, oxygen, sulfur, a bond, and $NR^4$, wherein $R^4$ is selected from hydrogen, aliphatic, heteroaliphatic, aryl, or heteroaryl;

each of $W^1$, $W^2$, $W^3$, and $W^a$ independently can be selected from carbon, oxygen, sulfur, and $NR^4$;

each of $Z^1$, $Z^2$, $Z^3$, and $Z^b$ independently can be selected from oxygen, sulfur, $NR^4$, and heteroaryl;

each of $L^1$, $L^2$, $L^3$, or $L^q$ can be selected from aliphatic, heteroaliphatic, aryl, and heteroaryl;

each n' and p' independently can range from 1 to 1000; and each m can be 2 to 1000.

In particular disclosed embodiments of Formulas 1-7 any combination of the following can be used:

each of $R^1$, $R^2$, $R^3$, and $R''$ independently can be selected from hydrogen, (hetero)alkyl, (hetero)alkenyl, (hetero)alkynyl, (hetero)aryl, (hetero)alkyl(hetero)aryl, (hetero)alkenyl(hetero)aryl, haloalkyl, and (hetero)alkynyl(hetero)aryl);

each of $Z^1$, $Z^2$, $Z^3$, and $Z^b$ independently can be a triazole;

each of $L^1$, $L^2$, or $L^q$ can have a formula of $-[C(R^5)_3]_{1-10}-(X)_{0-1}-[C(R^5)_3]_{1-10}-$, wherein each $R^5$ independently can be selected from hydrogen, aliphatic, heteroaliphatic, aryl, or heteroaryl, and X is selected from oxygen, sulfur, or $NR^4$;

each n' and p' independently can range from 2 to 100, or 2 to 10;

each m can range from 2 to 100, or 2 to 10; and

T can be selected from (hetero)alkyl, (hetero)alkenyl, (hetero)alkynyl, (hetero)aryl, (hetero)alkyl(hetero)aryl, (hetero)alkenyl(hetero)aryl, and (hetero)alkynyl(hetero)aryl).

In exemplary embodiments of Formulas 1-7, any combination of the following can be used:

each of $R^1$, $R^2$, $R^3$, and $R''$ independently can be selected from $C_{1-25}$alkyl, $C_{2-25}$alkenyl, $C_{2-25}$alkynyl, $C_{1-25}$heteroalkyl (e.g., $C_{2-25}$alkoxy, $C_{1-25}$hydroxyl, $C_{2-25}$thioether, $C_{1-25}$thiol, $C_{1-25}$amine, $C_{1-25}$haloalkyl), $C_{2-25}$heteroalkenyl (e.g., $C_{3-25}$alkoxy, $C_{2-25}$hydroxyl, $C_{3-25}$thioether, $C_{2-25}$thiol, $C_{2-25}$amine, $C_{2-25}$haloalkenyl), $C_{2-25}$heteroalkynyl (e.g., $C_{3-25}$alkoxy, $C_{2-25}$hydroxyl, $C_{3-25}$thioether, $C_{2-25}$thiol, $C_{2-25}$amine, $C_{2-25}$haloalkynyl), $C_{6-15}$aryl (e.g., phenyl or naphthyl, wherein either may be meta-, ortho-, and/or para-substituted with one or more hydroxyl, amine, carboxyl, halogen, alkyl, alkenyl, alkynyl, alkoxy, thioether, ketone, or ester), or $C_{2-14}$heteroaryl (e.g., pyridinyl, pyrimidinyl, pyrrolyl, furanyl, or thiopheneyl); $CX_3$, wherein each X independently can be selected from Cl, F, Br, or I;

each $L^1$, $L^2$, $L^3$, or $L^q$ can be selected from $C_{1-10}$alkyl, such as $C_{1-5}$alkyl; and T or $T^e$ can have a formula $(R^4)_{p''}-[Z(CH_2)_{n''}Z]_{m'}-$, wherein n" and m' independently can range from 1 to 20, $R^4$ is as recited above, p" is 1 or 2, and each Z independently can be O, $NR^4$, or S). In some embodiments, the terminal group can be selected from an alkylene glycol (e.g., $R^4-[O(CH_2)_{n''}-O]_{m'}-$, wherein n" and m' independently can range from 1 to 20 and $R^4$ is as recited above), alkylene amino (e.g., $(R^4)_2-[N(CH_2)_{n''}-NR^4]_{m'}-$, wherein n" and m' independently can range from 1 to 20 and each $R^4$ independently can be as recited above), and alkylene thio (e.g., $R^4-[S(CH_2)_{n''}S]_{m'}-$, wherein n" and m' independently can range from 1 to 20 and each $R^4$ is as recited above). In yet additional embodiments, T or $T^e$ can be selected from carboxyl, aldehyde, ester, amide, or amine. In some embodiments, T or $T^e$ may further comprise a solid support, such as a bead, a resin, or a combination thereof. For example, T or $T^e$ can be a solid support directly coupled to the monomer, or it can be a group as described above that is coupled to a solid support;

Yet other exemplary embodiments of the polymers can have a Formula 8, illustrated below.

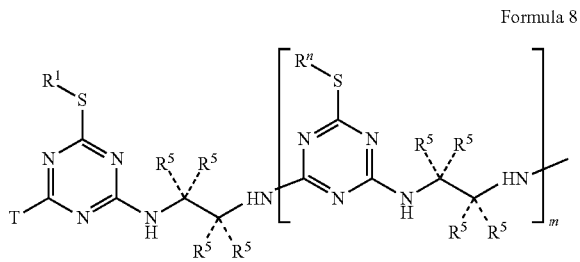

Formula 8

With reference to Formula 8, each of T, $R^1$, $R''$, and m can be as recited above, and each $R^5$ (when present) can be selected from aliphatic, heteroaliphatic, heteroaryl, or aryl, with particular embodiments being methyl and naphthyl. In exemplary embodiments, T can be an alkylene oxide group (e.g., ethylene glycol), and alkylene amino group (e.g., ethylene diamine, 1-methyl ethylene diamine), or an alkylene thio group (e.g., ethylene dithiol). In exemplary embodiments, each $R^5$ (when present) independently can be selected from methyl, ethyl, propyl, butyl, or the like.

In particular disclosed embodiments, and with respect to any one of formulas 2-8, any one or more of the following can apply:

any one or more of $R^1$, $R^2$, $R^3$, or are not hydrogen if $Y^1$, $Y^2$, $Y^3$, or $Y^p$ is $NR^4$ where $R^4$ is hydrogen and any one or more of $L^1$, $L^2$, $L^3$, or $L^q$ is phenyl;

any one or more of $R^1$, $R^2$, $R^3$, or are not hydrogen if $Y^1$, $Y^2$, $Y^3$, or $Y^p$ is $NR^4$ where $R^4$ is hydrogen; any one or more of $W^1$, $W^2$, $W^3$, or $W^a$ is O; any one or more of $L^1$, $L^2$, $L^3$, or $L^q$ is $-CH_2-C(4\text{-decyloxybenzyl})_2\text{-}CH_2-$; and any one of $Z^1$, $Z^2$, $Z^3$, or $Z^b$ is NH; or any one or more of $R^1$, $R^2$, $R^3$, or $R''$ is not butyl if any one or more of $Y^1$, $Y^2$, $Y^3$, or $Y^p$ is $NR^4$ where $R^4$ is butyl and any one or more of $L^1$, $L^2$, $L^3$, or $L^q$ is phenyl or -Ph-O-Ph-;

any one or more of $L^1$, $L^2$, $L^3$, or $L^q$ does not form a piperazine ring with $W^1$, $W^2$, $W^3$, $W^a$, $Z^1$, $Z^2$, $Z^3$, or $Z^b$;

any one or more of $R^1$, $R^2$, $R^3$, or $R''$ is not $-(CH_2)_2[O(CH_2)]_3NH_2$ if $Y^1$, $Y^2$, $Y^3$, or $Y^p$ is $NR^4$ where $R^4$ is hydrogen.

any one or more of $L^1$, $L^2$, $L^3$, or $L^q$ is not $-C(O)-$ if $Y^1$, $Y^2$, $Y^3$, or $Y^p$ is a bond and $R^1$, $R^2$, $R^3$, or $R''$ is phenyl; or the polymer is not a dendrimer.

Exemplary polymer embodiments are illustrated below in Table 1. In some embodiments, the polymer is an exemplary sequence-defined polymer that is a heteropolymer of defined length comprising multiple different monomers arranged in a specific predetermined sequence. The monomers are distinguished in this case by having different side chains pendant to the polymer chain. The monomers are not present in any repeating pattern that exists within the entire sequence of the polymer.

TABLE 1

Exemplary Polymers

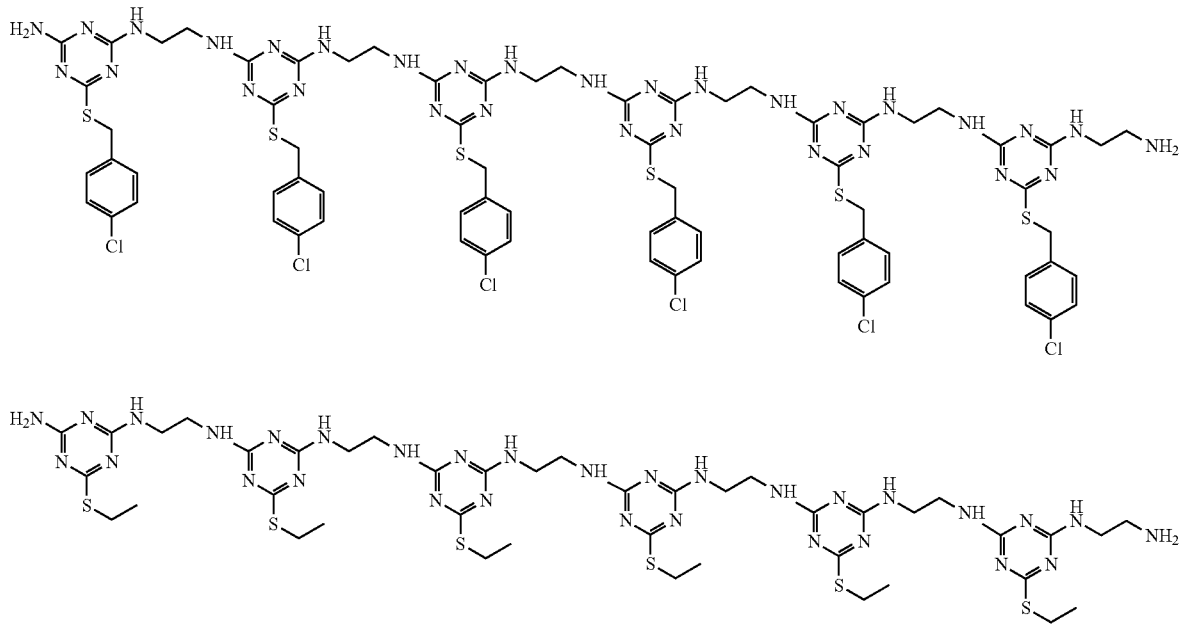

TABLE 1-continued
Exemplary Polymers
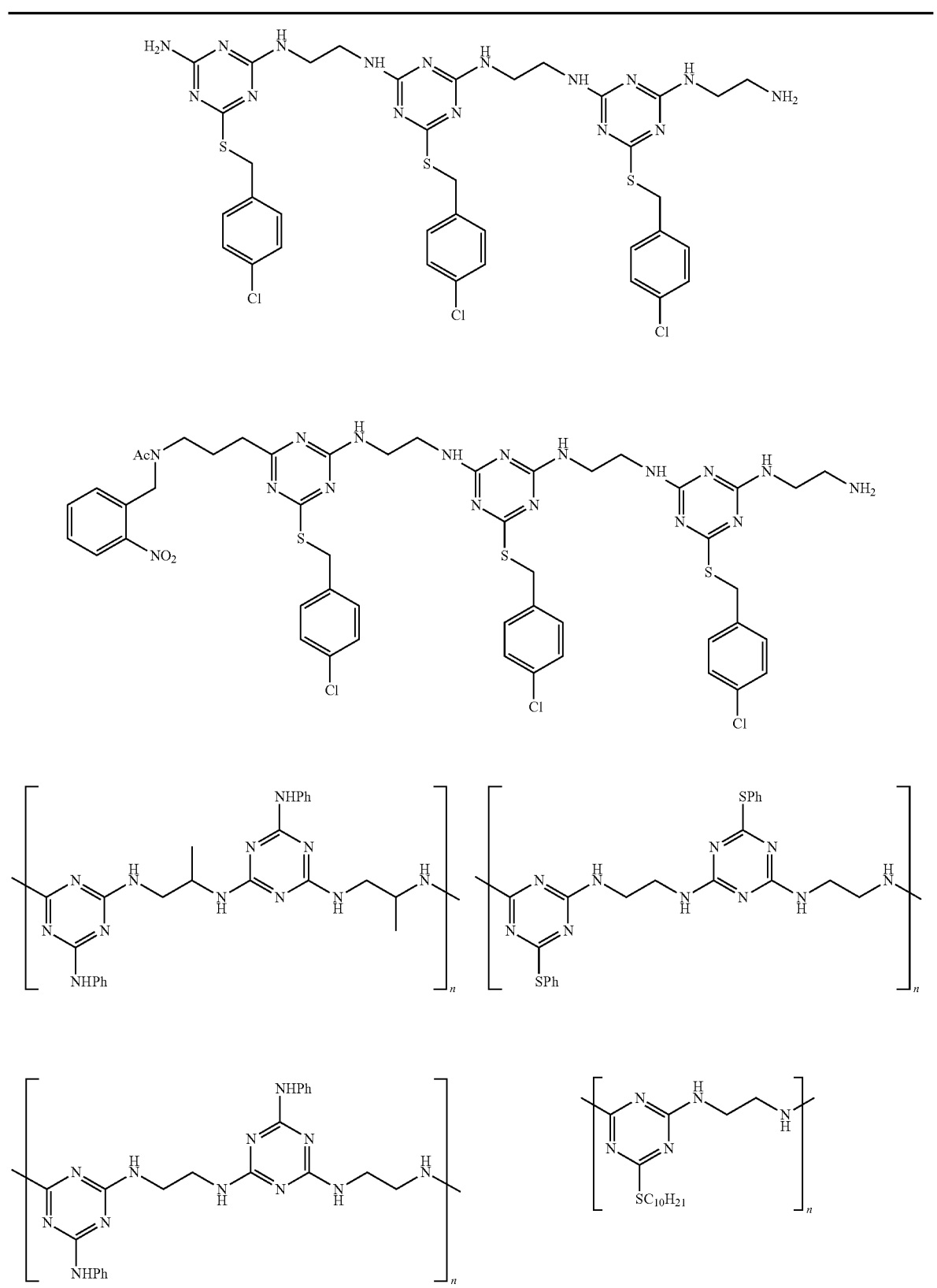

TABLE 1-continued
Exemplary Polymers
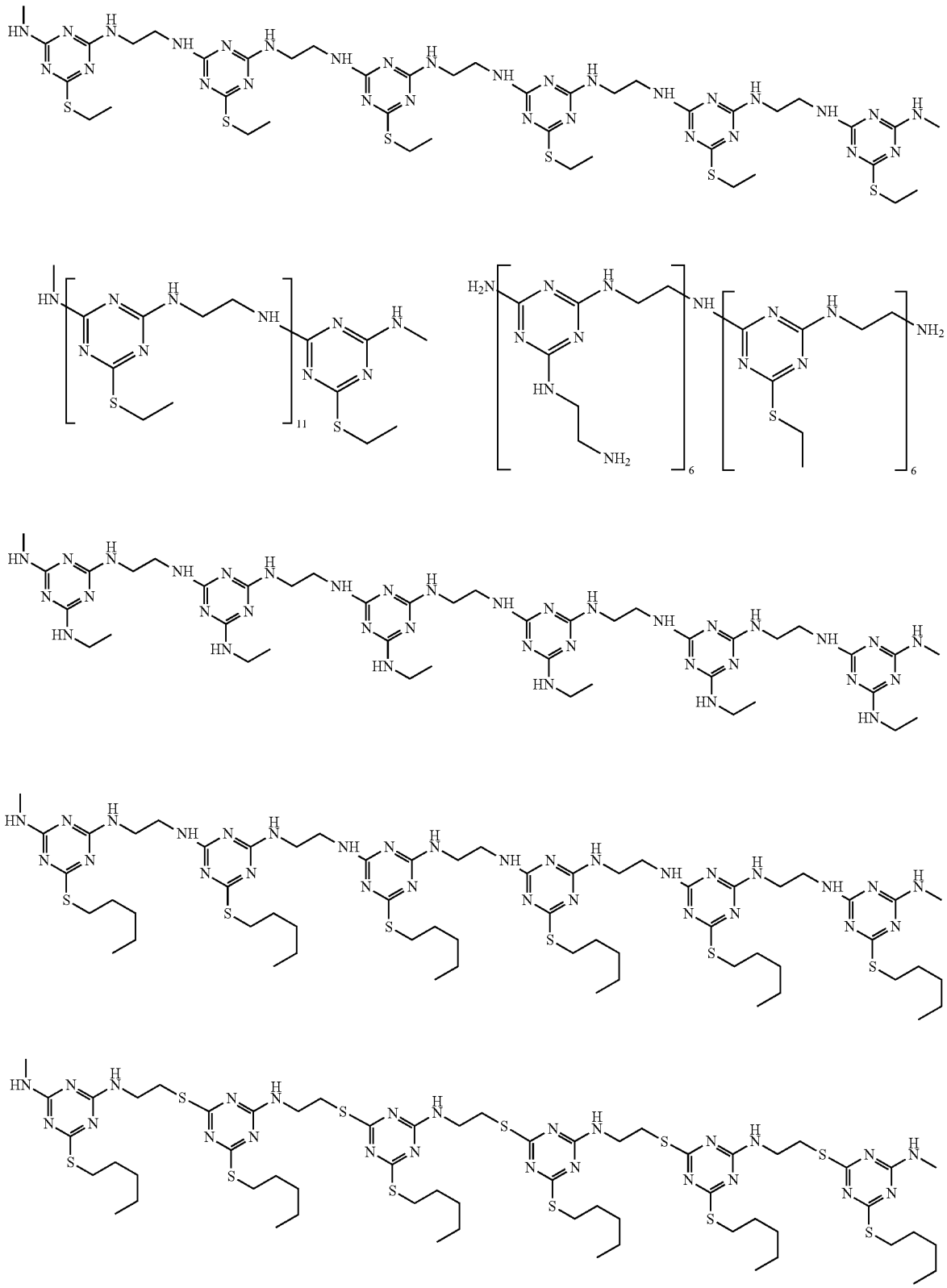

TABLE 1-continued
Exemplary Polymers
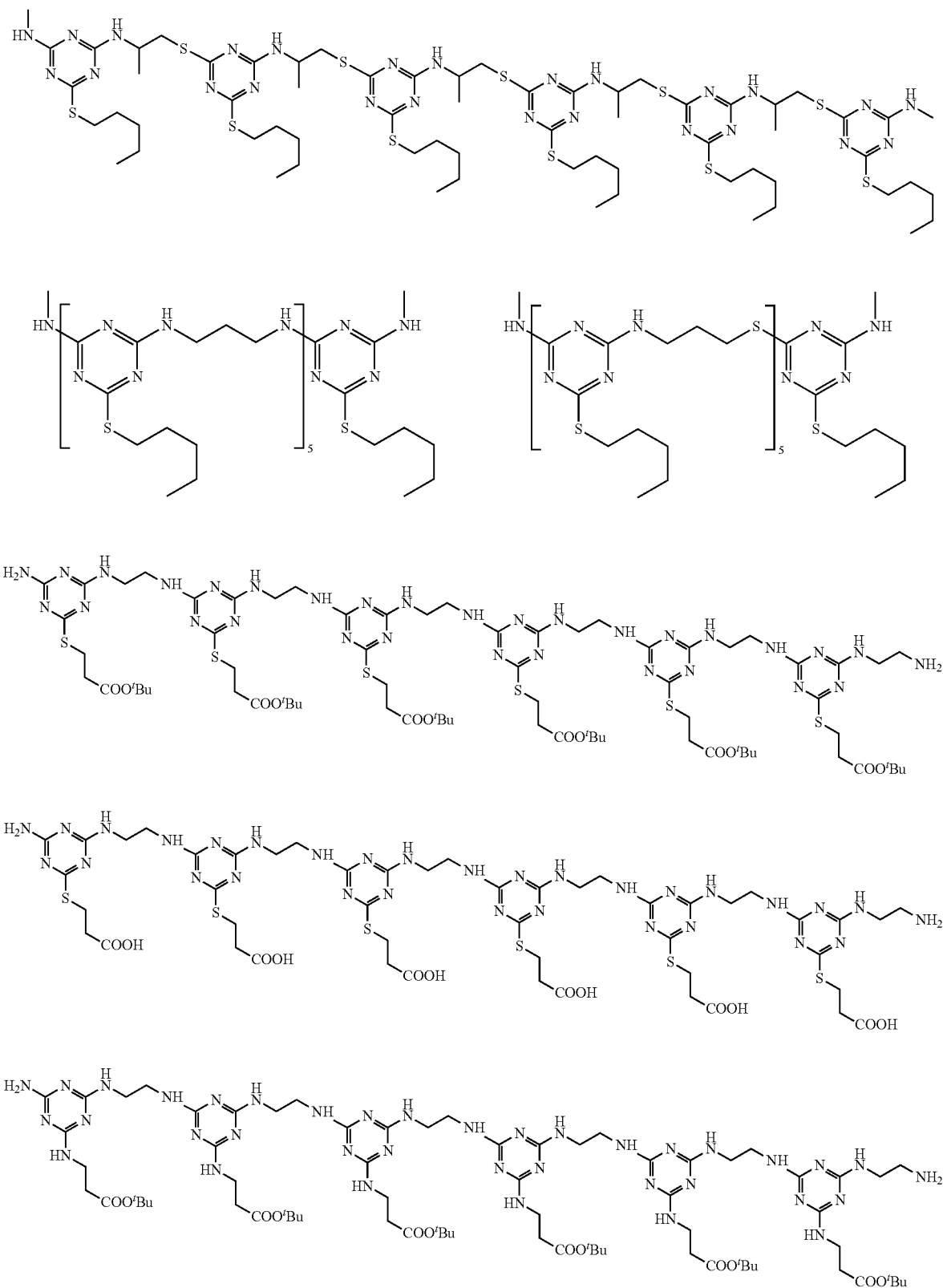

TABLE 1-continued
Exemplary Polymers
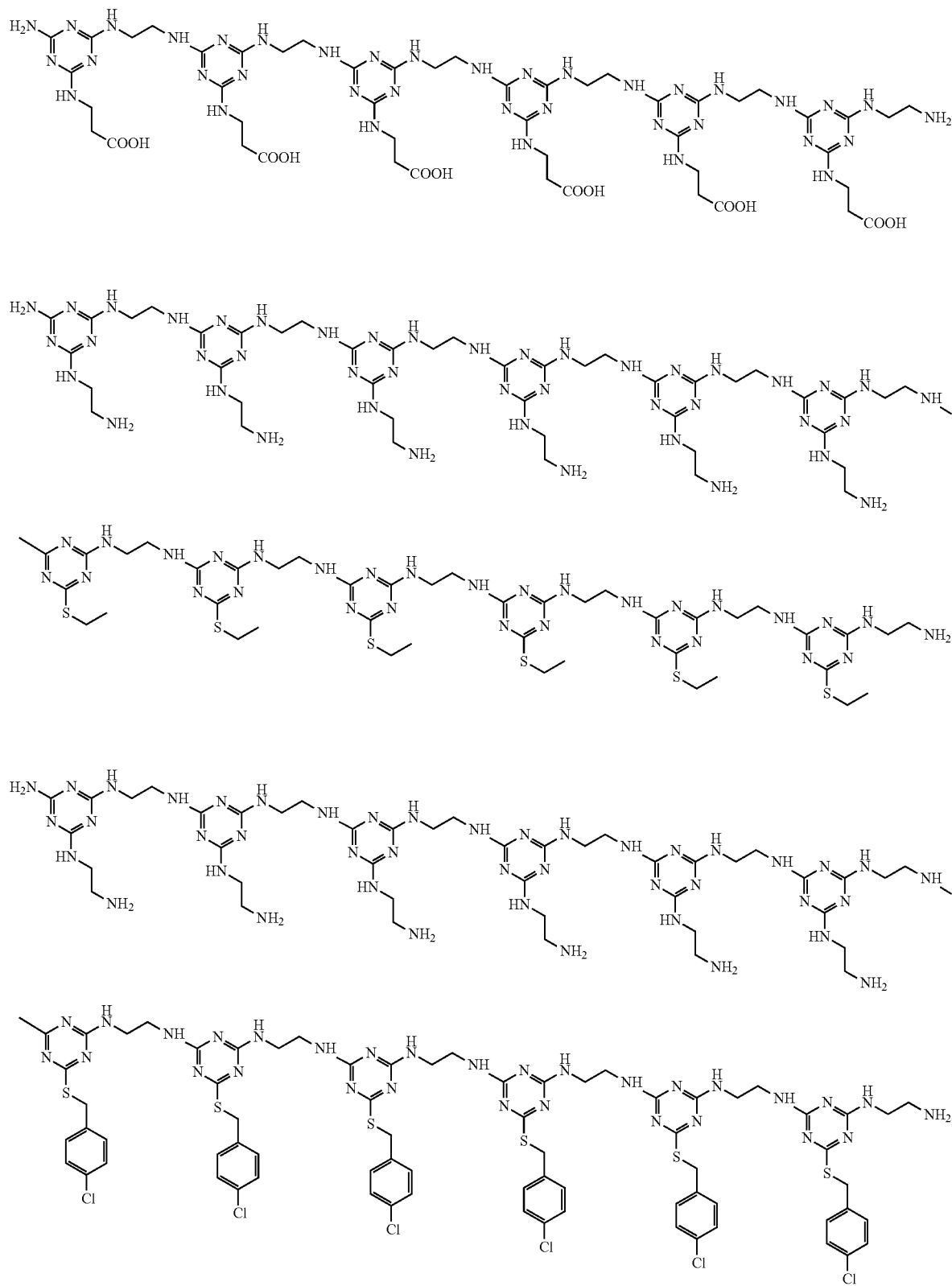

TABLE 1-continued
Exemplary Polymers
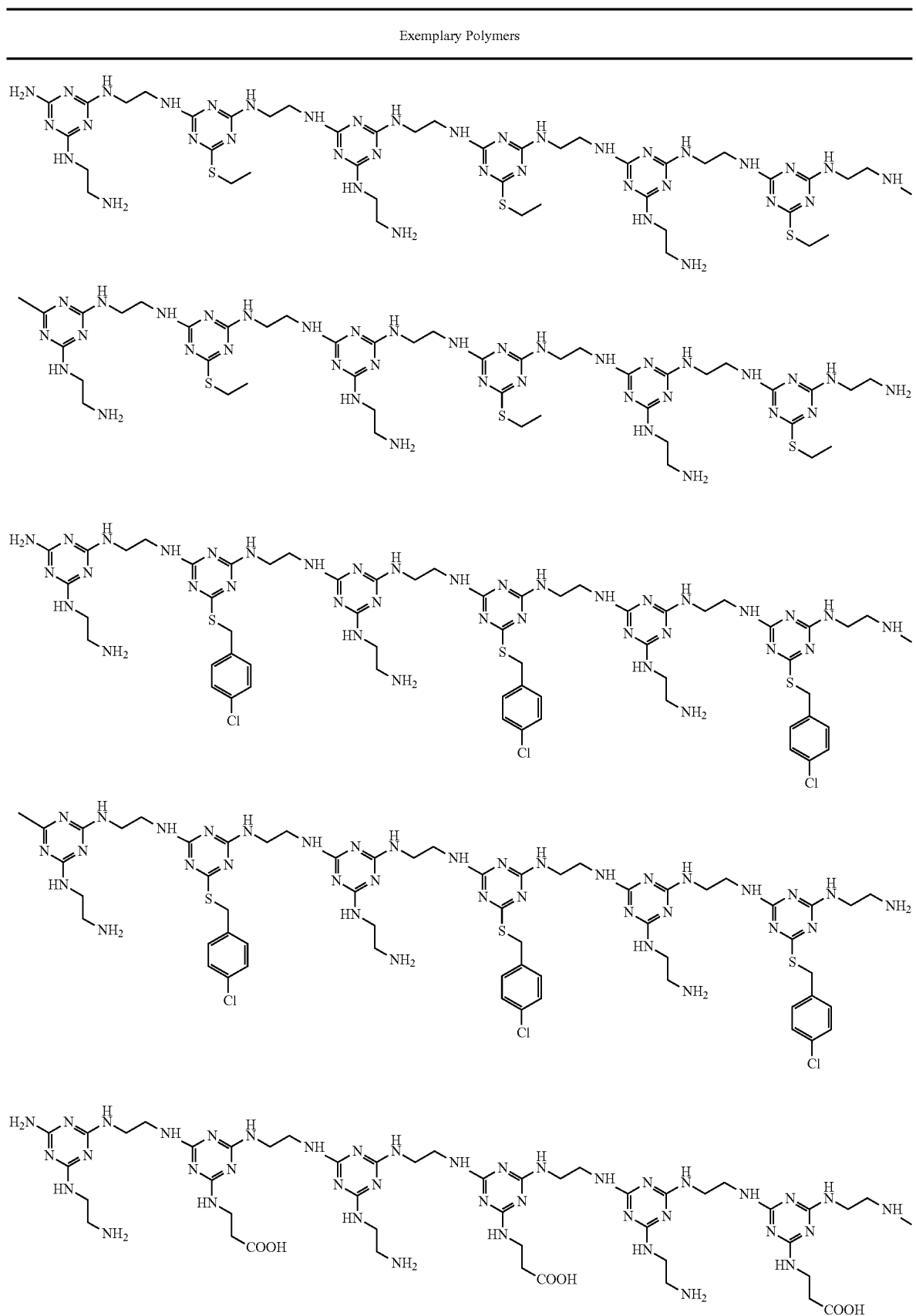

TABLE 1-continued
Exemplary Polymers

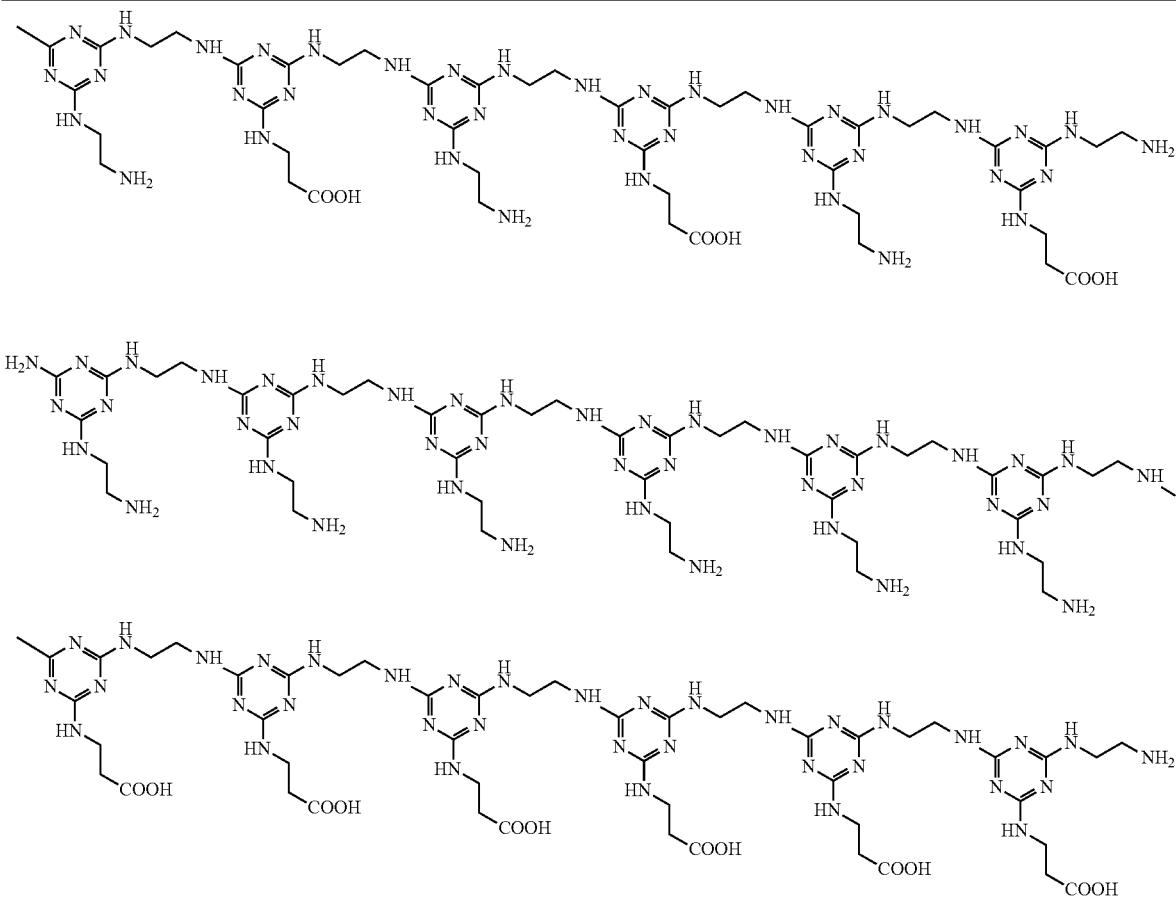

III. STARTING MATERIALS, MOLECULAR PRECURSORS, SUBMONOMERS, AND MOLECULAR MONOMERS

In particular disclosed embodiments, starting materials can be used to make molecular precursors and/or submonomers that are used to make the monomer units of the polymers disclosed herein.

In particular disclosed embodiments, starting materials comprise a core with multiple reactive groups, which can be the same or different. Suitable starting materials have the property that reaction of one reactive group renders the remaining group or groups substantially less reactive. In this way, the starting material can be selectively be monosubstituted in a first reaction and then subsequently monosubstituted in a second reaction, and so on. The reaction can constitute using more rigorous conditions, such as a rise in temperature or use of a stronger reagent. More rigorous conditions are then required to act on the remaining reactive group or groups. Solely by way of example, a starting material comprising three reactive groups, such as multiple halogen atoms, can be selectively functionalized by first reacting one of the halogen atoms at a temperature ranging from −25° C. to 5° C. Upon raising the temperature to 18° C. to 40° C., a second halogen atom can be displaced. Temperatures greater than 70° C. (e.g., 70° C. to 140° C., 70° C. to 120° C., or 70° C. to 100° C.) can then be used to substitute a third halogen atom with a nucleophile. These temperatures ranges are exemplary and can vary with the particular starting material used. The reactivity of the starting material also can be conducted under nucleophilic substitution-type conditions or electrophilic substitution-type conditions. For example, nucleophilic substitution-type conditions involve using a nucleophile, such as a sulfur-containing nucleophile (e.g., —S-(hetero)alkyl, —S-(hetero)alkenyl, —S-(hetero)alkynyl, —S-(hetero)aryl, —S-(hetero)alkyl(hetero)aryl, —S-(hetero)alkenyl(hetero)aryl, —S-(hetero)alkynyl(hetero)aryl), an amine-containing nucleophile (e.g., —NR$^3$-(hetero)alkyl, —NR$^3$-(hetero)alkenyl, —NR$^3$-(hetero)alkynyl, —NR$^3$-(hetero)aryl, —NR$^3$-(hetero)alkyl(hetero)aryl, —NR$^3$-(hetero)alkenyl(hetero)aryl, —NR$^3$-(hetero)alkynyl(hetero)aryl), a hydroxyl-containing nucleophile (e.g., —O— (hetero)alkyl, —O-(hetero)alkenyl, —O-(hetero)alkynyl, —O-(hetero)aryl, —O-(hetero)alkyl(hetero)aryl, —O-(hetero)alkenyl(hetero)aryl, —O-(hetero)alkynyl(hetero)aryl), or a carbon-based nucleophile (e.g., alkyl-MgBr, alkylaryl-MgBr, alkenyl-MgBr, or alkynyl-MgBr) to displace a reactive group of the starting material. In electrophilic substitution-type conditions, the starting material reacts with a suitable electrophile to replace the reactive groups on the starting material.

In particular disclosed embodiments, the starting material satisfies Formula 9, illustrated below.

Formula 9

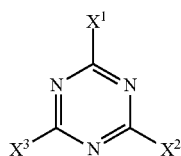

With reference to Formula 9, each of $X^1$, $X^2$, and $X^3$ is a reactive group that can be substituted using nucleophilic substitution-type conditions or electrophilic substitution-type conditions. For example, under nucleophilic substitution-type conditions, each reactive group $X^1$, $X^2$, and $X^3$ independently is a leaving group selected from a halogen, a perfluoroalkylsulfonate, a sulfonate, or a carboxylate. In some embodiments, each of $X^1$, $X^2$, and $X^3$ independently can be selected from bromo, fluoro, chloro, iodo, triflate, tosylate, mesylate, besylate, or —OCOalkyl (e.g., —OCOMe, —OCOEt, —OCOiPr). These reactive groups are then sequentially displaced with a nucleophile selected from a thiol, an amine, an alcohol, or a carbon-based nucleophile (e.g., a Grignard reagent). In some embodiments, an increase in temperature or addition of base can be used to facilitate nucleophilic displacement of the reactive groups. Under electrophilic substitution-type conditions, an electrophile is reacted with the starting material and a Lewis acid to facilitate addition of the electrophile to the core of the starting material. Removal of a reactive group, typically a hydrogen atom, is then facilitated with a base, thereby restoring aromaticity to the starting material core. Exemplary electrophiles include alkene-containing or alkyne-containing compounds, sulfuric acid, or an acyl-containing compound.

In exemplary embodiments, the starting material can be cyanuric chloride (or 2,4,6-trichloro-1,3,5-triazine), which has the structure illustrated below.

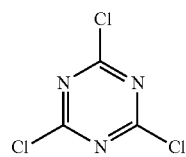

In some embodiments, reactions on the starting material that add side chains, linker segments, terminal groups, or combinations thereof, can be used to create molecular precursors and/or submonomers. Molecular precursors typically comprise at least one reactive group that has not been substituted (or replaced). In some embodiments, molecular precursors can comprise additional atoms or functional groups that are lost in bond forming reactions to thereby form monomer units when the polymer chain is assembled. Molecular precursors and submonomers can be used to form repeat monomer units within a polymer chain. A repeat monomer unit is referred to herein as a monomer unit (or combination of monomer units) of a polymer that repeats within the polymer chain. In some embodiments, a repeat monomer unit can refer to the core of a monomer unit of a polymer chain (for example, a core ring A as illustrated in Formula 1, or, with reference to Formulas 2-6 or Formula 8, a triazine ring). In such embodiments, the repeat monomer unit may have the same core, but can vary from other repeat monomer units in the polymer chain by variations in the side chain, terminal group, and/or linker groups of the repeat monomer unit structure. In other embodiments, a repeat monomer unit can be an entire monomer unit within a polymer chain, such as would be the case with a homopolymer, such as that illustrated in Formula 7.

In exemplary embodiments, submonomers can have structures that satisfy Formula 10.

Formula 10

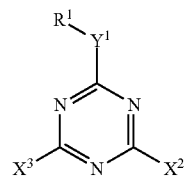

With respect to Formula 10, the starting material is monosubstituted with a side chain group, indicated by R—Y, thereby forming a submonomer having a side chain that will be pendant to a polymer formed with the submonomer. In some embodiments the side chain may be a single atom or group of atoms. In some embodiments, the side chain structure can be an atom or group of atoms derived from any molecule or reagent that can displace (or replace) a reactive group from the starting material, and so become covalently attached. In exemplary embodiments, each of $X^2$, $X^3$, $Y^1$, and $R^1$ can be as recited herein. In some embodiments, if $Y^1$ is NH, then $R^1$ is other than, or is not H. In some other embodiments, if $Y^1$ is $NR^4$, wherein $R^4$ is a butyl group, then $R^1$ is other than, or is not, a butyl group.

In some embodiments, heteroatoms in the side chain may be coupled (e.g., covalently or electrostatically coupled) to a protecting group that renders the heteroatoms unreactive under the conditions of polymer synthesis. Suitable protecting groups can be selected from protecting groups known in the art, such as those disclosed by Greene & Wuts, *Protective Groups in Organic Synthesis*, 4*th* Edition, John Wiley & Sons, Inc., New York (2007), the relevant portion of which (e.g., sections discussing nitrogen, oxygen, sulfur, and phosphorus protecting groups) is incorporated herein by reference. In embodiments of submonomers or molecular precursors wherein nucleophilic displacement is used to couple a side chain to the starting material, the side chains are attached by atoms of the Y from nucleophilic molecules, such as but not limited to N, S, or O present in amines, thiols, or alcohols, respectively. In some embodiments, the side chain is attached by a Y group wherein Y is coupled to the starting material through a carbon atom using nucleophilic conditions and carbon nucleophiles, such as but not limited Grignard reagents or alkyl lithium reagents. In some embodiments, a molecular precursor or submonomer comprising a single side chain can be used as a precursor in polymer synthesis. Exemplary submonomers comprising side chains are illustrated below in Table 2.

TABLE 2
Exemplary Submonomers having Side Chains
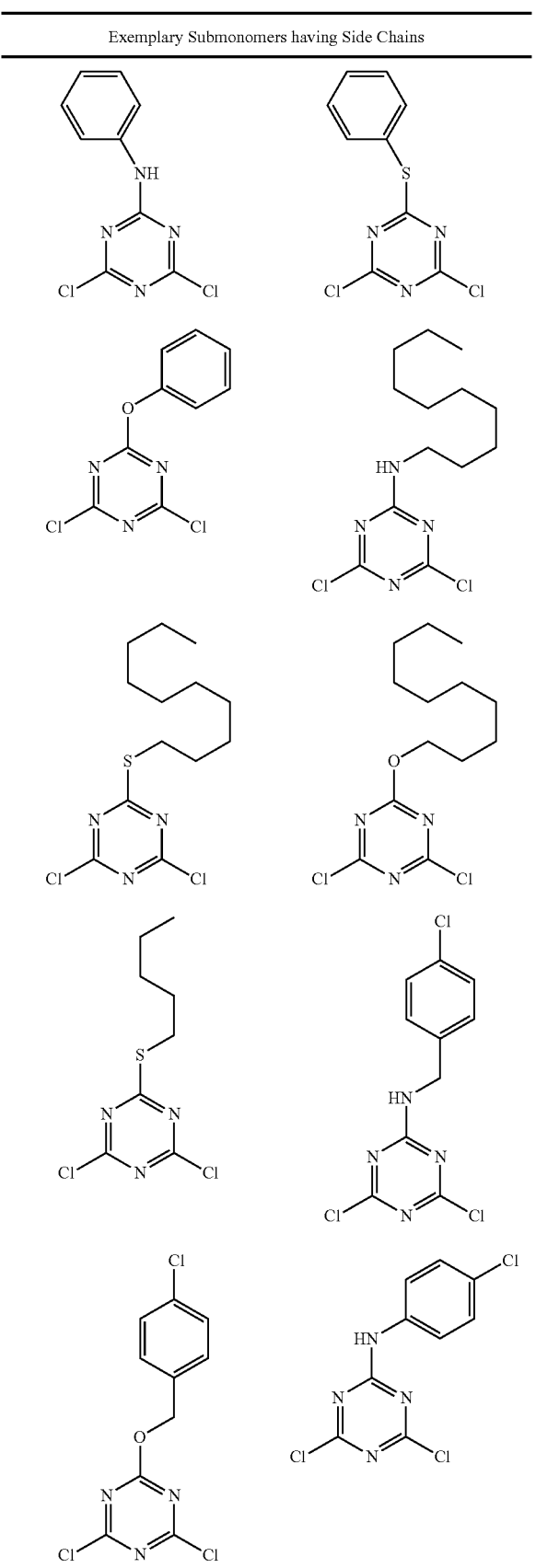
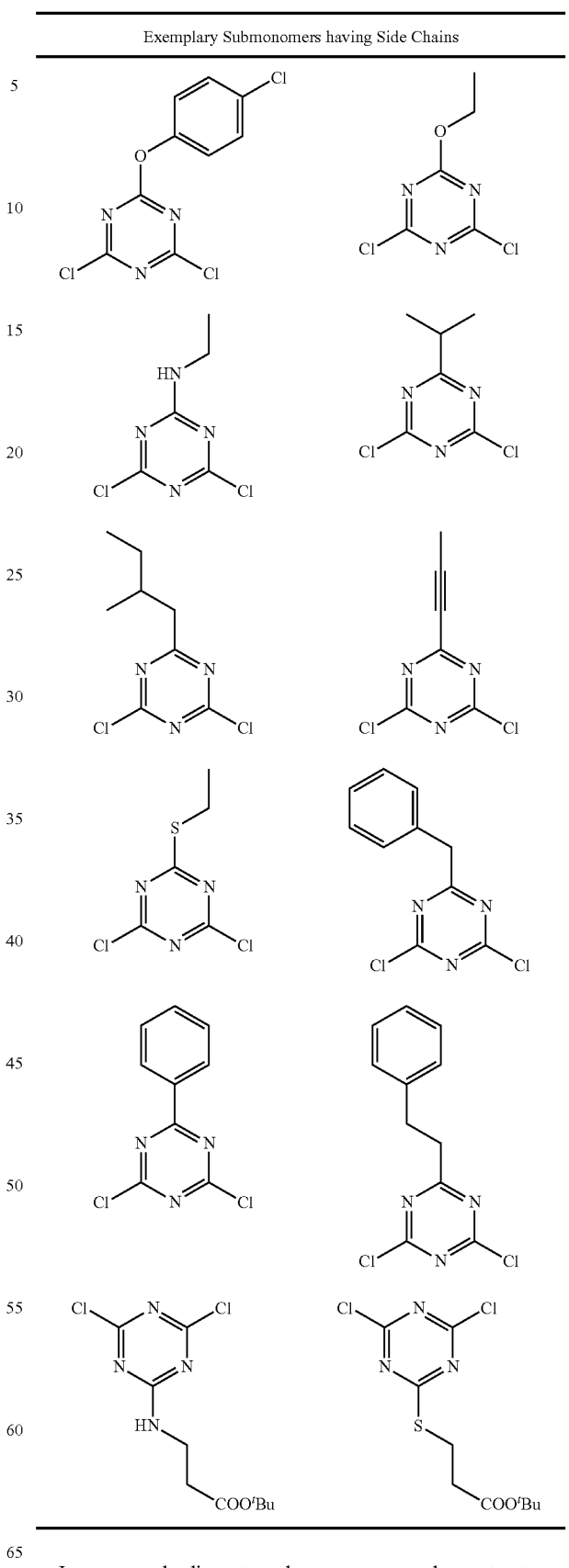
In some embodiments, submonomers can have structures satisfying Formula 11, illustrated below.

Formula 11

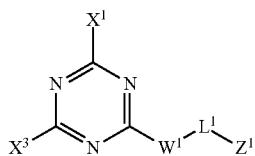

With reference to Formula 11, the starting material is monosubstituted with a linker group (e.g., $W^1$-$L^1$-$Z^1$) thereby forming another embodiment of a submonomer. In some embodiments, each of $X^1$, $X^3$, $W^1$, $L^1$ are as recited herein. $Z^1$ can be as indicated previously, but when $Z^1$ is not part of a polymer chain as illustrated in Formula 10 (or any of the subsequent formulas), $Z^1$ is terminated with an atom or functional group that can be removed upon reaction with another molecular precursor or submonomer to thereby form a covalent linkage. For example, $Z^1$ can be terminated with one or more hydrogen atoms or protecting groups. Exemplary submonomers comprising linkers are illustrated below in Table 3.

TABLE 3

Exemplary Submonomers Comprising Linker Groups

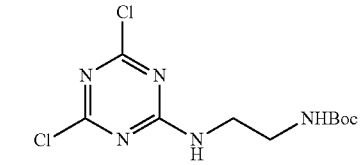 [SMILES: CC(C)(C)OC(=O)NCCNc1nc(Cl)nc(Cl)n1]

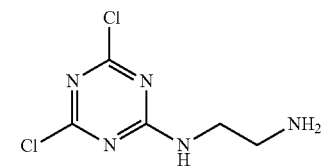 [SMILES: NCCNc1nc(Cl)nc(Cl)n1]

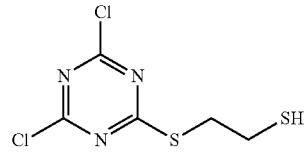 [SMILES: SCCSc1nc(Cl)nc(Cl)n1]

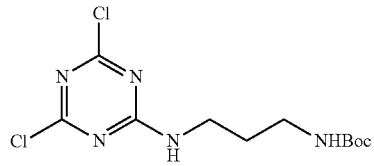 [SMILES: CC(C)(C)OC(=O)NCCCNc1nc(Cl)nc(Cl)n1]

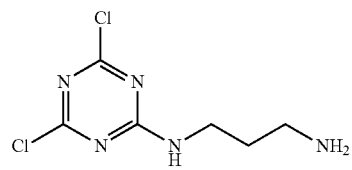 [SMILES: NCCCNc1nc(Cl)nc(Cl)n1]

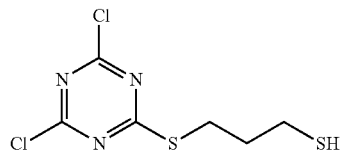 [SMILES: SCCCSc1nc(Cl)nc(Cl)n1]

TABLE 3-continued

Exemplary Submonomers Comprising Linker Groups

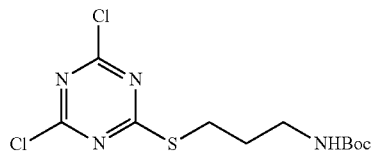 [SMILES: CC(C)(C)OC(=O)NCCCSc1nc(Cl)nc(Cl)n1]

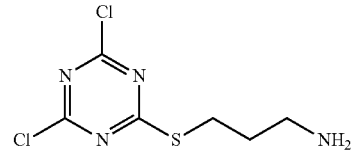 [SMILES: NCCCSc1nc(Cl)nc(Cl)n1]

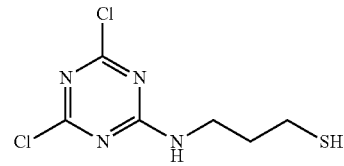 [SMILES: SCCCNc1nc(Cl)nc(Cl)n1]

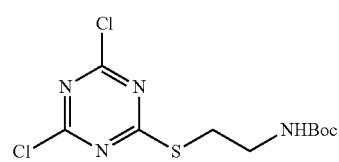 [SMILES: CC(C)(C)OC(=O)NCCSc1nc(Cl)nc(Cl)n1]

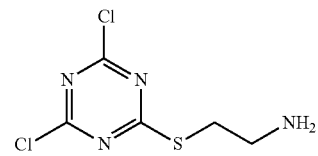

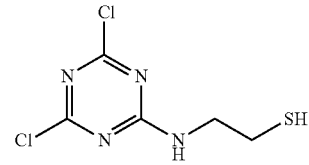 [SMILES: SCCNc1nc(Cl)nc(Cl)n1]

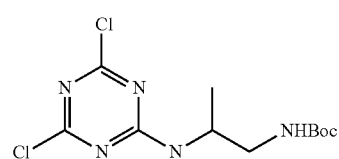

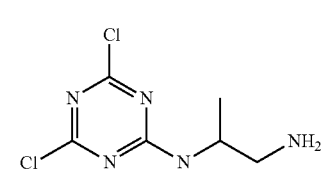

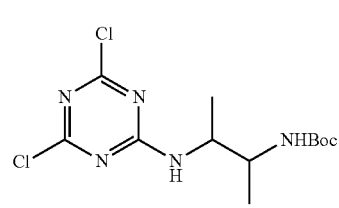 [SMILES: CC(NC(=O)OC(C)(C)C)C(C)Nc1nc(Cl)nc(Cl)n1]

TABLE 3-continued

Exemplary Submonomers Comprising Linker Groups

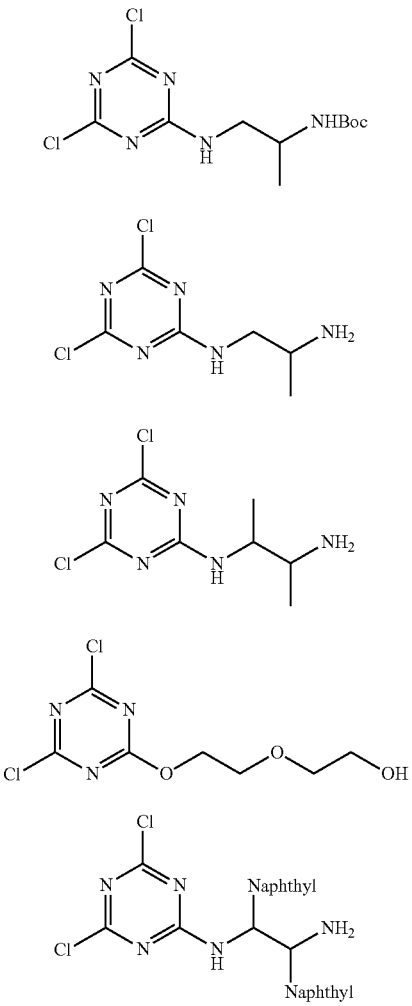

TABLE 4

Exemplary Linker Groups

A linker group comprises a sequence of atoms that will join the cores in two consecutive monomers in the polymer. As illustrated in Formula 1, the linker sections can be used to join two rings, such as the triazine rings of Formulas 2-8, and become part of the overall backbone of the final polymer. In the molecular precursors or submonomers disclosed herein, the linker group can be a $W^1$-$L^1$-$Z^1$ group, wherein $L^1$ is coupled to an additional atom or functional group, namely $W^1$, which links $L^1$ to the molecular precursor or the submonomer. $L^1$ also can be coupled to $Z^1$, which functions as a nucleophile (or electrophile) to attach one molecular precursor or submonomer to another molecular precursor or submonomer. In some embodiments, the two ends of each linker section (e.g., $W^1$ and $Z^1$) can be the same or different. Exemplary linker groups are illustrated in Table 4.

TABLE 4-continued

Exemplary Linker Groups

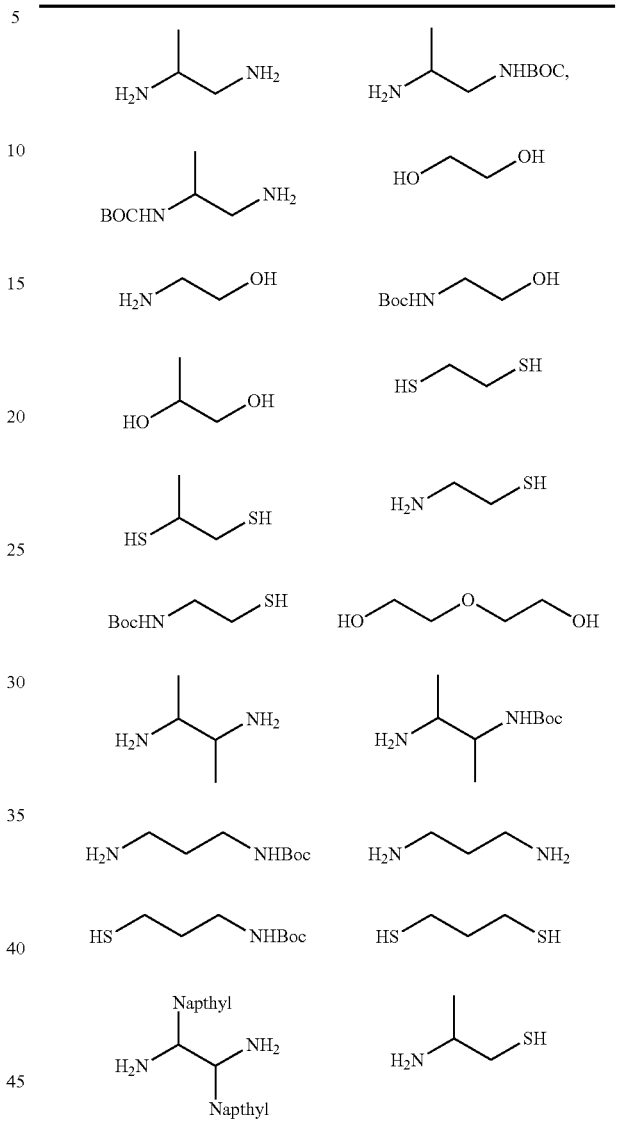

In yet additional embodiments, submonomers can have structures satisfying Formula 12. Such submonomers comprise a terminal group, T, which can be as defined above.

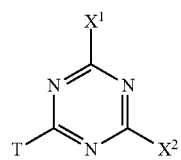

Formula 12

Molecular precursors disclosed herein can comprise a combination of a side chain and linker moieties, and can have structures satisfying Formula 13. In some polymer embodiments, these molecular precursors will become monomer units in the polymer chain, as described above.

Formula 13
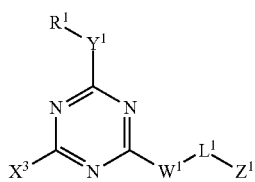
With reference to Formula 13, each of $R^1$, $Y^1$, $X^3$, $W^1$, $L^1$ and $Z^1$ can be as recited herein. Examples of molecular precursors and molecular monomers are shown in Table 5.
TABLE 5
Exemplary Molecular Precursors having Side Chains and Linker Groups
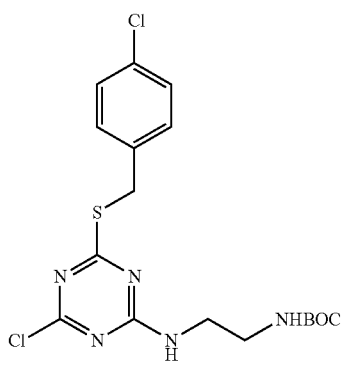
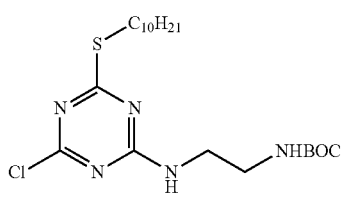
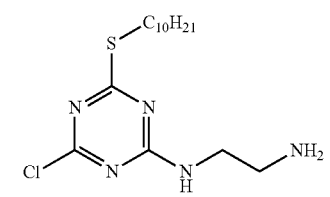
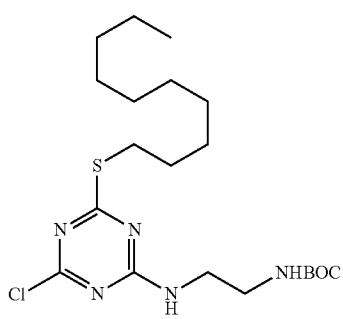
TABLE 5-continued
Exemplary Molecular Precursors having Side Chains and Linker Groups
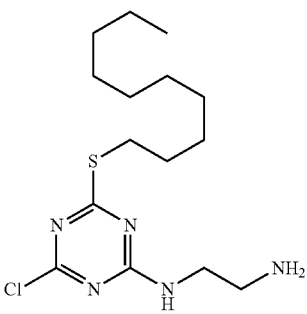 [SMILES: CCCCCCCCCCSc1nc(Cl)nc(NCCN)n1]
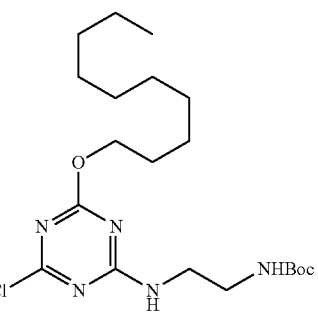
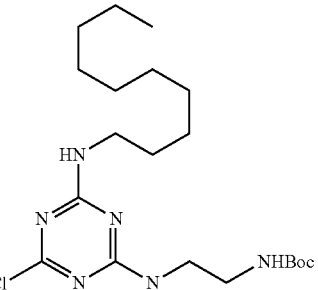
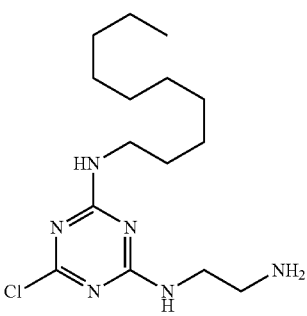 [SMILES: CCCCCCCCCCNc1nc(Cl)nc(NCCN)n1]
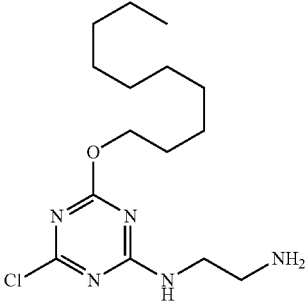 [SMILES: CCCCCCCCCCOc1nc(Cl)nc(NCCN)n1]

TABLE 5-continued
Exemplary Molecular Precursors having Side Chains and Linker Groups
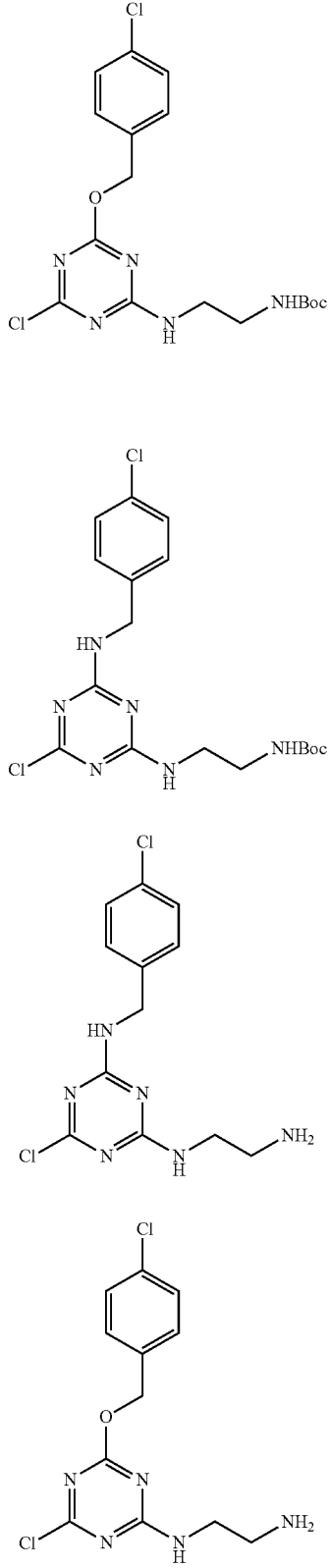
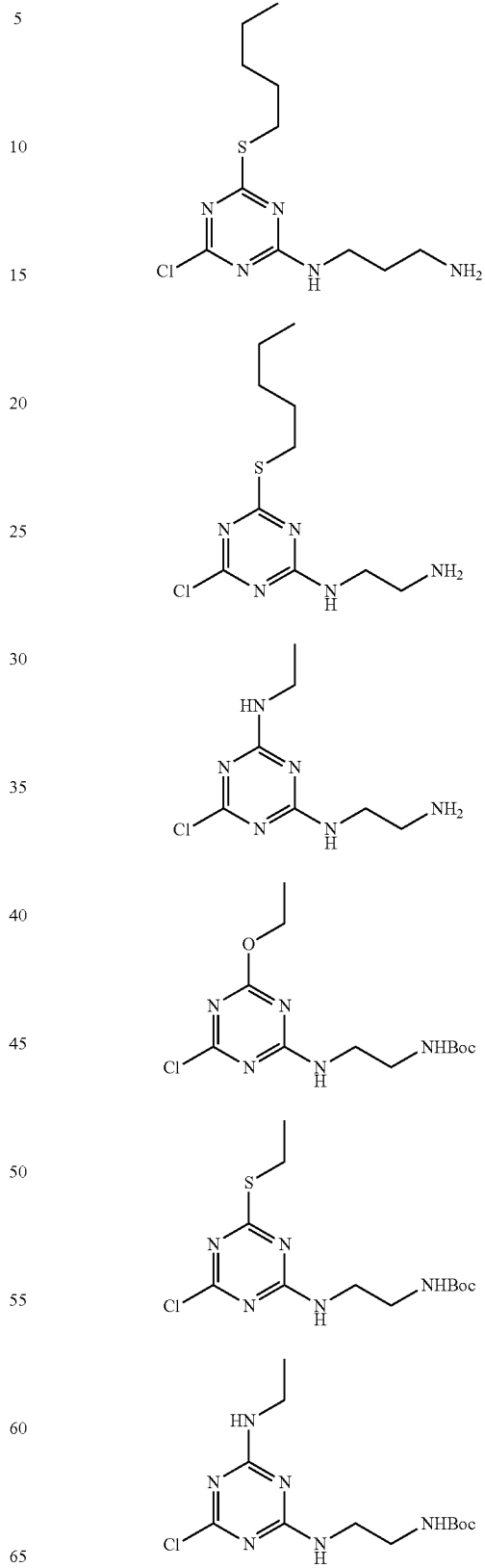

TABLE 5-continued

Exemplary Molecular Precursors having Side Chains and Linker Groups

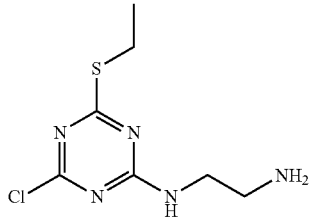

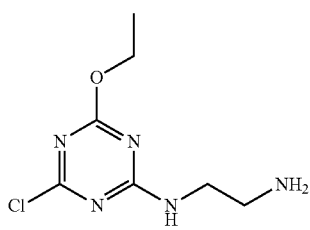

In yet additional embodiments, molecular precursors can have combinations of side chains and terminal groups, or terminal groups and linkers, as illustrated below in Formulas 14 and 15, respectively.

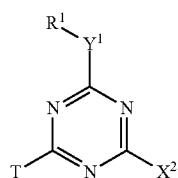

Formula 14

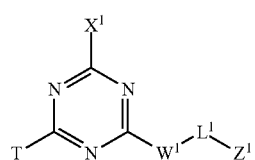

Formula 15

In additional embodiments, the molecular precursors can be further functionalized to form molecular monomers having structures satisfying Formulas 16, 17, or 18.

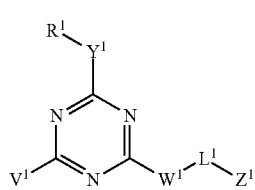

Formula 16

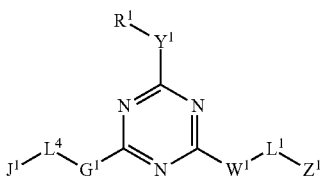

Formula 17

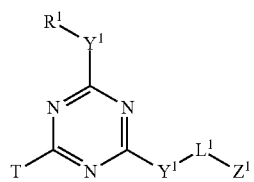

Formula 18

With reference to Formula 16, a reactive group (e.g., $X^3$) is substituted (or functionalized) with $V^1$, which can be an atom or functional group that becomes covalently linked to another molecular precursor or submonomer to form a polymer backbone. In particular disclosed embodiments, $V^1$ can be a $J^1$-$L^4$-$G^1$ group, as illustrated in Formula 17. The reaction of $J^1$ with a $Z^1$ group of another molecular precursor or submonomer can result in forming a covalent bond to form a polymer backbone. With reference to Formula 17, $G^1$ can be a heteroatom selected from O, N, S, or P, or $G^1$ can be a single bond to $L^4$; $L^4$ can be selected from any one of the atoms or groups disclosed for $L^1$, $L^2$, or $L^q$; and $J^1$ can be terminal alkenyl or alkynyl group, or a thiol or azide capable of reacting with $Z^1$. In exemplary embodiments, $J^1$ can be a double bond and $Z^1$ could be a thiol, or $J^1$ could be a triple bond and $Z^1$ could be an azide. Alternatively, $Z^1$ can be a double bond and $J^1$ could be a thiol, or $Z^1$ could be a triple bond and $J^1$ could be an azide.

With reference to any one of Formulas 12, 14, 15, or 18, the terminal group can be present on the submonomer, molecular precursor, or molecular monomer before the assembly of the polymer. Terminal groups present at the beginning of polymer synthesis typically are unreactive under the polymer forming reaction conditions disclosed herein. In some embodiments, a terminal group can be a group provided upon completion of polymer synthesis. In some embodiments, a terminal group can be provided upon completion of polymer synthesis by cleaving an assembled polymer from a solid support. After the polymer is cleaved from the solid support, the terminal group may be the atom or functional group remaining on the terminus of the polymer after cleavage. Exemplary structures with terminal groups are provided in Table 6.

TABLE 6

Exemplary Submonomers, Molecular Precursors, and Molecular Monomers Comprising Terminal Groups

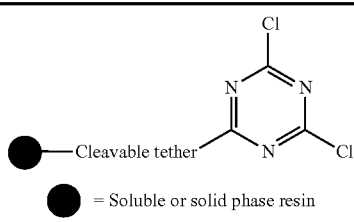

● = Soluble or solid phase resin

TABLE 6-continued
Exemplary Submonomers, Molecular Precursors, and Molecular Monomers Comprising Terminal Groups
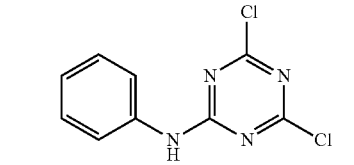 [SMILES: Clc1nc(Cl)nc(Nc2ccccc2)n1]
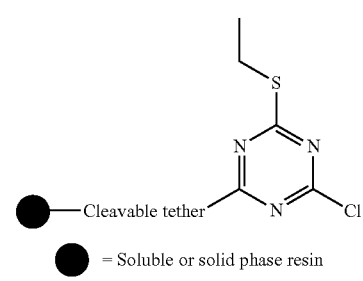
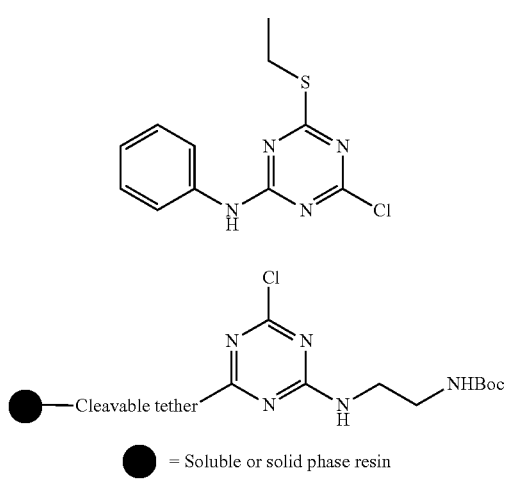
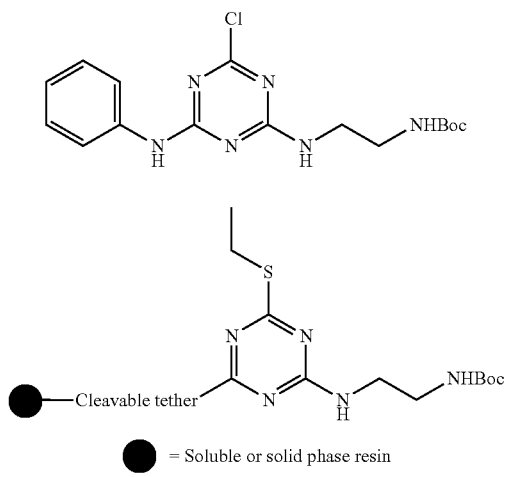
TABLE 6-continued
Exemplary Submonomers, Molecular Precursors, and Molecular Monomers Comprising Terminal Groups
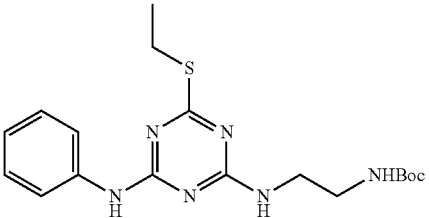 [SMILES: CCSc1nc(NCCNC(=O)OC(C)(C)C)nc(Nc2ccccc2)n1]
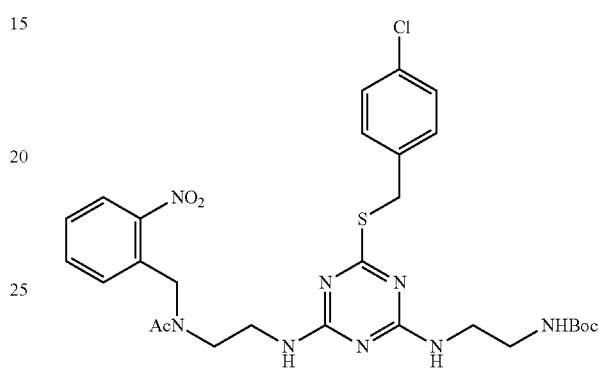
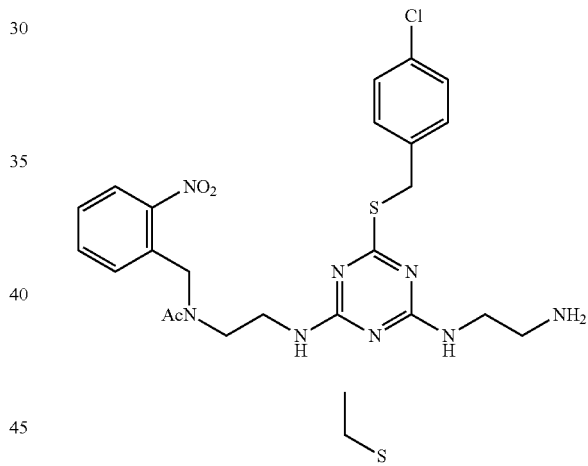
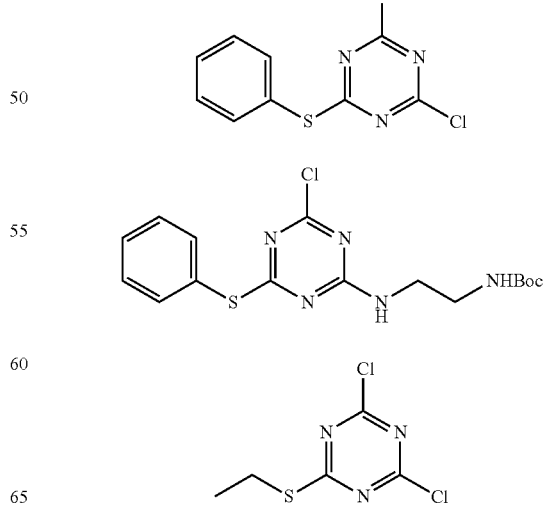

TABLE 6-continued

Exemplary Submonomers, Molecular Precursors, and Molecular Monomers Comprising Terminal Groups

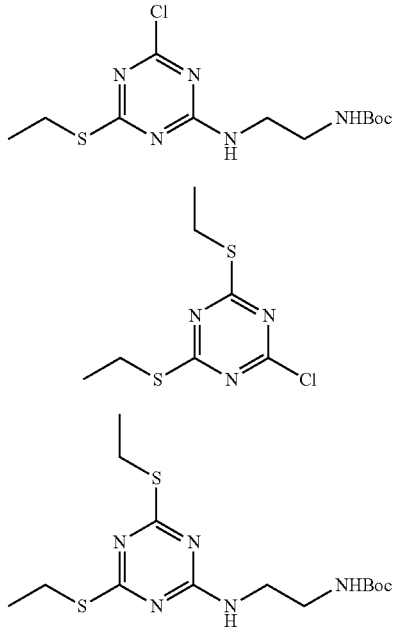

IV. METHODS OF MAKING POLYMERS

Disclosed herein are methods of making unique polymers that can be used for a variety of applications, such as materials science applications, bioenergy applications, nanotechnology, separation science, membranes, molecular recognition, assays, chemical or biomolecular sensors, biomedical therapy, pharmaceuticals, catalysis, and/or information storage. These method embodiments can comprise making sequence-defined polymers wherein the polymer chain comprises three or more structurally different monomer units in a predetermined sequence. In such embodiments, the polymer is of a defined length resulting from the predetermined number of monomer units in the sequence and can comprise terminal groups on each end. In some embodiments, the methods disclosed herein can be used to make any of the polymers described herein (e.g., sequence-defined polymers, block copolymers, sequence-controlled polymers, and/or homopolymers). In particular disclosed embodiments, the methods disclosed herein are used to make heteropolymers or homopolymers that have a defined length and therefore are monodisperse, or substantially monodisperse.

The methods disclosed herein are distinguished from conventional batch polymerizations that can produce repeating patterns but that do not produce polymers having a defined length, and are therefore polydisperse polymers.
Conventionally, making monomer components that can be assembled into sequence-defined polymers having multiple different repeat monomer units in the sequence is very challenging and conventional methods do not provide the same control over polymer length, identity, and/or purity as the methods disclosed herein.

It has been discovered that the novel polymers disclosed herein can be made of a particular length and/or to have a pre-determined sequence using the molecular precursors, submonomers, and/or molecular monomers disclosed herein.

In some embodiments, the molecular precursors, submonomers, and/or molecular monomers comprise at least two points of attachment that can be used to form bonds to produce the polymer backbone. Also, the molecular precursors, submonomers, and/or molecular monomers comprise additional features that allow variation of the monomer units or repeat monomer units of the polymer. In some embodiments, an additional feature can be a reactive group that can be displaced or replaced with a side chain that can be used to distinguish one monomer unit from another and also contribute to the ultimate unique functional properties of the polymers. Accordingly, it has been discovered that starting materials comprising multiple reactive sites (e.g., three reactive sites) can be used. Given the level of difficulty in controlling the degree of substitution to obtain different substituents on each of the multiple reactive sites, traditional methods of making monomers with three different reactive sites make complex mixtures that are difficult to separate and thereby reduces overall yield of the components used to make polymers.

The methods of making polymers using the submonomers, molecular precursors, and/or molecular monomers disclosed herein, however, surprisingly solve the problems that have long plagued traditional methods for making tri-functional compounds and polymers of such compounds. In particular disclosed embodiments, combinations of temperature and reagent control can be used to make the submonomers, molecular precursors, and/or molecular monomers and also to make polymers comprising such components. The polymer components disclosed herein can be made using starting materials that contain three reaction sites, which are sequentially reactive with excellent control. These starting materials are selected to have the reactivity discussed herein, with particular examples being found available commercially (or are otherwise readily available from commercially available starting materials) and also are inexpensive in comparison with alternative molecular precursors traditionally used in the art. Additionally, this chemistry can be used to assemble polymers by submonomer methods, in addition to chain extension with protected molecular precursors followed by deprotection.

The starting materials, submonomers and molecular precursors used in polymer synthesis can comprise at least one reactive groups that is less reactive than at least one other reactive group. For example, the starting materials disclosed herein comprise three reactive groups, each of which becomes less reactive as each substitution (or replacement) of such groups occurs. Thus, the sequential reactivity of the reactive groups, and therefore polymer formation, can be controlled by modifying reaction conditions, such as by increasing the temperature of the reaction and/or using a more reactive reagent (or reagents) to convert the reactive groups to a different chemical moiety. In some embodiments, a higher reaction temperature can be a temperature that is higher than that used to convert a previous reactive group. In yet other embodiments, reactive conversion materials can be used to convert a subsequent reactive group to a different functional group, as compared with that used for a previous reactive group. These methods embodiments represent a unique way to obtain a vast library of submonomers, molecular precursors, and/or molecular monomers having the functionalities needed to make the polymers disclosed herein and thereby enable multiple approaches to assembly of polymers having useful functionality. The versatility of these novel methods in creating unique functional polymers of myriad varieties is illustrated in the methods of making polymers disclosed below.

In some embodiments, the methods disclosed herein can comprise coupling, at a first temperature, a first position of a first starting material with a terminal group; coupling, at a second temperature, a second position of the first starting material with a linker group or a side chain group; coupling, at a third temperature, a third position of the first starting material with a linker group or a side chain group to form a first monomer unit of the polymer; coupling, at the first temperature, the first monomer unit of the polymer with a first position of a second starting material; coupling, at the second temperature, a second position of the second starting material with a linker group or a side chain group; coupling, at the third temperature, a third position of the second starting material with a linker group or a side chain group to form a second monomer unit of the polymer; coupling, at the first temperature, the second monomer unit of the polymer with a first position of a third starting material; coupling, at the second temperature, a second position of the third starting material with a linker group or a side chain group; and coupling, at the third temperature, a third position of the third starting material with a linker group or a side chain group to form a third monomer unit of the polymer; wherein the polymer has a formula according to any one of Formulas 2-8. In some embodiments, the linker group comprises a protecting group and the method further comprises exposing the linker group to an acid or a base to remove the protecting group. In some embodiments, the terminal group comprises a solid support and the method further comprises exposing the polymer to an acid to remove the solid support.

In other embodiments, the methods disclosed herein can comprise making a heteropolymer. Such embodiments can comprise coupling a first position of a first molecular precursor comprising a first side chain, a first linker group, or both with a terminal group; coupling a second position of the first molecular precursor with a second molecular precursor comprising a second side chain, a second linker group, or both thereby forming a covalent bond between the first molecular precursor and the second molecular precursor; and coupling the second molecular precursor with a third molecular precursor comprising a third side chain, a third linker group, or both thereby forming a covalent bond between the second molecular precursor and the third molecular precursor; wherein the first side chain is different from one or both of the second side chain or the third side chain, and wherein the heteropolymer has a formula according to any one of Formulas 2-8. In some embodiments, each of the first linker group, the second linker group, and the third linker group comprises a protecting group and the method further comprises exposing the protecting group to an acid or a base to facilitate coupling the first molecular precursor, the second molecular precursor, and the third molecular precursor. In some embodiments, the terminal group comprises a solid support, and the method further comprises exposing the solid support to an acid to cleave the solid support from the terminal group.

In yet other embodiments, the methods can comprise selecting a first submonomer, a second submonomer, and a third submonomer, wherein at least two of the first, second or third submonomers are different; coupling the first submonomer, the second submonomer, and the third submonomer with one of a terminal group, a linker group, or a side chain; and coupling the first submonomer, the second submonomer, and the third monomer to form a polymer having a formula according to any one of Formulas 2-8. 31. In some embodiments, the linker group comprises a protecting group and the method further comprises exposing the protecting group to an acid or base to remove the protecting group. In some embodiments, the terminal group comprises a solid support and the method further comprises exposing the solid support to an acid to cleave the solid support from the terminal group. In some embodiments, the method further comprises coupling the first submonomer, the second submonomer, and the third submonomer in a nonrandom sequence that is selected before making the polymer. The first submonomer can be coupled to the terminal group and the linker group. In some embodiments, the first submonomer is coupled to the second submonomer through the linker group. The second submonomer can be coupled to another linker group and the linker group is subsequently coupled to the third submonomer. In any of the disclosed embodiments, the method can further comprise terminating polymerization, such as by cleaving a polymer from a solid support or exposing the polymer chain to a terminal group that prevents further polymerization.

Scheme 1 illustrates exemplary methods that can be used to produce submonomers, molecular precursors, molecular monomers, and polymers disclosed herein.

Scheme 1

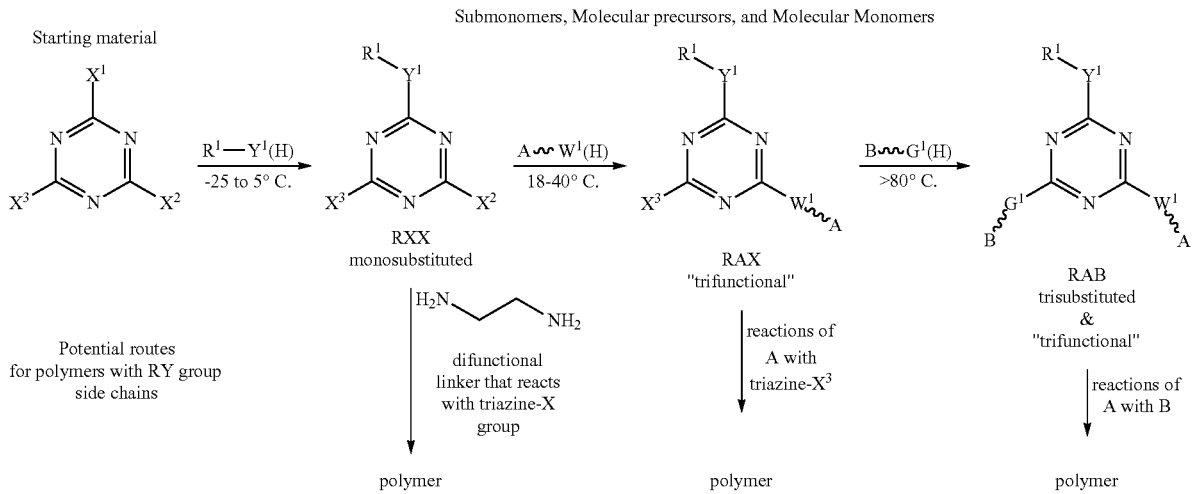

With reference to Scheme 1, a first reactant nucleophile (e.g., $R^1$—$Y^1$(H)) can displace a reactive group (e.g., $X^1$) of the starting material at ice temperature, such as −25° C. to 5° C., and the reaction will stop at monosubstitution, yielding "RXX." Excess nucleophile can be separated from the product before reaction with a second nucleophile at a higher temperature to form "RAX," and so on to form "RAB." In such embodiments, a tri-functional molecule can be constructed around a core with excellent control leading to three different substituents, and such molecules may be used for forming polymer structures.

Exemplary embodiments of the methods summarized in Scheme 1 are illustrated in Scheme 2, below.

adding submonomers or molecular precursors to the growing polymer chain one at a time, or assembling monomer units from starting materials that have been incorporated into the growing polymer chain one at a time. These exemplary synthetic schemes demonstrate different method embodiments contemplated herein.

Schemes 3 and 4 illustrate generalized approaches for sequence-defined polymers. Scheme 3 describes polymer chain extension using a protected molecular precursor followed by deprotection. Scheme 4 describes a submonomer method embodiment without protecting groups wherein two submonomers (e.g., a functionalized starting material and a

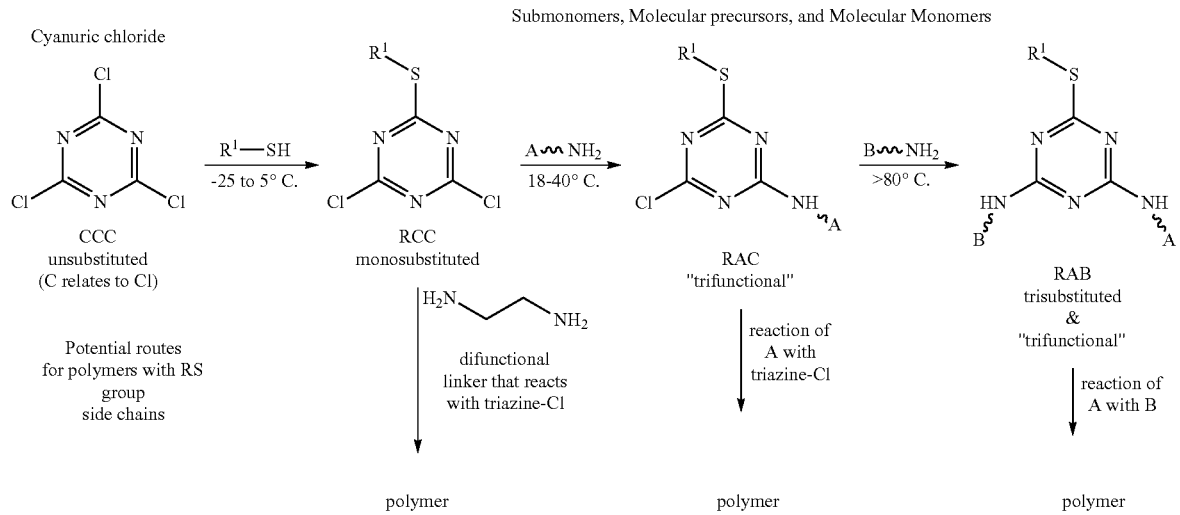

Schemes 1 and 2 illustrate the surprising versatility of this approach for creating submonomers, molecular precursors, and molecular monomers efficiently and with excellent control of substitution to enable creation of polymers. These particular methods can be modified as illustrated below to produce the various different types of polymers disclosed herein. Some embodiments concern making polymers by linker) are combined to form monomer units of a growing polymer chain. As illustrated in Scheme 4, polymerization is initiated by reacting a first submonomer with a terminal group at one temperature and then reacting the combined submonomer with another submonomer (e.g., a linker group) at a higher temperature, thus extending the polymer by one full monomer unit.

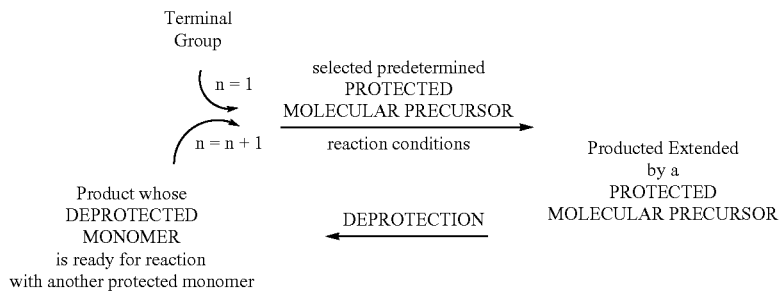

-continued
Scheme 4

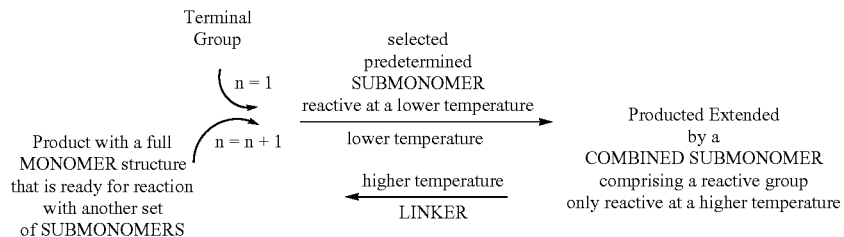

An exemplary embodiment of the method illustrated in Scheme 3 is provided below in Schemes 5A and 5B. Scheme 5A illustrates polymer chain extension by a selected molecular precursor with a side chain $R^n$—$Y^n$ whose linker section containing $L^n$ is protected, followed by deprotection to enable the next step in chain extension. Scheme 5B illustrates a particular disclosed embodiment wherein Y is sulfur and the linker is ethylene diamine.

used. A submonomer comprising a side chain is added to extend the polymer chain. Schemes 6C and 6D illustrate exemplary submonomer methods of making a polymer wherein protecting groups can be used. In Scheme 6C, a linker submonomer comprising a protecting group is added to the growing polymer chain by reacting the protected linker submonomer with a submonomer of the growing polymer Scheme 5A

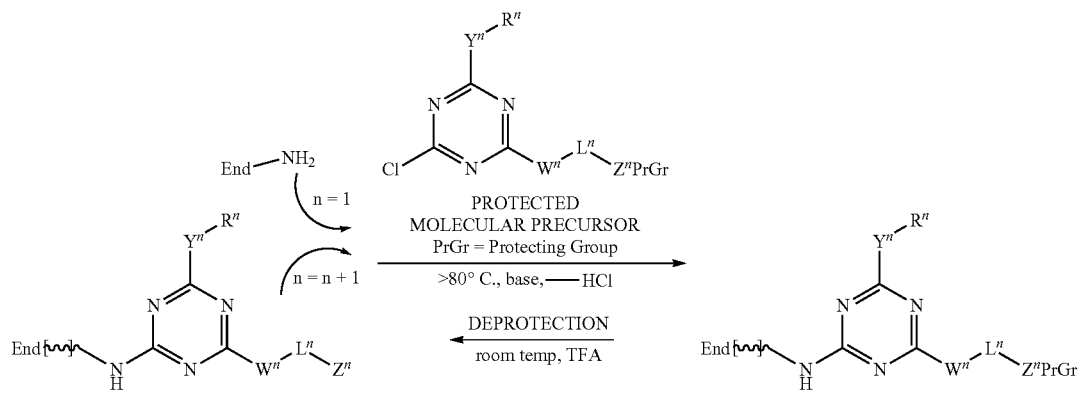

Scheme 5B

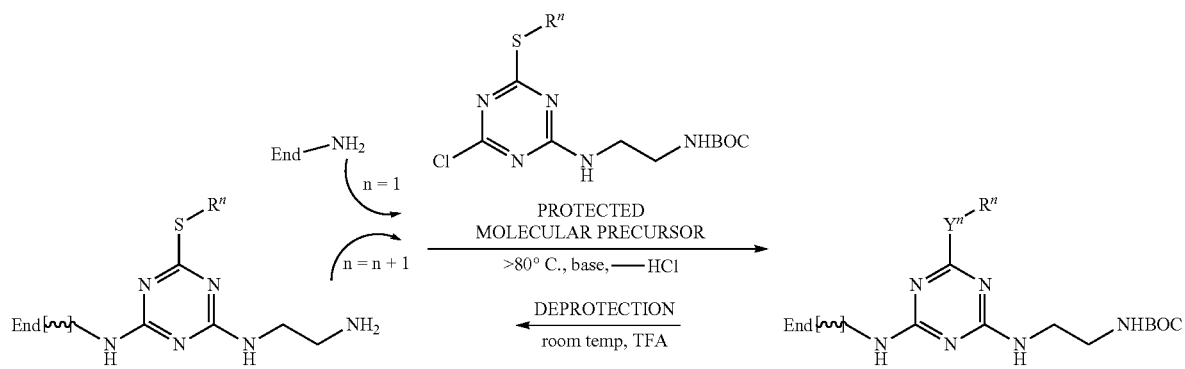

Exemplary embodiments of the submonomer method illustrated in Scheme 4 are illustrated in Schemes 6A-6D. Schemes 6A and 6B illustrate exemplary submonomer methods of making a polymer wherein no protecting groups are chain. In Scheme 6D, a molecular precursor comprising a protected linker group is added to the growing polymer chain and subsequently deprotected to facilitate reaction with another molecular precursor.

Scheme 6A
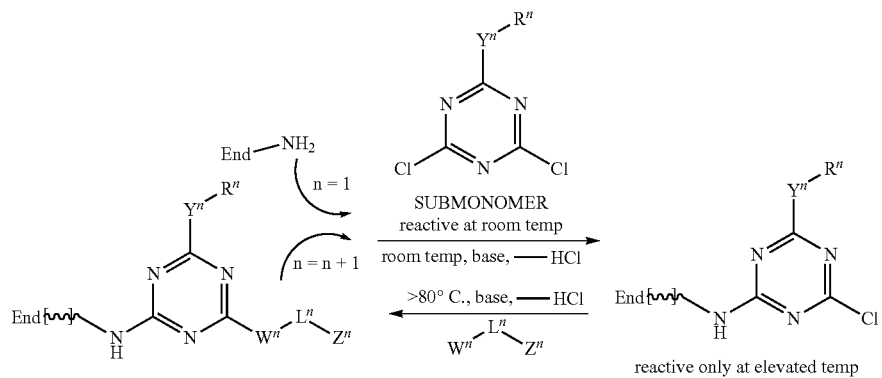
Scheme 6B
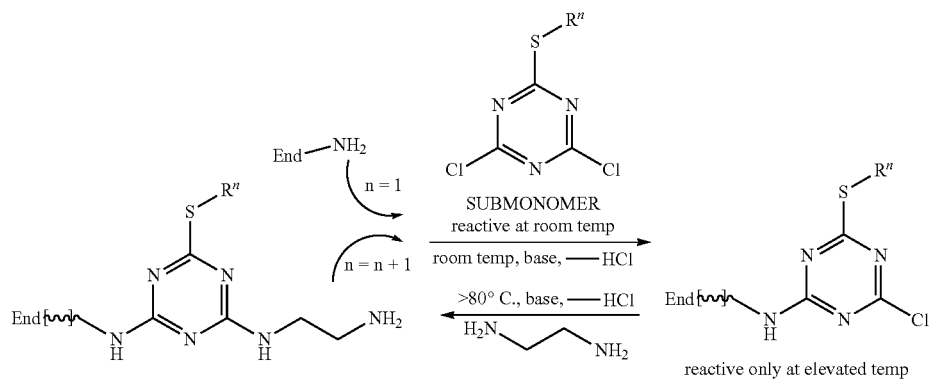
Scheme 6C
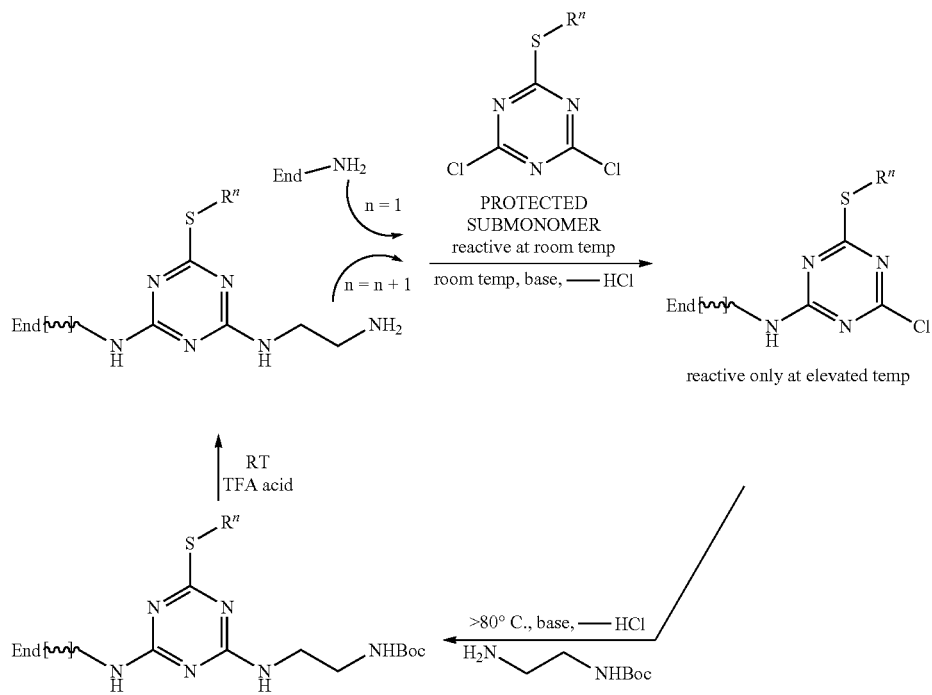

-continued
Scheme 6D

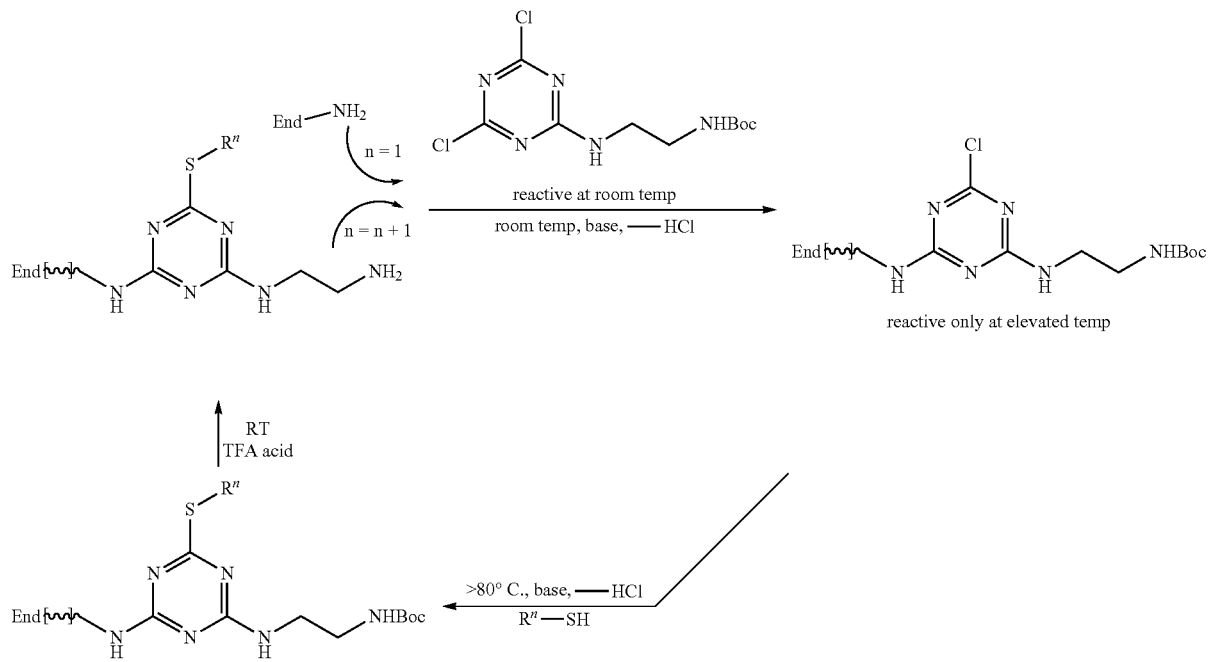

In some embodiments, the methods disclosed herein can comprise using a starting material at the beginning of each polymerization cycle rather than a molecular precursor or a submonomer. Exemplary embodiments are illustrated below in Schemes 7A-7C. As illustrated in Scheme 7B and 7C, these method embodiments can further comprise protection and deprotection steps.

Scheme 7A

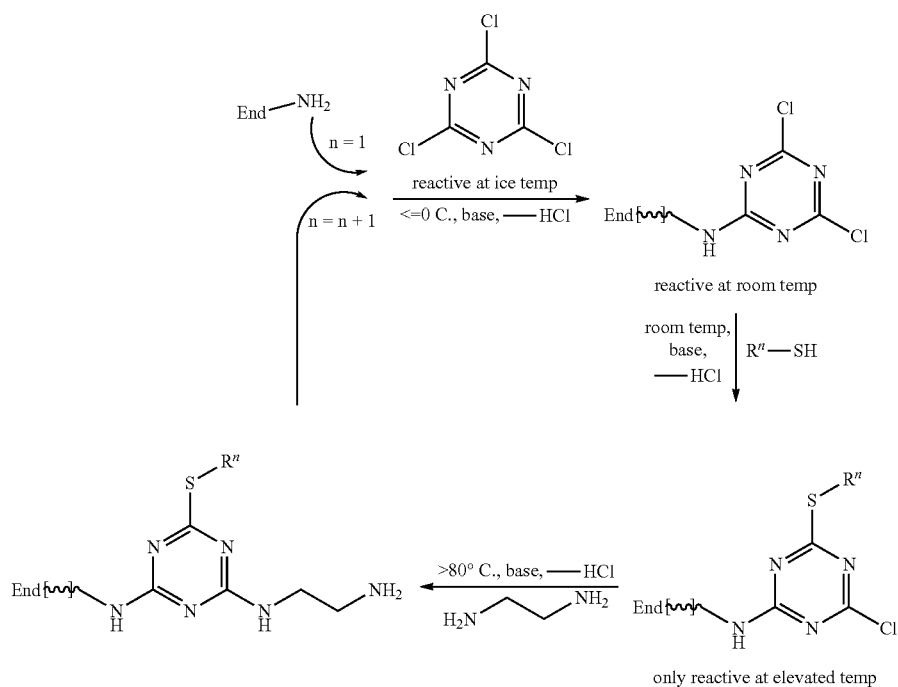

-continued
Scheme 7B
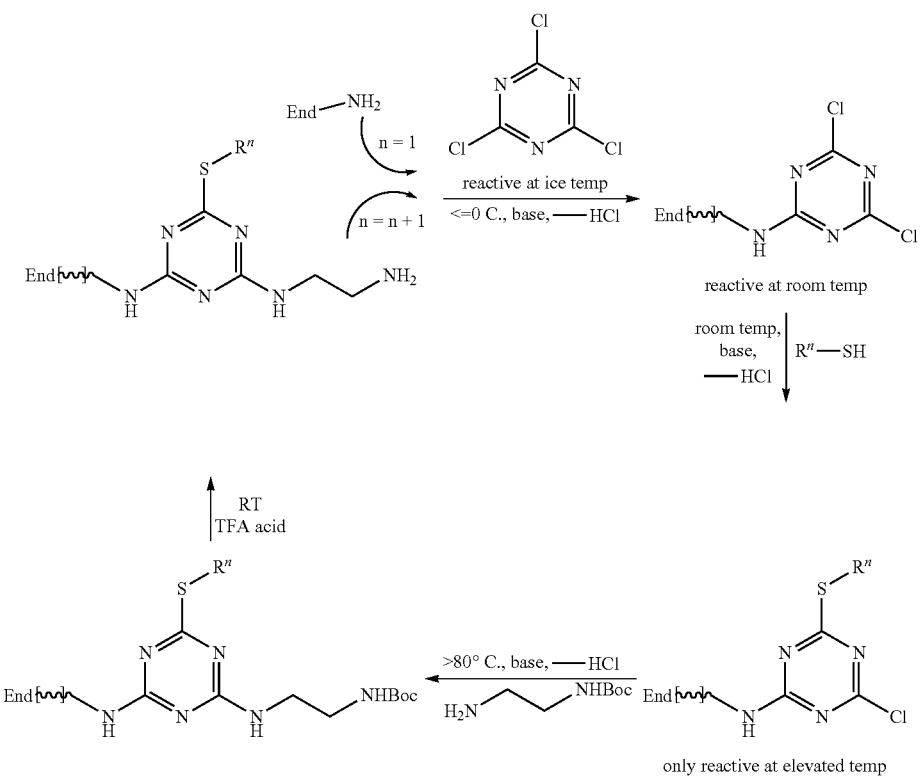
Scheme 7C
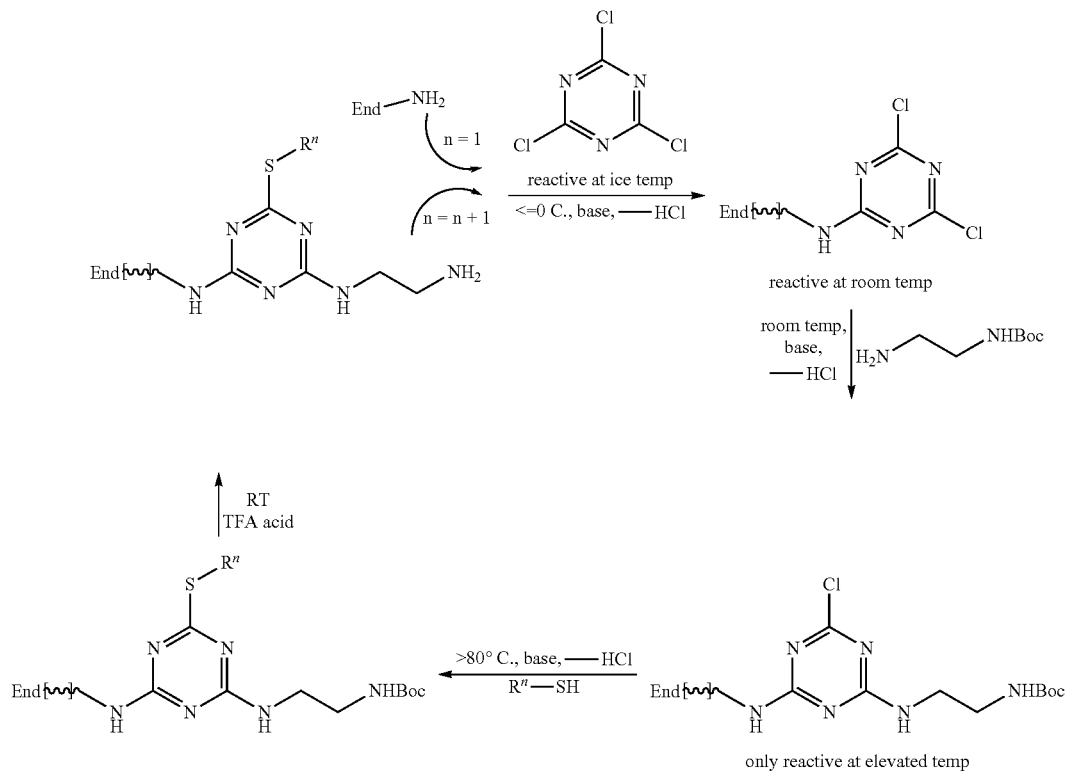

An exemplary embodiment of a method using sequential deprotection/addition steps for polymerization, related to the more generalized embodiments shown in certain schemes provided above is illustrated in Scheme 8.
Scheme 8
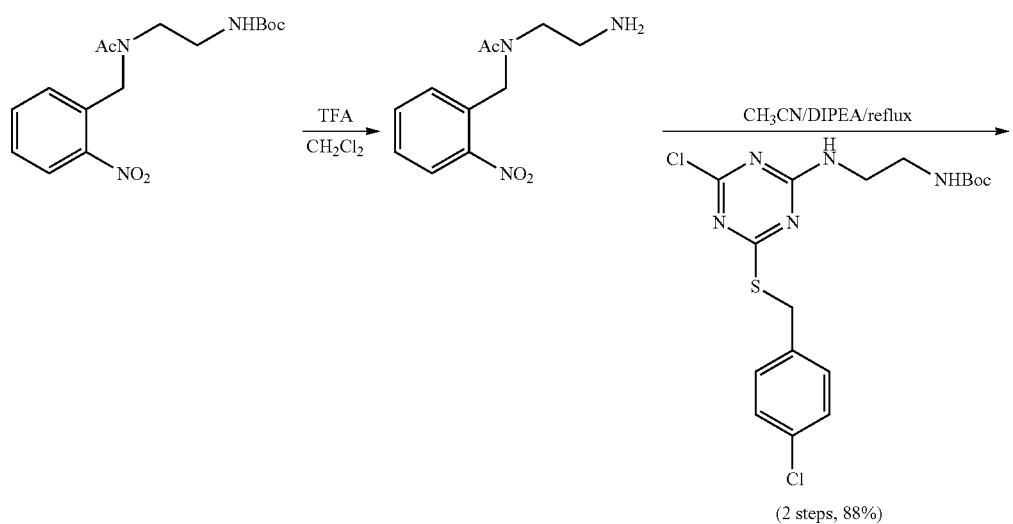
(2 steps, 88%)
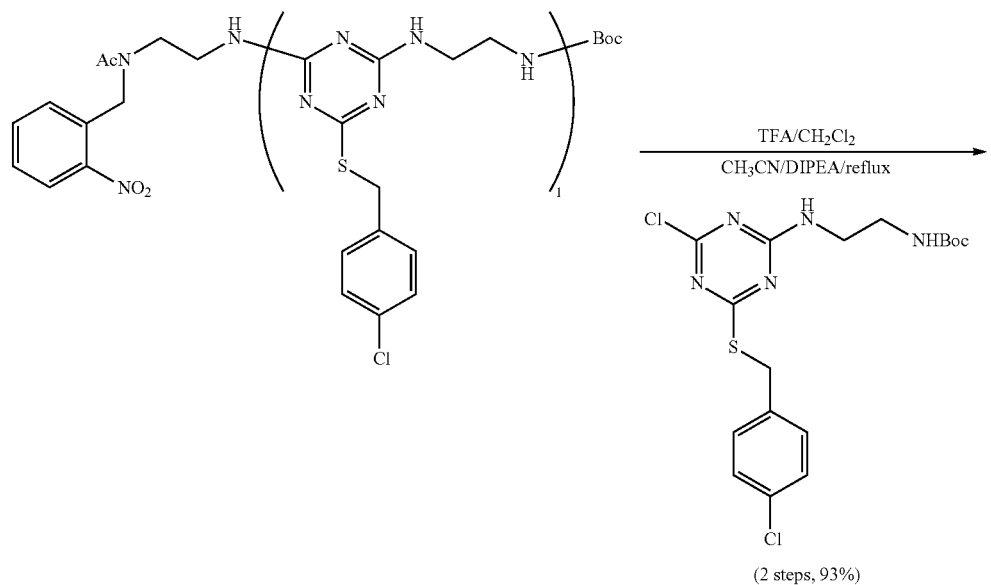
(2 steps, 93%)

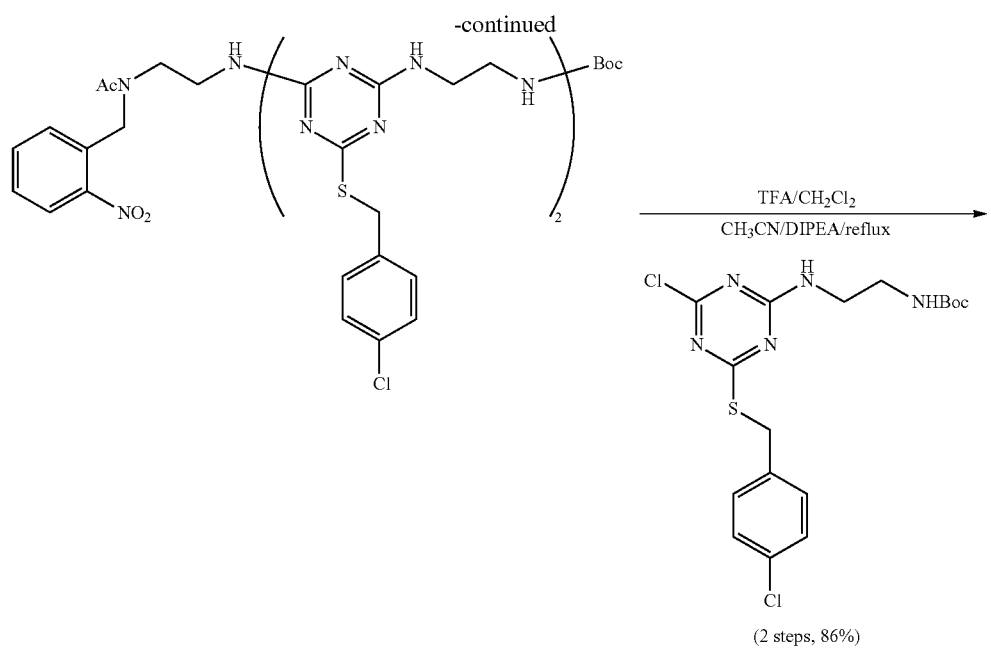
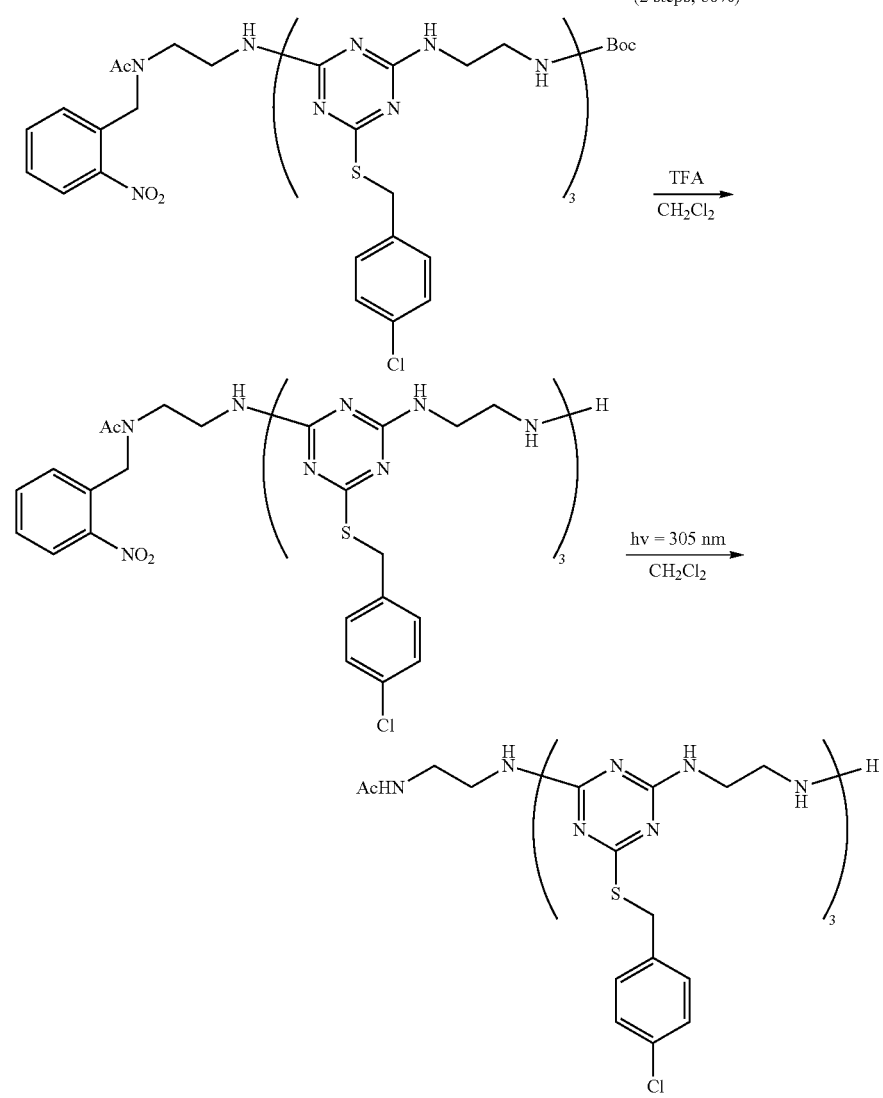

In some embodiments, any of the polymerization methods illustrated above can be used in combination with a solid support to facilitate making polymers. The solid support can be included as part of the terminal group. In some embodiments, these methods, as well as any of the methods described herein, can be automated. An exemplary embodiment of using solid support synthesis is illustrated below in Schemes 9A and 9B.

and 10B, polymers can be made on solid supports and substitution and temperature parameters can be used to regulate the molecular precursor or submonomer reactivity. The solid support can be used to prevent at least one end of a linker group from undesirably reacting with multiple monomer precursors and/or submonomers and only two reaction steps in sequence are needed to create the polymer chain. Also, no acid reagents are required to make the polymer in this

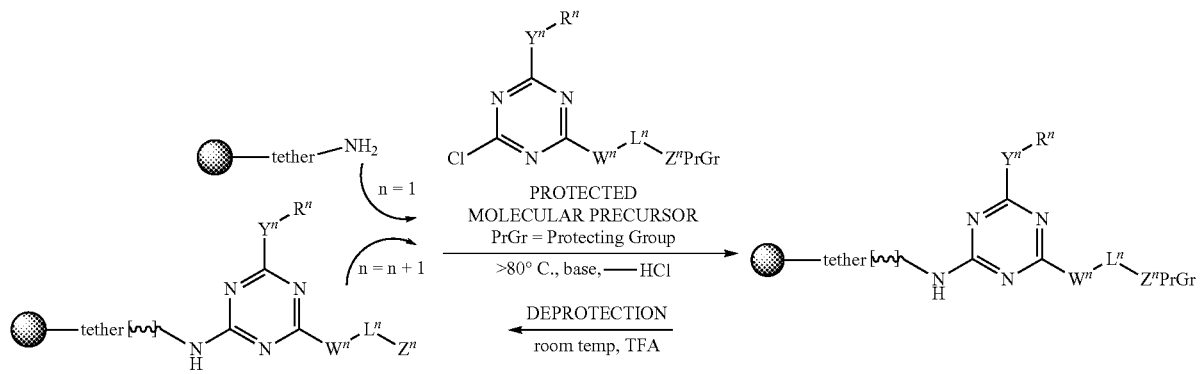

Scheme 9A

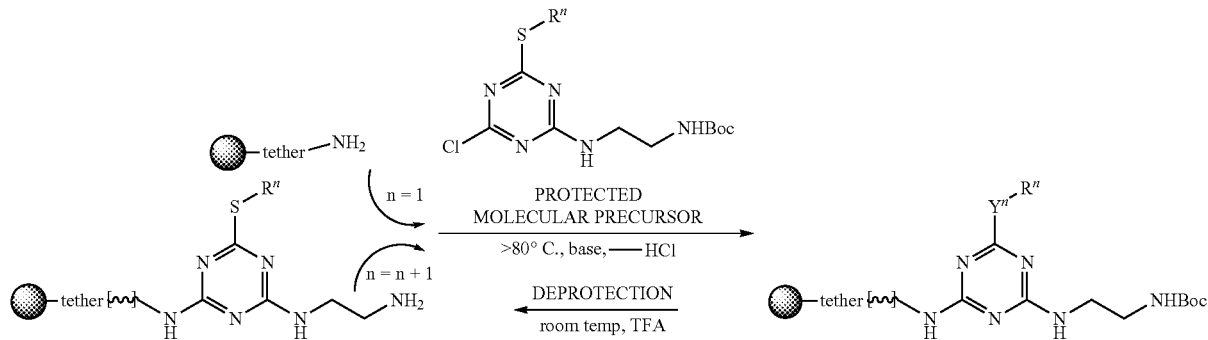

Scheme 9B

In yet other embodiments, solid support synthesis of polymers can be performed with modified reaction conditions that allow for polymer synthesis without deprotection/addition step sequences and/or the use of a library of fully formed monomers. For example, as illustrated below in Schemes 10A embodiment, therefore the solid support (which often is cleaved under acidic or basic conditions) can be conserved during chain extension. The solid support can then be cleaved using acidic or basic conditions once the desired chain length has been obtained.

Scheme 10A
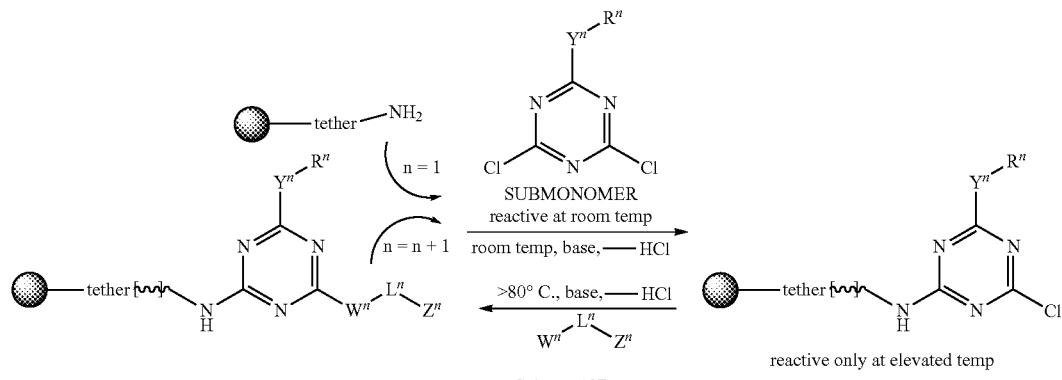
Scheme 10B
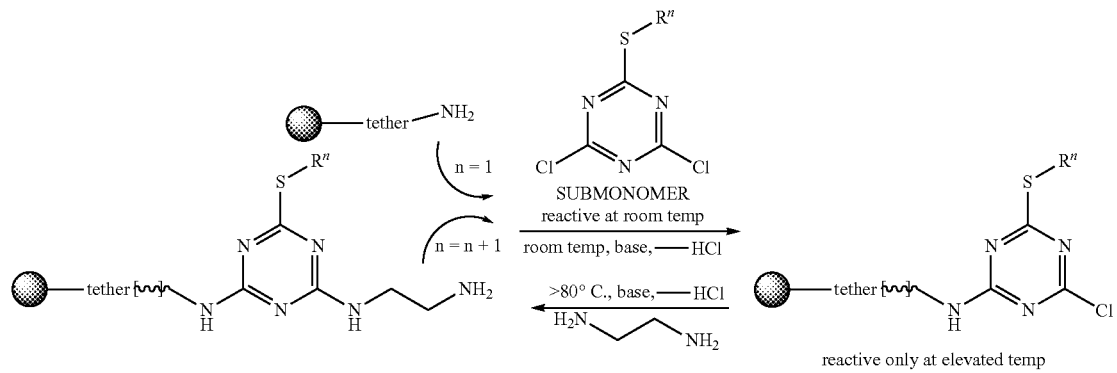
Exemplary embodiments of a polymerization method using a terminal group comprising a solid support is illustrated below in Scheme 11. This method embodiment provides the ability to make polymers having a specified length with a variety of monomer combinations.
Scheme 11
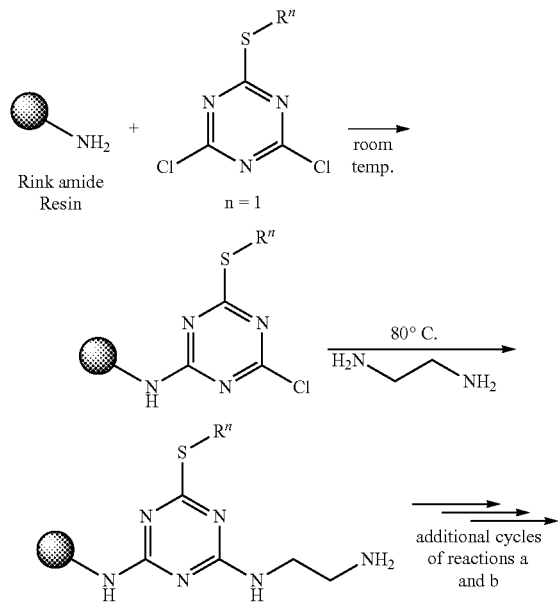

Additional exemplary solid-phase synthetic methods are illustrated below in Schemes 12-14.
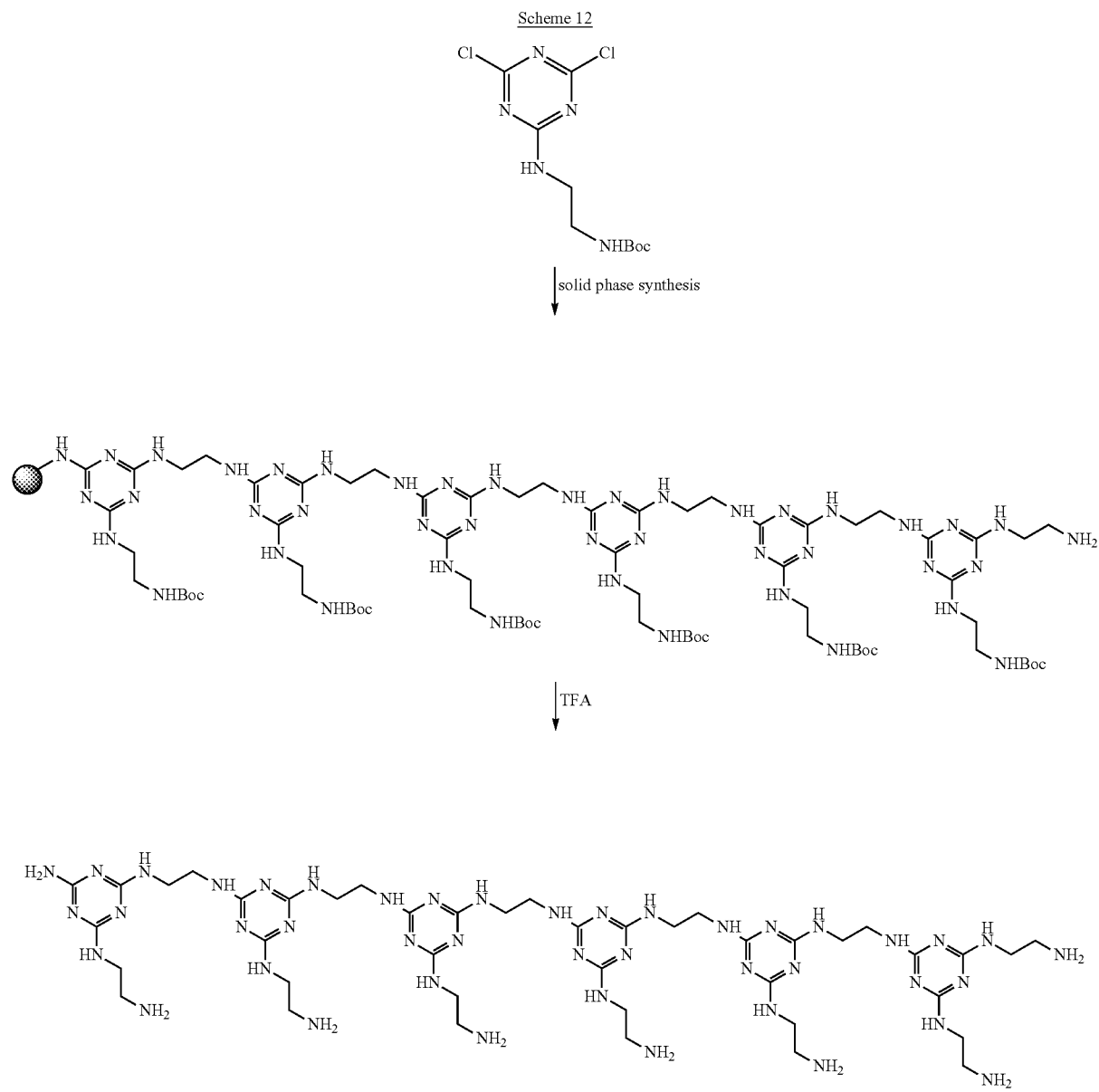

71 72
-continued
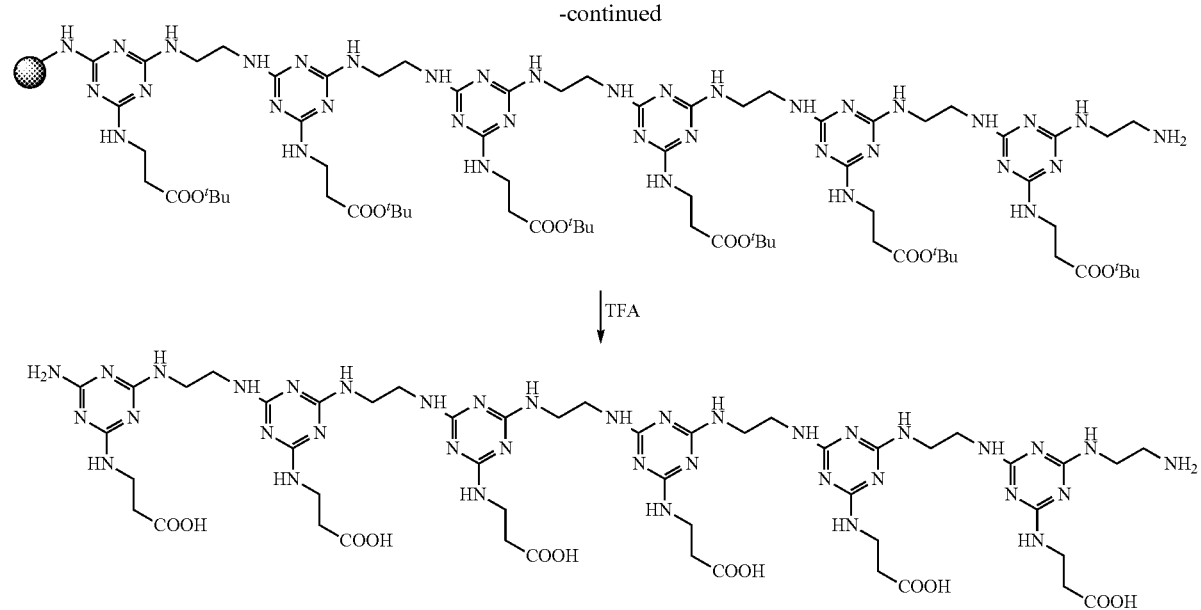
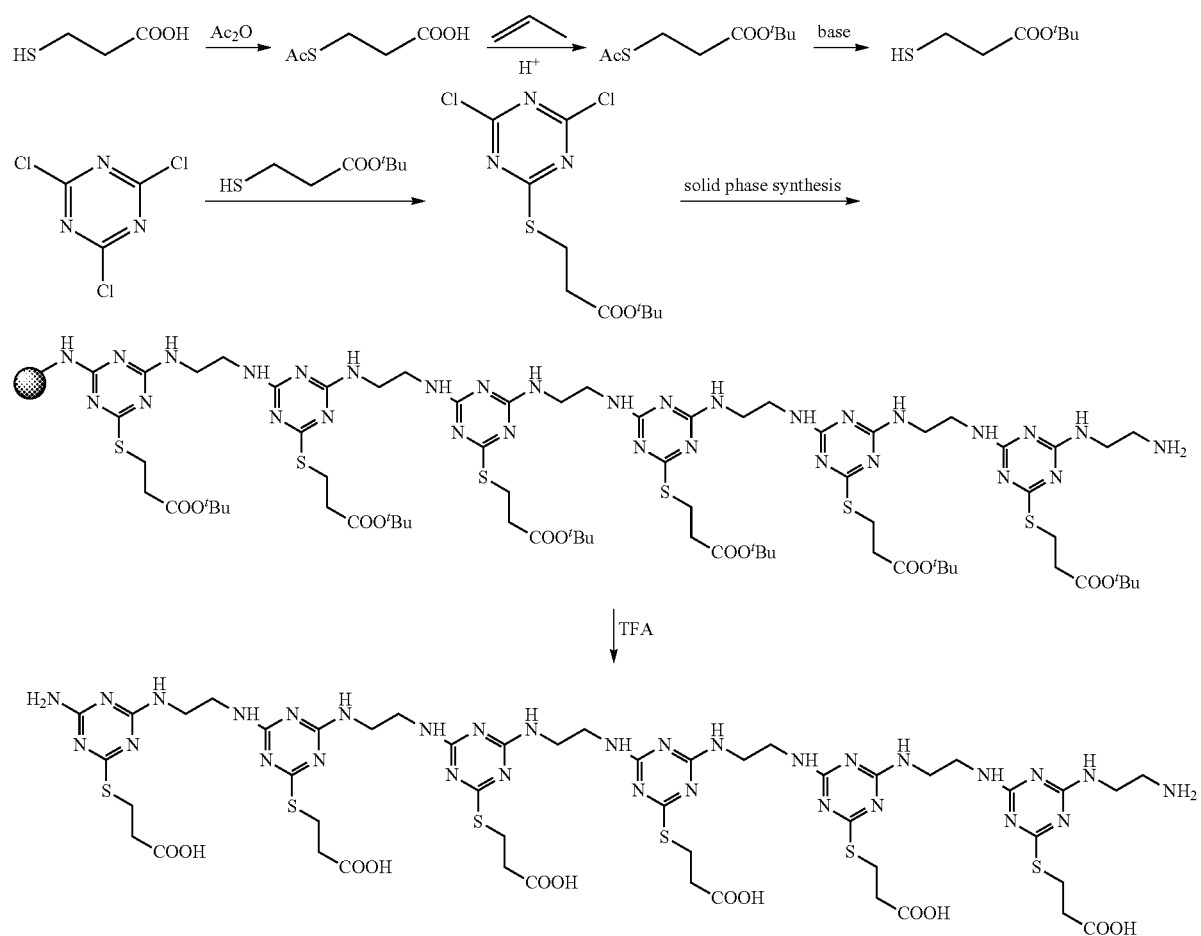

Additional independent exemplary synthetic methods are illustrated in Schemes 15-19.
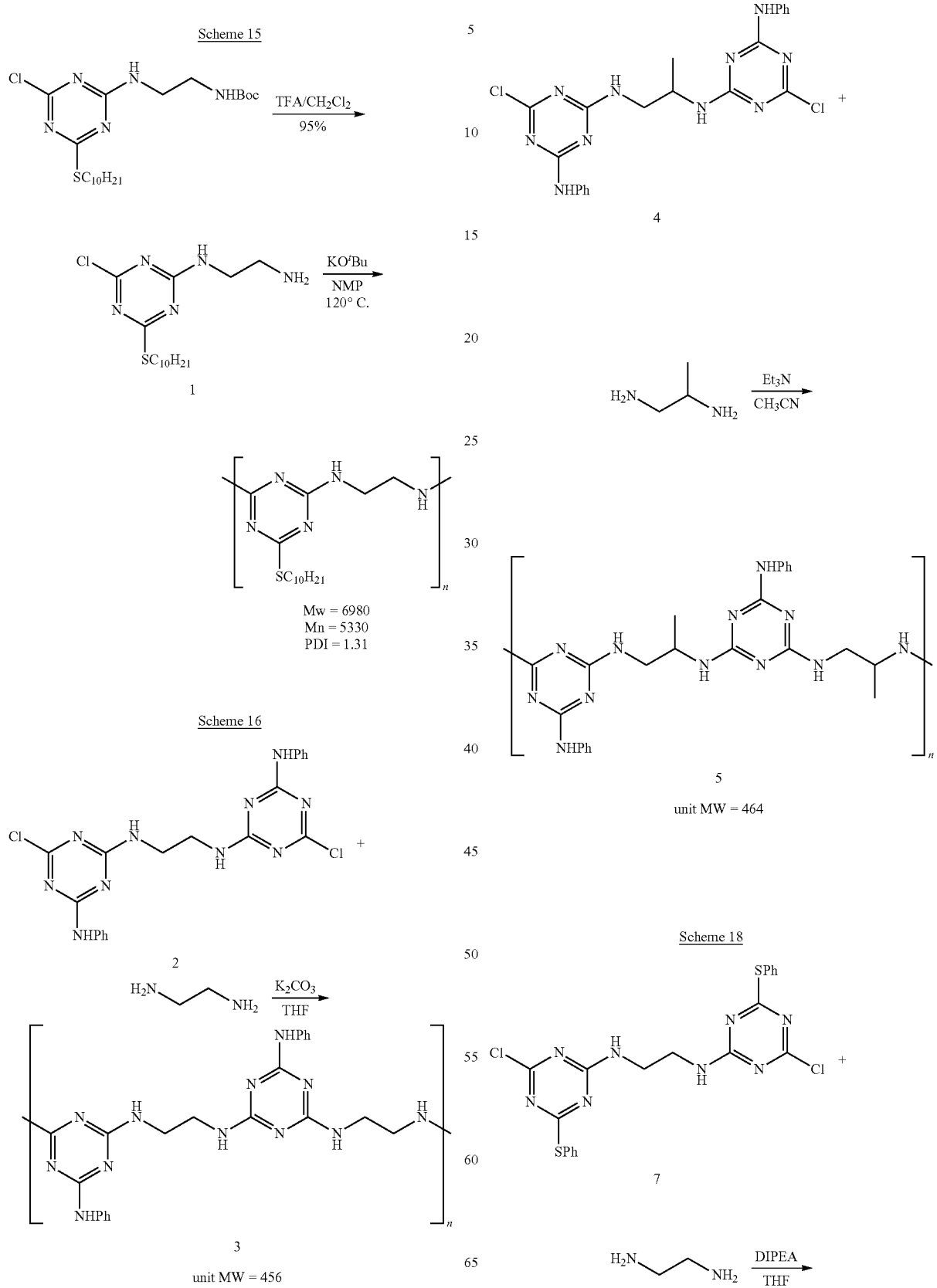

75
-continued

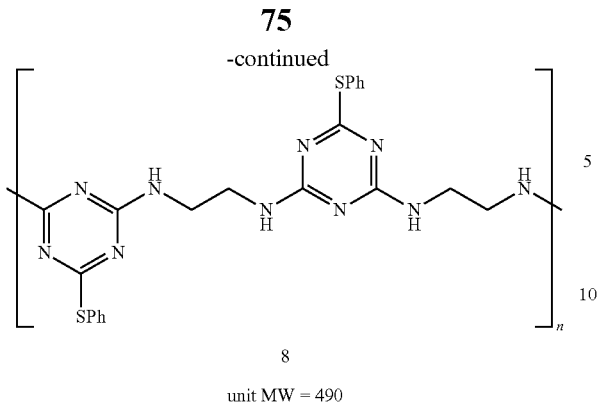

unit MW = 490

Scheme 19

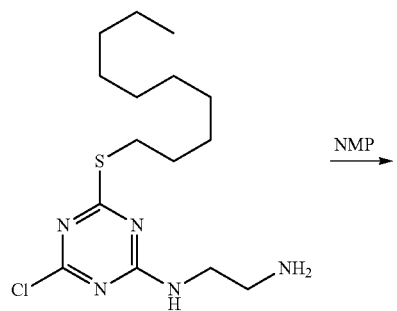

76
-continued

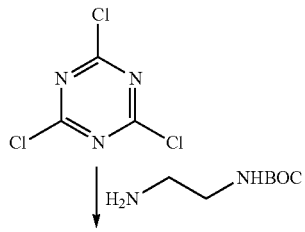

In an independent embodiment, the method illustrated in Scheme 20, below, can be used to make a singly branched polymer embodiment. While Scheme 20 illustrates a particular embodiment of a monomer used to make the polymer, one or more of the monomer embodiments disclosed herein can be used in the method. Other methods of making such singly branched polymer embodiments can include using the method steps discussed above for the linear polymers to produce a first arm, and further comprising reacting a starting material with the growing polymer chain (or first arm) rather than another submonomer or molecular precursor, thereby creating a branch point by functionalizing one of the reactive groups on the starting material with a group of the growing polymer chain. The remaining reactive groups can then be displaced with linker groups and polymerization can be carried out on both linker groups using the methods described above.

Scheme 20

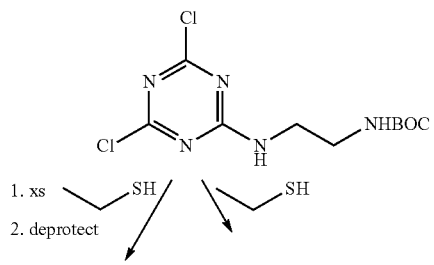

Alternative Route

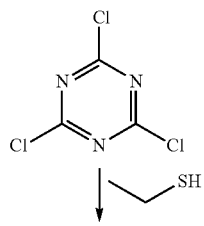

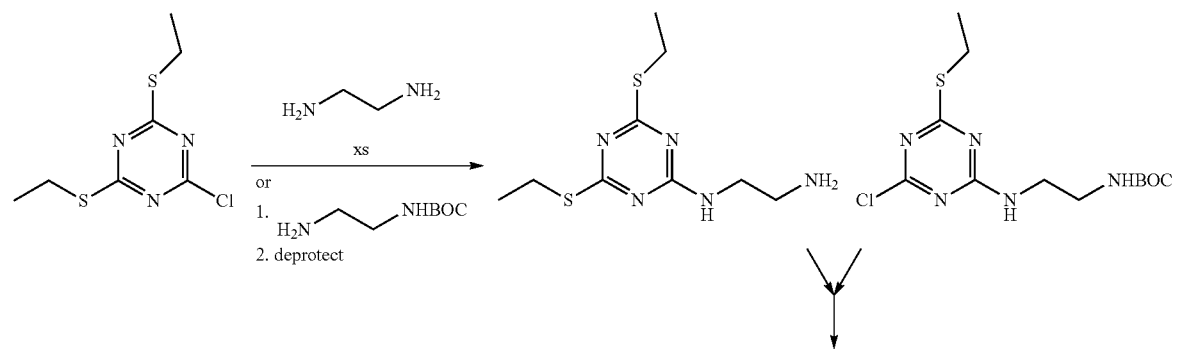
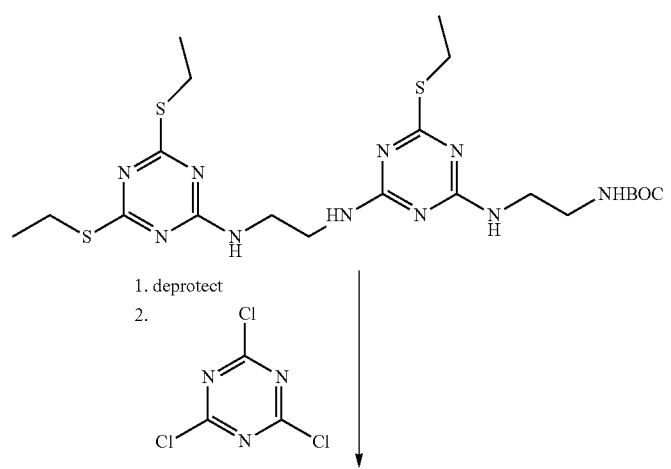

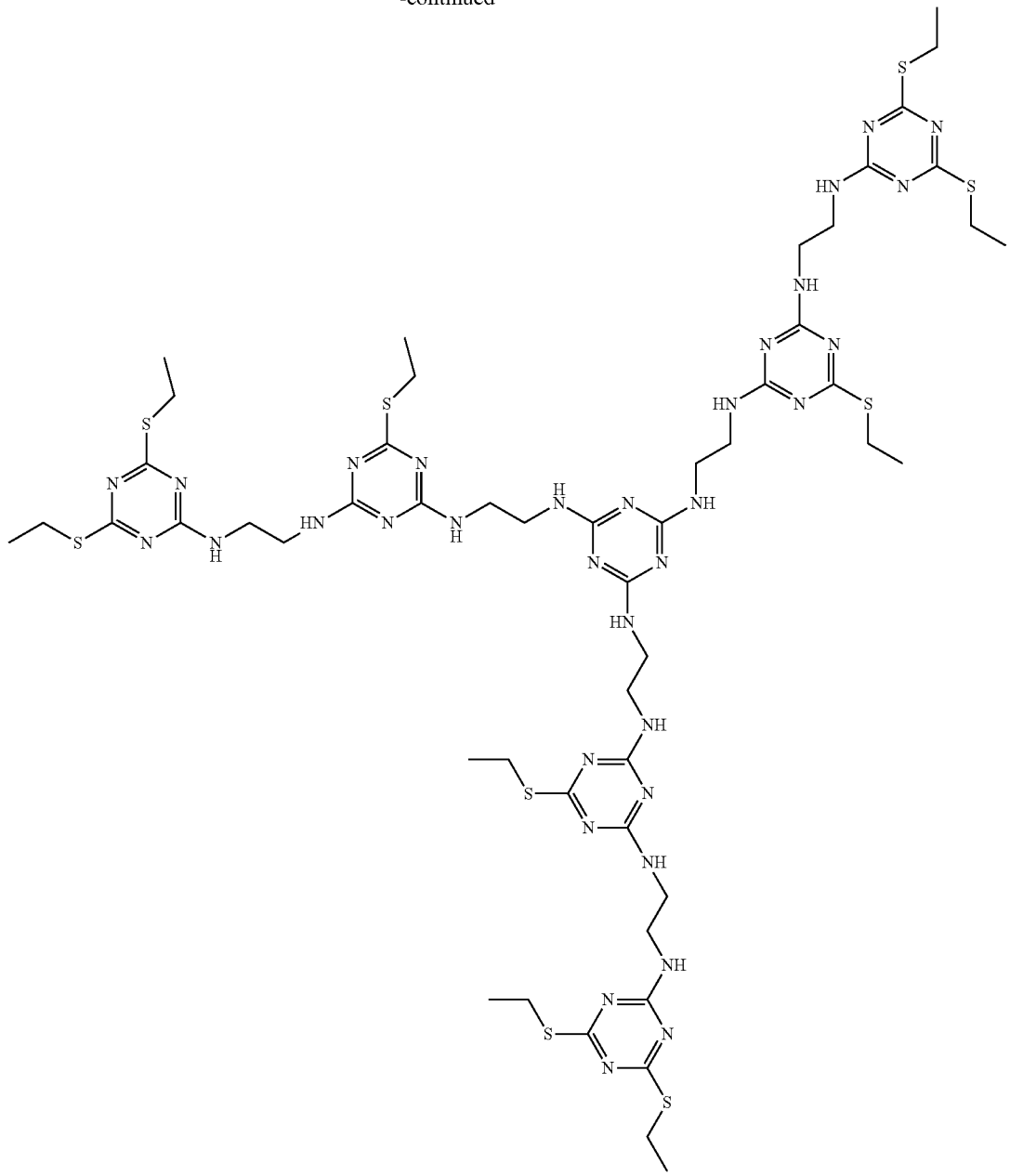 [SMILES: CCSc1nc(NCCNc2nc(NCCNc3nc(NCCNc4nc(SCC)nc(SCC)n4)nc(SCC)n3)nc(NCCNc3nc(NCCNc4nc(SCC)nc(SCC)n4)nc(SCC)n3)n2)nc(NCCNc2nc(SCC)nc(SCC)n2)n1]

In particular disclosed embodiments, the monodispersity of the polymers arises from the specific number of monomer units created in the course of starting and extending the polymer chain. In particular disclosed embodiments, the degree of polymerization and/or monodispersity obtained from using the above-disclosed methods can be determined based on the weight of the individual monomer components. For example, in embodiments where a homopolymer is made, the molecular weight of each individual monomer component can be determined and the degree of polymerization can be determined (or the length of the polymer can be confirmed) by dividing the number-average molecular weight or the molecular weight of the polymer by the molecular weight of the monomer component. In yet other embodiments, the length of the polymer can be confirmed using an analytical technique, such as mass spectrometry, chromatography (e.g., HPLC or gel-permeation chromatography), nuclear magnetic resonance (NMR) spectrometry, Infra-red spectroscopy, dynamic light scattering, or the like.

In some embodiments, the polymers disclosed herein can comprise 3 to 1000 monomer units, such as 3 to 500 monomer units, 3 to 100 monomer units, 3 to 50 monomer units, 3 to 10 monomer units, or 3 to 6 monomer units. In some embodiments, the polymers can comprise at least 3 monomer units up to 1000 monomers, at least 4 monomer units up to 1000 monomers, at least 5 monomer units up to 1000 monomers, or at least 6 monomer units up to 1000 monomer units. In other embodiments, the polymer can comprise at least 3 monomer units up to 500 monomers, at least 4 monomer units up to 500 monomers, at least 5 monomer units up to 500 monomers, or at least 6 monomer units up to 500 monomer units. In yet other embodiments, the polymer can comprise at least 3 monomer units up to 100 monomers, at least 4 monomer units up to 100 monomers, at least 5 monomer units up to 100 monomers, or at least 6 monomer units up to 100 monomer units.

In some embodiments, the polymers can comprise 6 to 100 monomer units, 6 to 50 monomer units, 6 to 20 monomers, or 6 to 12 monomers. In some embodiments, the polymers disclosed herein can comprise 4 to 1000 monomer units, such as 4 to 500 monomer units, 4 to 100 monomer units, 4 to 50 monomer units, 4 to 10 monomer units, or 4 to 6 monomer units. In some embodiments, the polymers disclosed herein can comprise 5 to 1000 monomer units, such as 5 to 500 monomer units, 5 to 100 monomer units, 5 to 50 monomer units, 5 to 10 monomer units, or 5 to 7 monomer units.

In the disclosed heteropolymers, at least one of the monomer units differs from the other monomer units of the polymer. For example, each of the 3 to 1000 monomer units can be different, with some embodiments having the number of different monomer units ranging from 2 to 1000, such as 2 to 500 monomer units that are different, 2 to 100 monomer units that are different, 2 to 50 monomer units that are different, 2 to 10 monomer units that are different, or 2 to 6 monomer units that are different. For example, each of the 3 to 1000 monomer units can be different, with some embodiments having the number of different monomer units ranging from 3 to 1000, such as 3 to 500 monomer units that are different, 3 to 100 monomer units that are different, 3 to 50 monomer units that are different, 3 to 10 monomer units that are different, or 3 to 6 monomer units that are different. For example, each of the 3 to 1000 monomer units can be different, with some embodiments having the number of different monomer units ranging from 4 to 1000, such as 4 to 500 monomer units that are different, 4 to 100 monomer units that are different, 4 to 50 monomer units that are different, 4 to 10 monomer units that are different, or 4 to 6 monomer units that are different. For example, each of the 3 to 1000 monomer units can be different, with some embodiments having the number of different monomer units ranging from 5 to 1000, such as 5 to 500 monomer units that are different, 5 to 100 monomer units that are different, 5 to 50 monomer units that are different, 5 to 10 monomer units that are different, or 5 to 6 monomer units that are different. In some embodiments, the polymers can comprise 6 to 100 monomer units that are different, 6 to 50 monomer units that are different, 6 to 20 monomer units that are different, or 6 to 12 monomer units that are different. In the disclosed homopolymers, each of the monomer units is the same.

In some embodiments, the materials made from the disclosed polymers can be characterized using techniques recognized by those of ordinary skill in the art to be suitable for characterizing, for example, nano-sized materials. Such methods can include atomic force microscopy (AFM), transition electron microscopy (TEM), and in situ TEM methods. In yet some other embodiments, single crystal x-ray crystallography can be used to determine structure and polymer conformation within diffracting ordered crystals formed with the polymers.

V. METHODS OF MAKING SUBMONOMERS, MOLECULAR PRECURSORS, AND MOLECULAR MONOMERS

Described below are methods for making the molecular precursors, submonomers, and molecular monomers disclosed herein. In particular disclosed embodiments, a starting material having multiple reactive groups can be reacted with suitable reagents to form a submonomer or molecular precursor. In some embodiments, a first reactive group of the starting material can be reacted under conditions suitable to convert only one of the reactive groups to a side chain, linker group, or terminal group, such as by reacting a triazine moiety with a nucleophile under basic conditions, as illustrated in Scheme 21, or by reacting a triazine moiety with an electrophile using a Lewis acid. Suitable bases that can be used include, but are not limited to organic bases (e.g., diisopropylethylamine, lithium diisopropylamine, or other amine bases know to those of ordinary skill in the art) or inorganic bases (e.g., potassium carbonate, sodium hydroxide, lithium hydroxide). Solvents that can be used for these types of reactions include, but are not limited tetrahydrofuran or dichloromethane. Suitable nucleophiles and electrophiles are disclosed herein.

Scheme 21

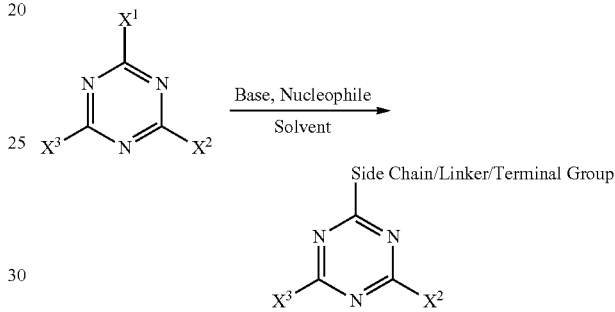

Exemplary methods of making molecular precursors are illustrated below in Schemes 22-25. In some embodiments, such as the exemplary embodiment illustrated by Scheme 25, a reactive group can be converted to a linker group or a terminal group prior to adding the side chain. For example, as illustrated in Scheme 25, a linker group is first reacted with the starting material to form a submonomer and then the submonomer is functionalized with a side chain to produce a molecular precursor. Scheme 25 further illustrates an embodiment wherein the linker group comprises a protecting group, and wherein the linker group can be added to the molecular precursor to provide a protected monomer that can then undergo deprotection and subsequent polymerization.

Scheme 22

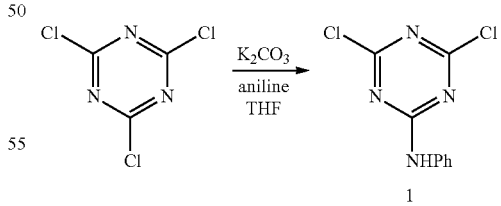

Scheme 23

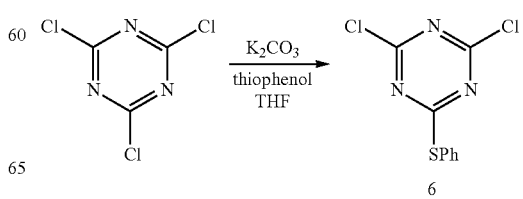

-continued
Scheme 24

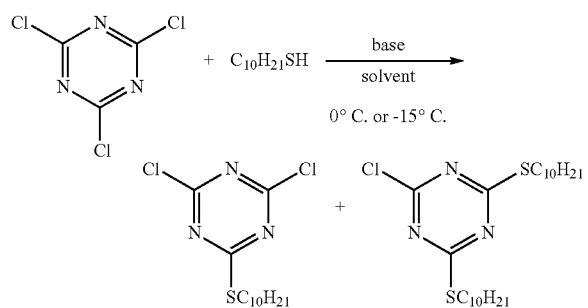

Scheme 25

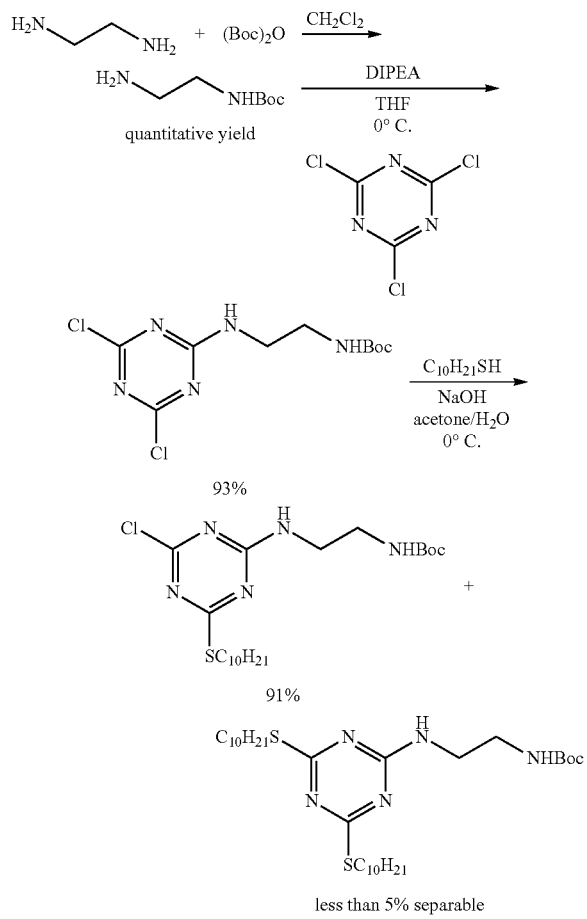

less than 5% separable

VI. METHODS OF USE

The submonomers, molecular precursors, and/or molecular monomers disclosed herein can be used to make polymers that mimic the ability of naturally-occurring sequence-defined polymers to form conformers, biomaterials, encode information, perform biocatalysis, participate in molecular recognition, and shuttle species across membranes. The polymers disclosed herein also can be used to mimic the functionality of poly(peptides), which are constructed of sequences of amino acids, each amino acid having its own side chain group that is pendant to the alpha-carbon, while the backbone consists of a regular pattern of amino-N, alpha-C, and carbonyl-C functional groups. While the polymers may mimic such functionality and/or behavior, they have structural features that are separate and distinct from naturally-occurring and/or synthetic polypeptides, which contribute to their superior stability and functionality.

In some embodiments, the polymers disclosed herein can be used as biomimetic polymers, which are useful for materials science and bioenergy applications, such as $CO_2$ separation. In particular disclosed embodiments, the polymers exhibit high thermostability and resistance to biodegradation. The polymers disclosed herein also can form artificial beta sheets, artificial alpha helices, and the like that can be used to target biopolymers, disrupt bacterial membranes, and/or permeate cells, based on interactions between the monomers making up the polymers. The polymers also can self-assemble into particular materials, such as membranes, nanosheets, crystals, nanocapsules, microcapsules, nanotubules, microtubules, liquid crystals, fibers, nanofibers, or composite materials that contain additional components such as ions, minerals, or molecules and macromolecules Composite materials containing a polymer and nanostructures can be used in organic solar cells, catalysis, chem/bio sensing, and flexible electronics. Achieving a homogeneous blend of the two components or a precise spatial distribution of one within the other, e.g. along air-solid interfaces in porous materials, is a goal often sought in the art. Poor spatial control within polymer/nanostructure composites, however, is a deficiency that has not yet been efficiently addressed by traditional methods. Traditionally, 3D composite materials of polymers and nanometer-sized components are synthesized using empirically determined parameters to optimize a product's properties, without elucidating or developing predictive methodologies that address the mechanism of nanoparticle assembly or distribution in these compounds and subsequently their properties. Such traditional methods typically rely on blending, electrostatically-binding, or tethering nanostructures to existing polymer chains. In contrast, the presently disclosed polymers and methods of making such polymers can be used to determine a reaction mixture's intrinsic and polymerization-induced self-assembly mechanisms, thus providing the ability to determine the underlying principles that govern the self-assembly of functionalized nanostructures under different conditions, such as overall monomer concentration, temperature, etc. In some embodiments, a parameter map based on these observations can be developed, which can be used to design functional materials in which nanometer-sized components can be placed within a polymer matrix with spatial precision.

The sequence-defined polymers are novel, structurally distinct mimetics to biopolymers with defined sequences, such as poly(nucleic acids) and polypeptides. The sequence-defined polymers disclosed herein can comprise side chains on monomer units, wherein these monomer units are arranged in predetermined sequences within the polymer chain, and having defined lengths. Structures and methods for making sequence-defined polymers are difficult to originate, as compared to random copolymers. The very specifically defined side chains, monomer unit sequences, and lengths of sequence-defined polymers are particularly useful, however, with a wide variety of uses by nature and by human application, including but not limited to functions to serve as materials or self-assembling materials, encode information, perform catalysis, participate in molecular recognition, regulate biological processes, perform signaling, and shuttle species across membranes.

Naturally occurring sequence-defined polymers are known to self-organize into particular conformations, such as the alpha helices and beta sheets and helical bundles of polypeptides, and the double stranded helix of DNA. The disclosed polymers can assemble with themselves (self-assembly) or with other complementary molecules or macromolecules (molecular recognition). Molecules and materials with these properties have therapeutic or other pharmacologic biomedical effects and can be useful in assays, in sensors or separations, they also can target bacteria, kill pathogens, or perform catalysis. Polymers that self-assemble through intermolecular interactions, such as the polymers disclosed herein, can form membranes, nanosheets, crystals, nanocapsules, microcapsules, nanotubules, microtubules, liquid crystals, fibers, nanofibers, or composite materials that contain additional components such as ions, minerals, or molecules and macromolecules. In some embodiments, the polymers can form composite materials with inorganic nanoparticles or nanostructures, such as ZnO or Au, wherein the polymers can impart an element of secondary structure to the nanoparticle distribution within a polymer matrix.

The great structural diversity of the molecules and materials disclosed herein, and methods of making them, will thus enable many useful applications. Exemplary embodiments are described below.

Figure 2:
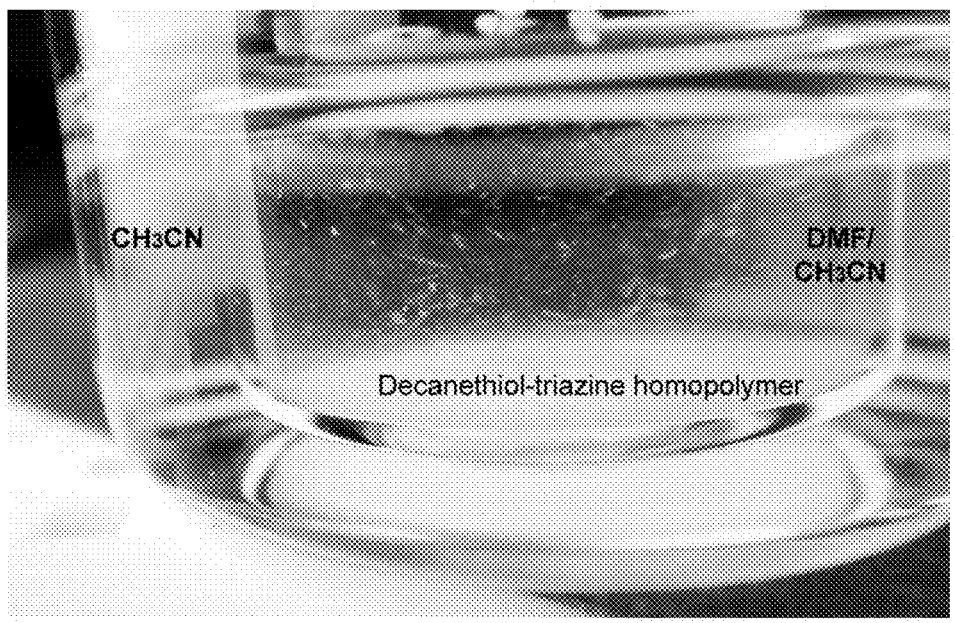
FIG. 2 shows a triazine homopolymer embodiment wherein acetonitrile vapor has been diffused into a DMF solution of the polymer, inducing assembly into thin sheet-like crystallites suspended in the fluid.
Figure 3:
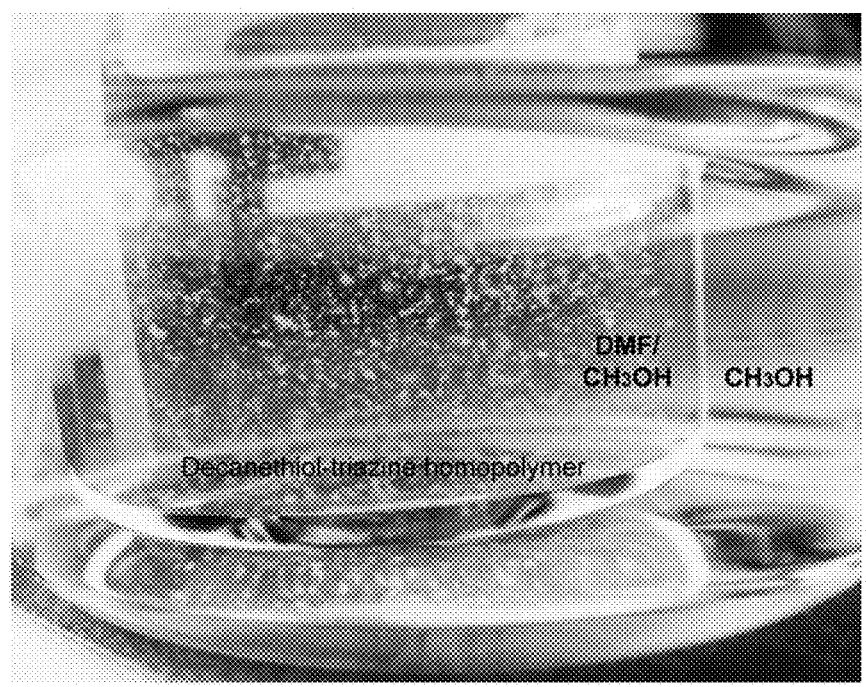
FIG. 3 shows a triazine homopolymer embodiment wherein methanol vapor has been diffused into a DMF solution of the polymer, inducing precipitation into solid precipitates.

As shown in FIGS. 1 and 2, solutions of a polymer can be induced to form crystals, platelets, and/or membranes by diffusion of another solvent into a solution containing the polymer. In some embodiments, the behavior of the polymer can be controlled by modifying the solvent conditions. In one exemplary embodiment, the behavior of a homopolymer comprising dodecanethiol-based sidechains was determined. As shown in FIG. 1, the diffusion of water into a DMF solution containing the polymer can form a membrane. In another exemplary embodiment, diffusing acetonitrile into a DMF solution containing the polymer can form thin flat crystallites, as shown in FIG. 2. In yet another exemplary embodiment, such as that shown in FIG. 3, amorphous precipitates can be formed using methanol as a solvent. These examples illustrate the ability of the disclosed polymers to assemble into materials.

In some embodiments, interactions between functional groups of the monomer units of the polymers are available to influence intramolecular conformational structure and/or intermolecular self-assembly, such as backbone/backbone hydrogen bonding or side-chain/side-chain interactions. Molecular simulations can be used to determine such interactions, as well as to determine structural conformations of the polymers that can be formed in solution. In some embodiments, the disclosed polymers can participate in hydrogen-bonding based interactions, create helical foldamers, and/or assemble into ribbon structures. For example, FIGS. 4-6, 7A, 7B, 8-9, 10A-10C, and 11A-11C illustrate different conformers of monomer units or polymer embodiments disclosed herein.

Structural modeling of different sequences of the polymers disclosed herein, in which (in some embodiments) variable-length non-amide linkers are used to connect monomers, can be used to inform experimental designs. The monomer units and linkers of the polymers disclosed herein can be parameterized using a generalized amber force field, and 500-ns REMD simulations can be used to explore the conformational space of the polymers. K-means clustering also can be used to identify potential structures of interest. In particular disclosed embodiments, simulations of hexamers suggest several favored motifs with different backbone/backbone hydrogen bonding and π stacking configurations. The simulations also suggest that, in some embodiments, imine-containing functionalized groups can increase helical propensity, that chiral linkers can increase conformational order, and that longer linkers can promote more globular structures. In particular embodiments concerning simulations of 12-mers, more globular and elaborate tertiary structures can be formed, which are reminiscent of proteins. Such simulations confirm the applicability of the polymer embodiments disclosed herein in applications where intramolecular conformational and structural order are functionally important.

In some embodiment, molecular dynamics simulations on polymer structures can be performed to determine the favored conformations of a given polymer structure in solution. These particular structures can be visualized and examined to observe the overall conformations and the interactions, such as backbone-backbone hydrogen-bonding and pi-pi interactions, which contribute to holding the polymer chains in such conformations. In addition, structures can be generated varying such features as the linker segment to see the influence on the conformational behavior.

Polymer structures can be constructed in extended starting conformations using an in-house python script. Simulations can first be carried out in implicit solvent representing a high dielectric constant environment similar to water, using a replica exchange molecular dynamics method to accelerate the process and obtain conformational results. The particular desired conformations, or conformations of interest, can be determined, such as those that are most likely to represent stable conformations rather than unfolded or transient structures. Simulations also can be carried out in explicit water solvent, typically starting with a conformer identified in the implicit solvent simulation to determine if the conformer is stable in explicit solvent environment.

Figure 4:
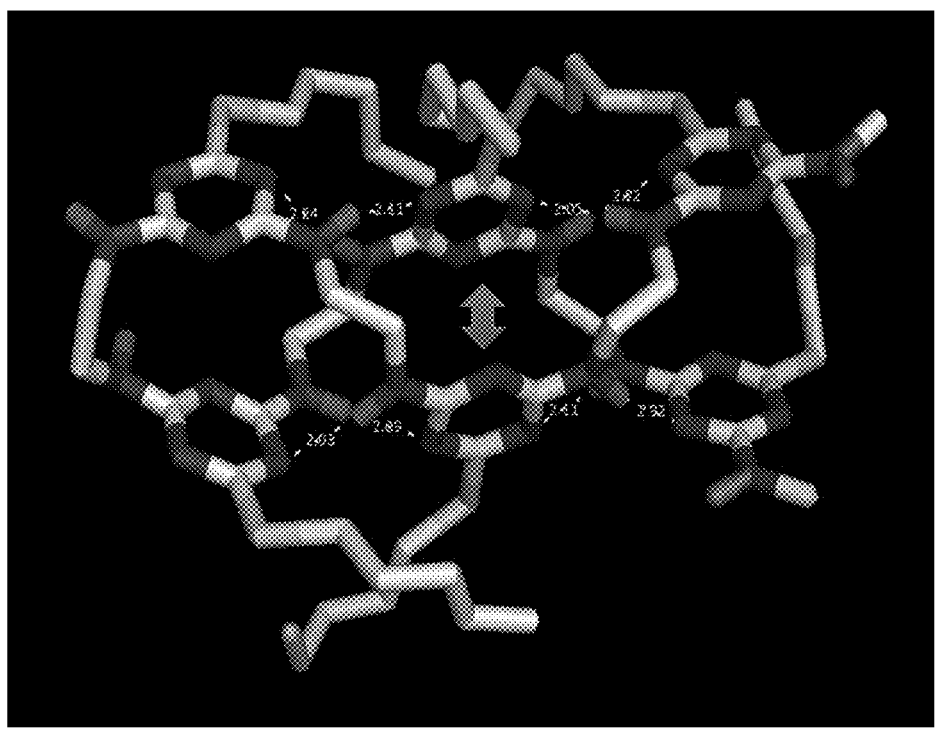
FIG. 4 illustrates a simulation conformer of a polymer embodiment that is stable in explicit solvent and further illustrates how hydrogen bonding and π-stacking can promote arrangement of the polymer, wherein the polymer is a hexamer of triazine monomers with pentanethiol sidechains, joined by ethylene diamine linkers; the double headed arrow indicates where a pi-pi interaction is occurring and the hydrogen bonds are indicated in dashed lines with numbers providing distances.
Figure 5A:
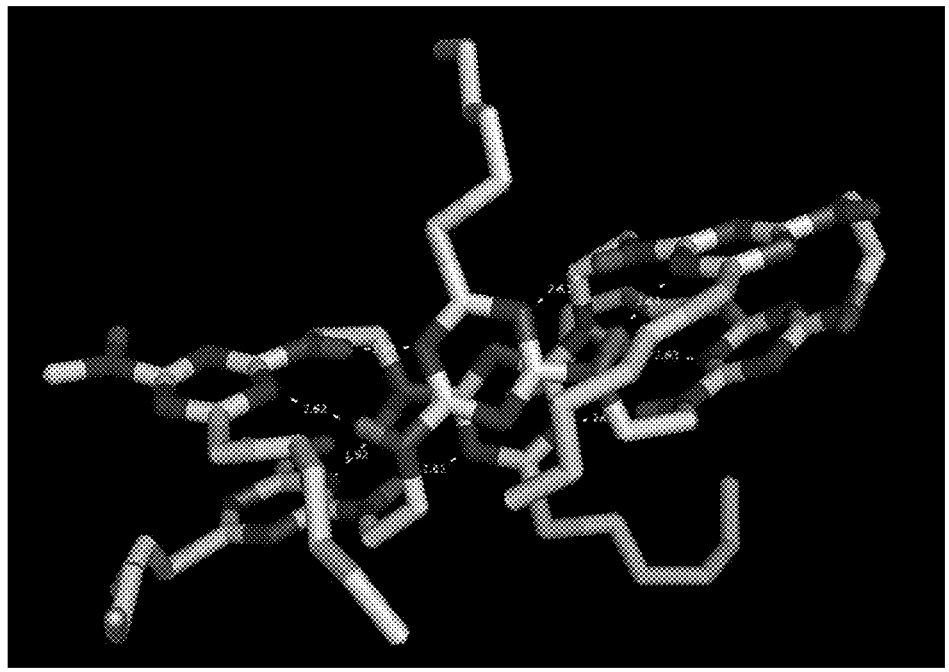
FIGS. 5A and 5B illustrate additional views of the conformer shown in FIG. 4 and further illustrate hydrogen bonding of the monomer.
Figure 5B:
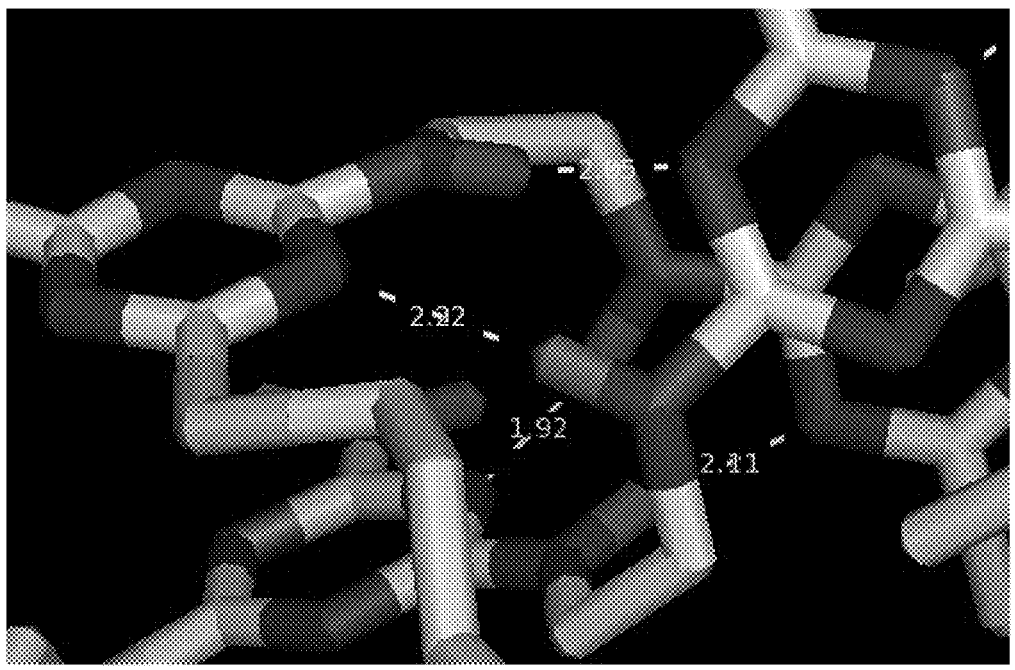
Figure 6:
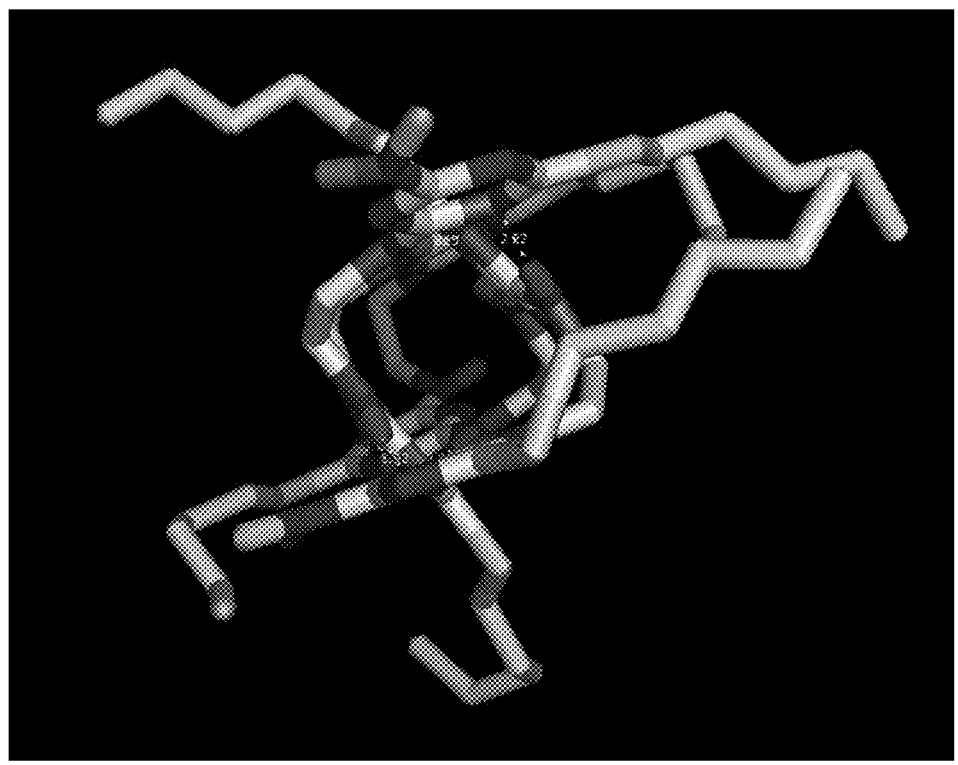
FIG. 6 illustrates another view of the conformer shown in FIG. 4, particularly an end-on view, which illustrates how the folded polymer chain forms a columnar structure with side chains extending outward from the column.

Molecular simulations on polymer sequences disclosed herein have revealed detailed motifs of interactions that contribute to conformational or self-assembly behaviors establishing the utility of the polymers disclosed herein in a variety of applications. In some embodiments, molecular simulations of the polymer structures support backbone-backbone interactions by hydrogen bonding and by pi-pi interactions. FIGS. 4, 5, and 6 illustrate three views of an exemplary conformer found in the molecular dynamics simulation of a hexameric polymer comprising linkers derived from ethylene diamine and side chains derived from pentanethiol. The illustrated conformer has a regular structure with backbone-backbone hydrogen bonds and a pi-pi bond, as illustrated in FIG. 4. As can be observed from the side-view of the conformer in FIG. 4, this conformer resembles the shape typically adopted by a polypeptide beta sheet structure. Also, as can be observed from an end-on view, as illustrated in FIG. 5, the conformer also resembles the shape typically adopted by a polypeptide alpha-helix, with side chains that extend out to the side of the conformer.

From the simulations results illustrated in FIGS. 4-6, a motif is provided where a hexamer can be folded into two, such that the two groups of three monomers interact to form a columnar structure as seen from the end-on viewpoint illustrated in FIG. 6. In this motif, side chains project outward from the columnar structure created by the interacting polymer backbones, thereby indicating that the polymer structures can mimic structures adopted by alpha helical sections of polypeptides, which can include side chains that project outwardly from the helical column. In some embodiments, this motif can yield longer columnar structures starting with longer single polymer chains that fold over, such as by using a linker section in the middle that encourages folding. Alternatively, in other embodiments, this motif can be used to create a columnar assembly from two separate strands, whose backbones interact to create the columnar structure, with side chains projecting outward from the column. Given such columnar structures, side chain arrangements can lead to further assemblies of column bundles. In some embodiments, the columnar structures derived from the polymers disclosed herein can be designed so that side chains on one side of the column are hydrophobic, whereas those on the other side are hydrophilic. Such columnar structures can also assemble into bundles. Because the polymers described herein can participate in backbone-backbone interactions, and they can be synthesized with side chains that can be varied and arranged in specific predetermined sequences, many useful materials and molecular assemblies can be made using these novel polymers.

Some exemplary structural fragments representing hydrogen bonding motifs found in particular molecular dynamics simulations are provided below in Table 7. The first example in Table 7 illustrates the hydrogen bonding motifs that bind the 2nd and 5th triazine rings from the conformer illustrated in FIGS. 4, 5A, 5B, and 6. The triazine ring shown is stabilized in position by four hydrogen bonds. A particular motif for backbone-backbone hydrogen bonding is a pair of hydrogen bonds as shown in the second entry in Table 7, where double backbone-backbone hydrogen bonds are illustrated. The four hydrogen bonds illustrated in the first entry in Table 7 are two examples of these double backbone-backbone hydrogen bonds. In the third entry in Table 7, quadruple backbone-backbone hydrogen bonds are illustrated.

Additional entries in Table 7 show where a hydrogen bond occurs "along the chain" and stabilizes a turn in the direction of the polymer chain (entry four), and an example where such a turn is stabilized by additional backbone-backbone hydrogen bonds (entry 5). These hydrogen bonding motifs illustrate the rich interactions that the disclosed polymer chains can participate in, and these will contribute to conformational structures and self-assembly mechanisms.

TABLE 7

Hydrogen bonding motifs found in molecular dynamics simulations

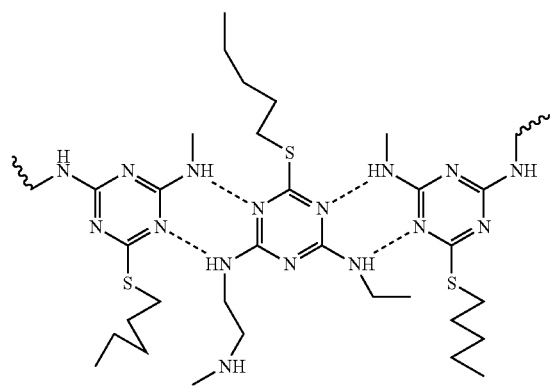

Entry 1 four hydrogen bonds stablizing one triazine ring

TABLE 7-continued

Hydrogen bonding motifs found in molecular dynamics simulations

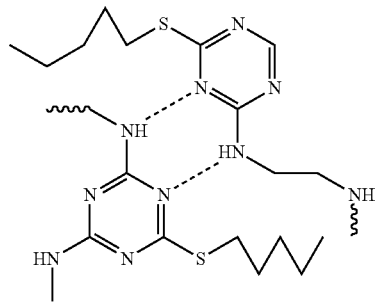

Entry 2 double backbone-backbone hydrogen bonds

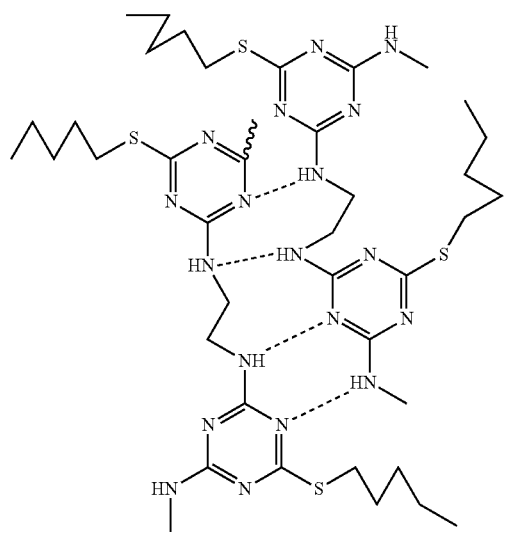

Entry 3 quadruple backbone-backbone hydrogen bonds

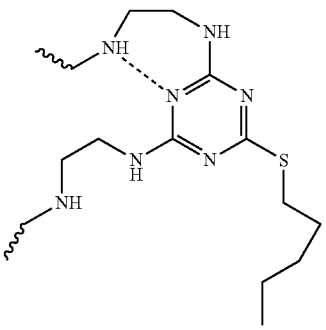

Entry 4

"along the chain" hydrogen bond between contiguous triazine ring and linker

TABLE 7-continued

Hydrogen bonding motifs found in molecular dynamics simulations

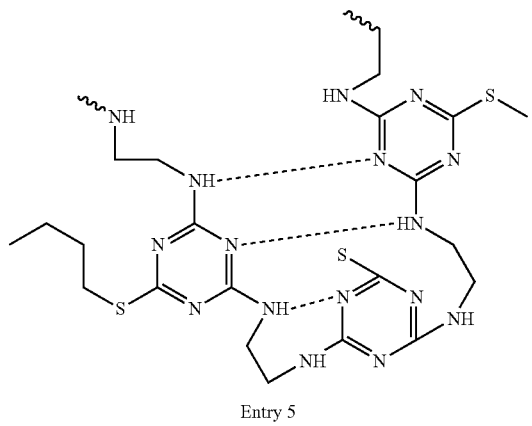

Figure 7A:
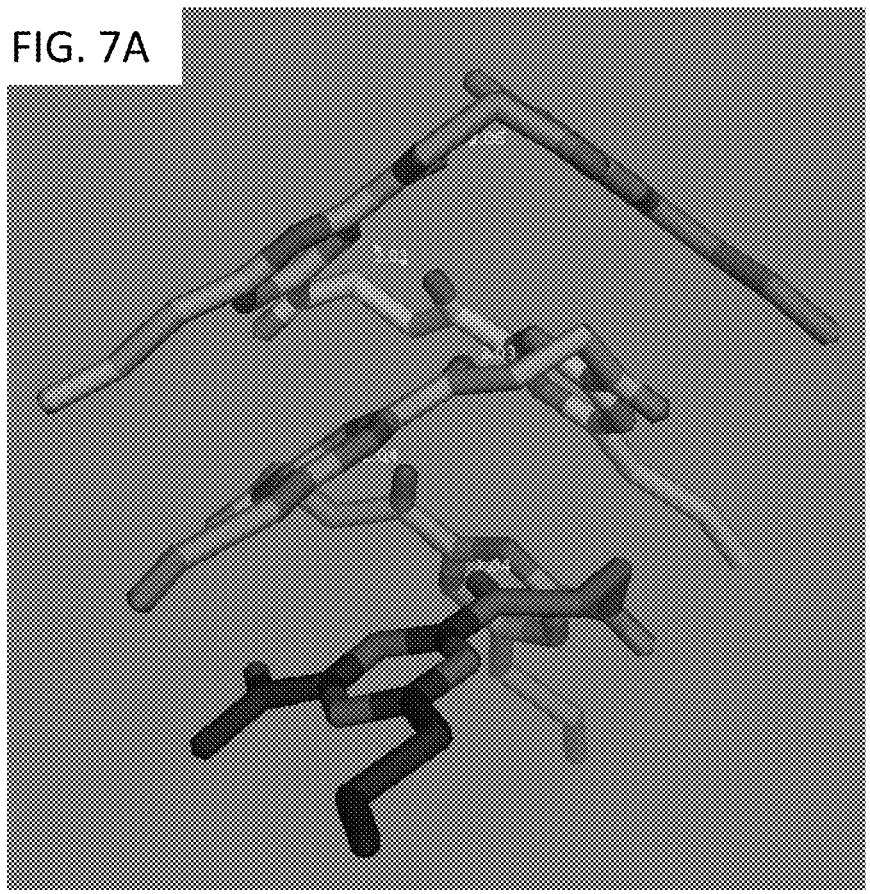
FIGS. 7A and 7B illustrate different views of a triazine polymer helix formed using a triazine polymer embodiment disclosed herein; the polymer is a hexamer of triazine monomers with pentanethiol sidechains and is joined by ethylene diamine linkers.
Figure 7B:
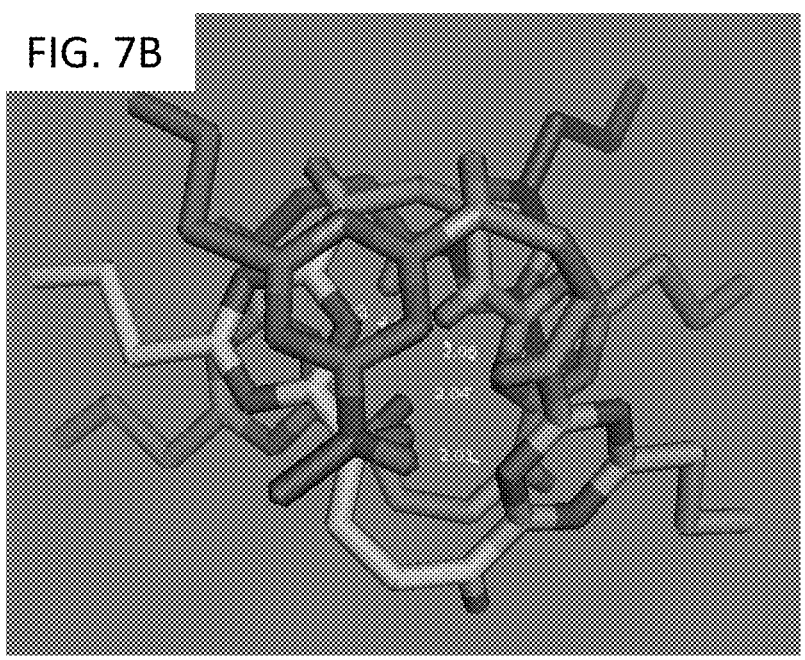
Figure 8:
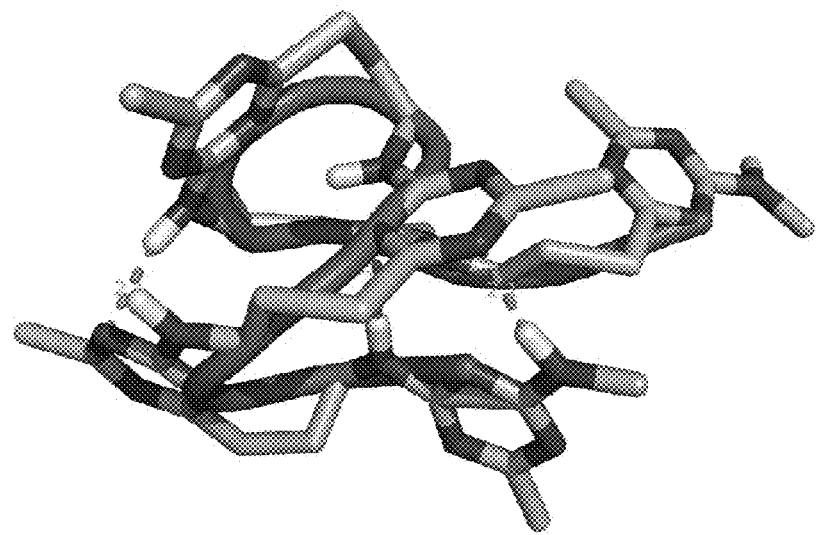
FIG. 8 illustrates a triazine polymer embodiment wherein the polymer is a hexamer of triazine monomers with pentanethiol side chains, joined by 2-mercaptoethylamine linkers; the side chains are hidden to more clearly show the backbone structure.
Figure 9:
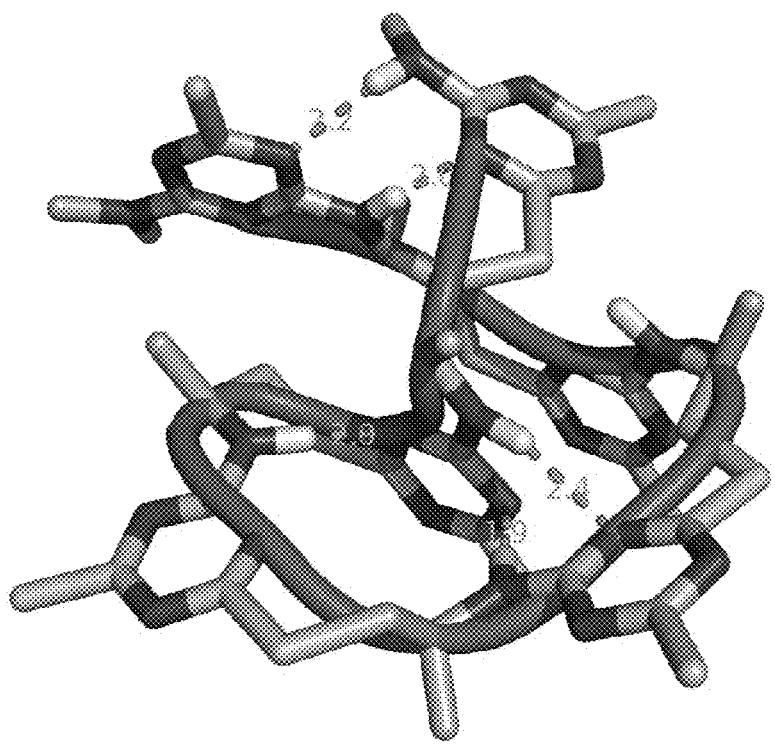
FIG. 9 illustrates a triazine polymer embodiment wherein the polymer is a hexamer of triazine monomers with pentanethiol side chains, joined by ((S)2-mercapto-1-methyl)-ethylamine linkers; the side chains are hidden to more clearly show the backbone structure.
Figure 10A:
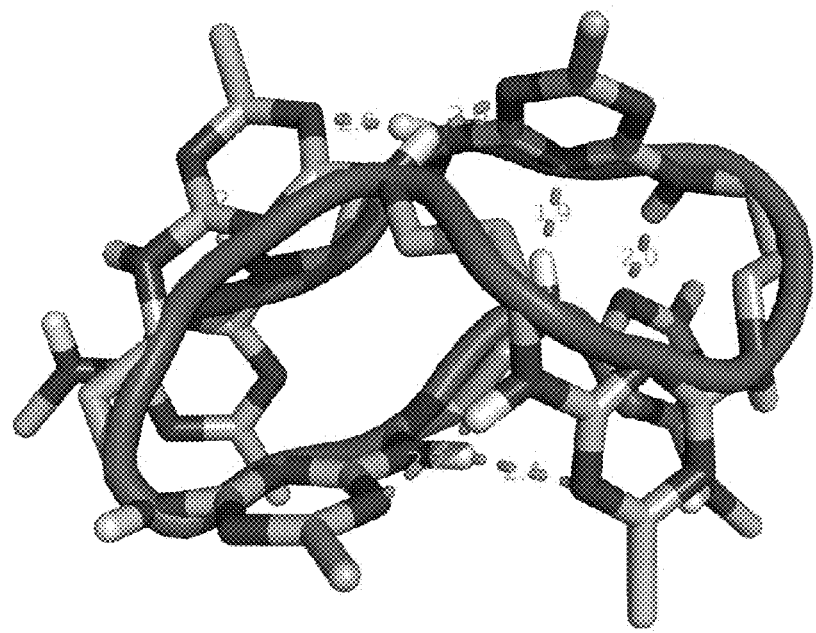
FIGS. 10A-10C illustrate different conformational configurations of a triazine polymer embodiment wherein the polymer is a hexamer of triazine monomers with pentanethiol side chains, joined by propylene diamine linkers; the side chains are hidden to more clearly show the backbone structure.
Figure 10B:
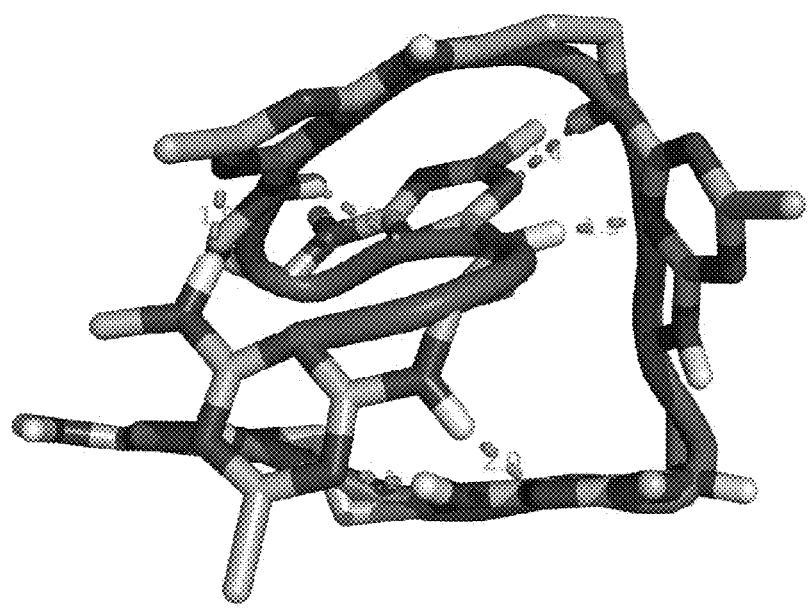
Figure 10C:
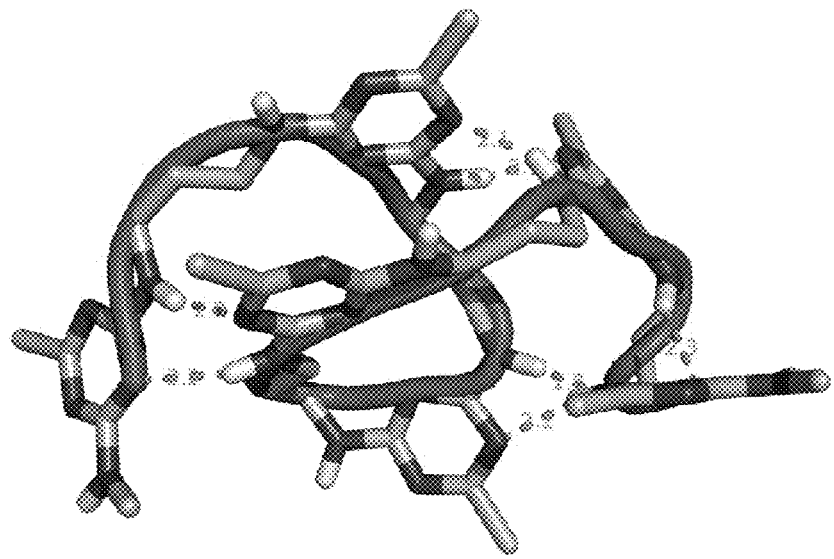
Figure 11A:
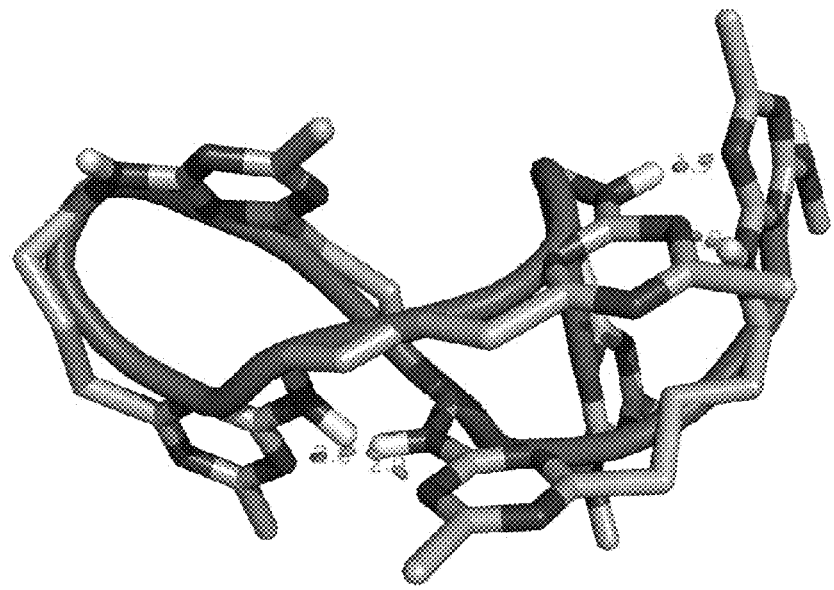
FIGS. 11A-11C illustrate different conformational configurations of a triazine polymer embodiment wherein the polymer is a hexamer of triazine monomers with pentanethiol side chains, joined by 3-mercaptopropylamine linkers; the side chains are hidden to more clearly show the backbone structure.
Figure 11B:
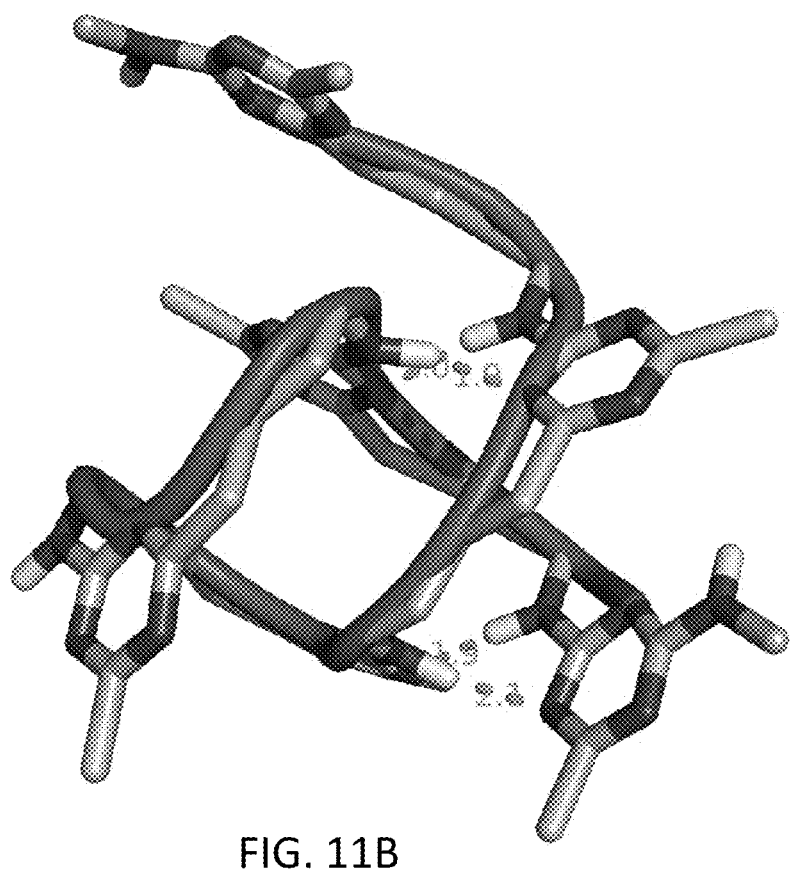
Figure 11C:
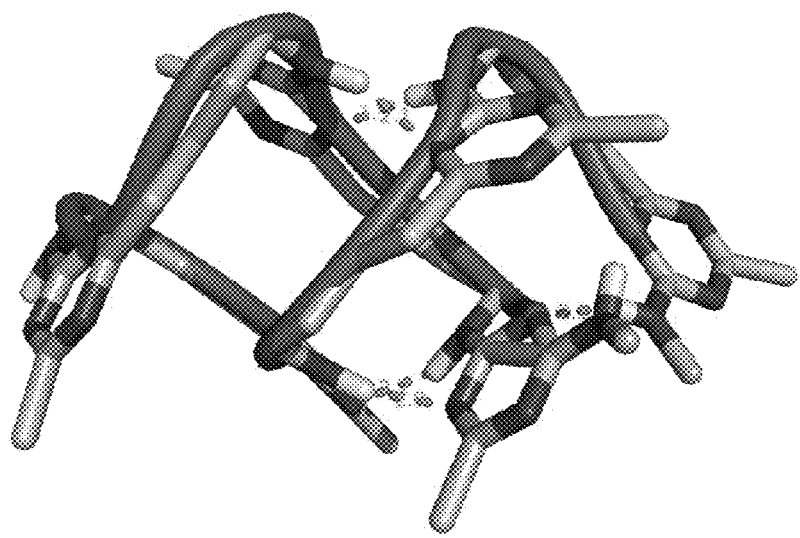

Entry 5 turn stabilized by "along-the-chain" hydrogen-bond
and additional interchain hydrogen-bonds FIGS. 7A and 7B illustrate an alpha helical structure that can be constructed from the types of polymer disclosed herein, where "along the chain" hydrogen bonds as described above (and illustrated in entries 4 and 5 in Table 7) can help to establish and maintain a helical structure.

Additional simulations of other exemplary polymer structures have been carried out with a variety of side chains and linkers. The components of these additional simulated polymer structures are provided in Table 8.

TABLE 8-continued

| | Simulated Structures* | | |
|---|---|---|---|
| Triazine Rings | Side Chain | Linker | Endgroups |
| 6 | Pentanethiol | 3-mercapto-propylamine | methyl amine |
| 6 | Pentanethiol | propylene diamine | methyl amine |
| 6 | Pentanethiol | 3-mercapto-propylamine | methyl amine |
| 12 | Ethanethiol | Ethylene diamine | methyl amine |
| 12 | Ethanethiol | ((S)1-methyl)-ethylenediamine | methyl amine |
| 12 | Ethanethiol | ((S)2-mercapto-1-methyl)-ethylamine | methyl amine |

*Side chains, linker, and endgroups are indicated by the molecular species that would be used to create these components of the polymer structure.

Selected examples of conformations found in the molecular dynamics simulations are illustrated in FIGS. 8-11. Variations in polymer structure lead to variations in the conformations that arise and their structures. Hence, polymers of the types disclosed herein can be synthesized with different structures to obtain molecules that organize differently and lead to various functions and uses.

Additional structures can also be made using the molecular precursors, submonomers, and methods of combining such components disclosed herein. In some embodiments, branched polymers can be produced, such as that illustrated in Scheme 20. Given hydrogen bonding motifs already described, with multiple backbone-backbone hydrogen bonds, the arms between one branched polymer and another branched polymer may interact as illustrated below (wherein the branched side arms and the core triazine ring are illustrated).

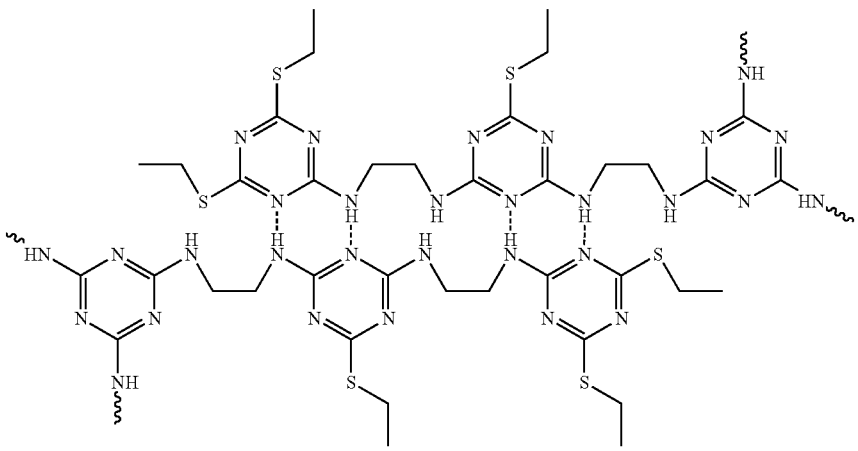

TABLE 8

| | Simulated Structures* | | |
|---|---|---|---|
| Triazine Rings | Side Chain | Linker | Endgroups |
| 6 | Ethanethiol | Ethylene diamine | methyl amine |
| 6 | Ethylamine | Ethylene diamine | methyl amine |
| 6 | Pentanethiol | Ethylene diamine | methyl amine |
| 6 | Pentanethiol | ((S)1-methyl)-ethylenediamine | methyl amine |
| 6 | Pentanethiol | ((S)2-mercapto-1-methyl)-ethylamine | methyl amine |

An exemplary embodiment wherein this type of interaction produces networks of branched macromolecules is illustrated below. These networks can be used to form layers or membranes, with pores, that are functionalized by side chains. With reference to this example, the triangles denote central triazine rings that have three sequence-defined arms coming off the carbons of the triazine ring. In some embodiments, similar branched structures comprising just one to three or more triazine ring-based monomer units in each arm, or structures with uneven arms, can be made.

Figure 12A:
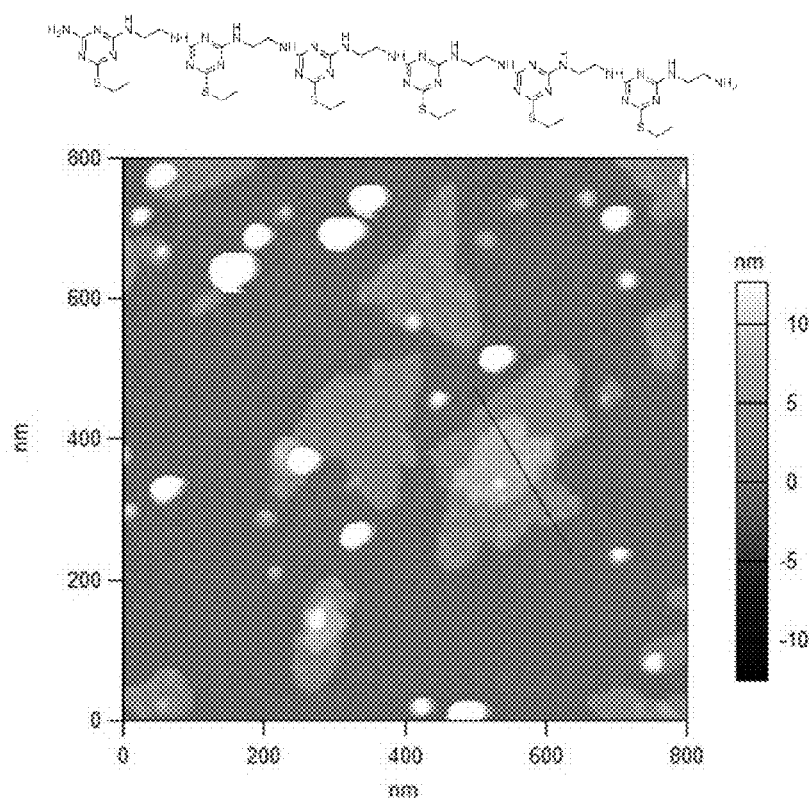
FIGS. 12A and 12B illustrate self-assembly of an exemplary polymer as imaged by atomic force microscopy (AFM); the exemplary polymer in 12A was dissolved in a methanol:water solution and this solution was contacted with a freshly cleaved mica surface, the image of which is also illustrated in FIG. 12A.
Figure 12B:
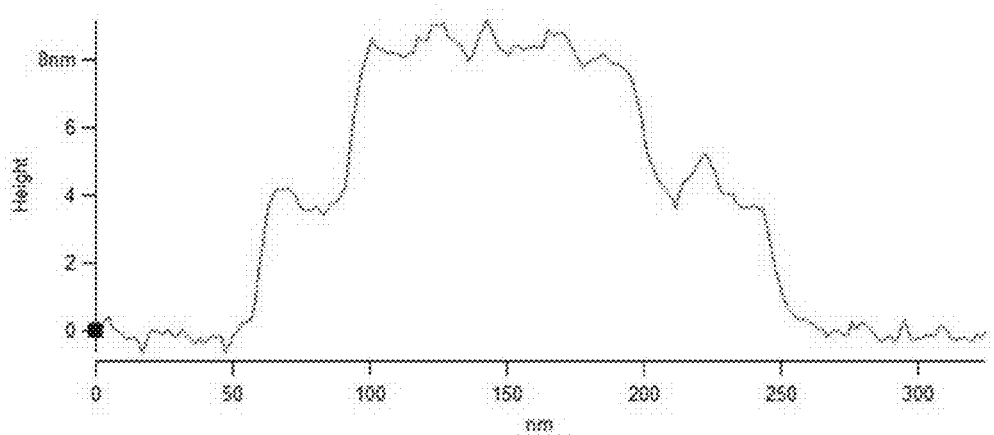
Figure 13A:
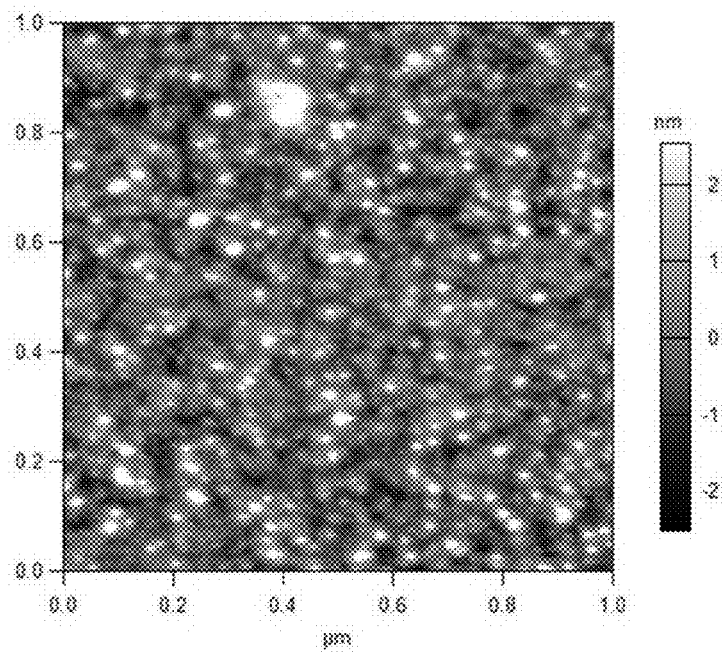
FIGS. 13A and 13B show results obtained from dissolving an exemplary polymer in MeOH and incubating the sample on mica (FIG. 13A) and graphite (FIG. 13B) for 10 days.
Figure 13B:
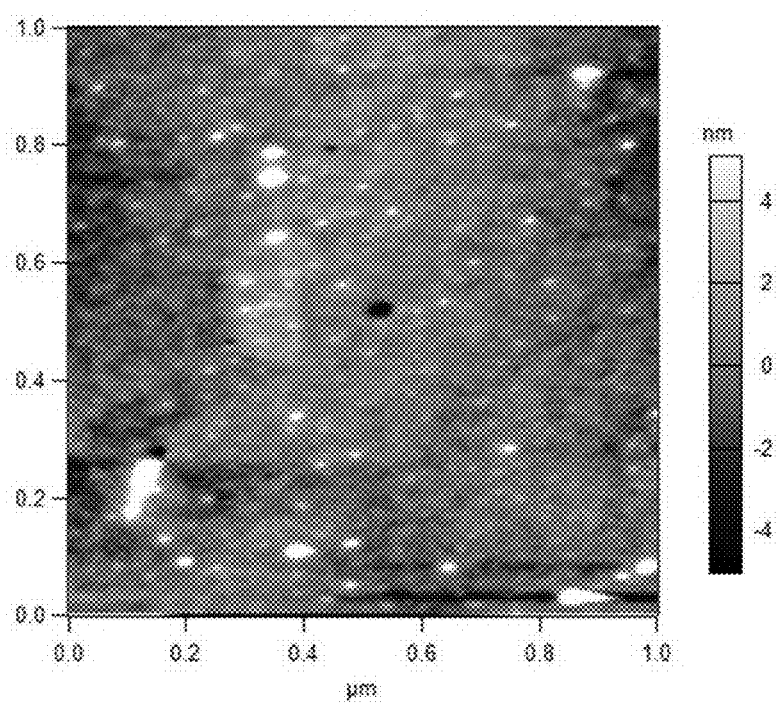
Figure 14A:
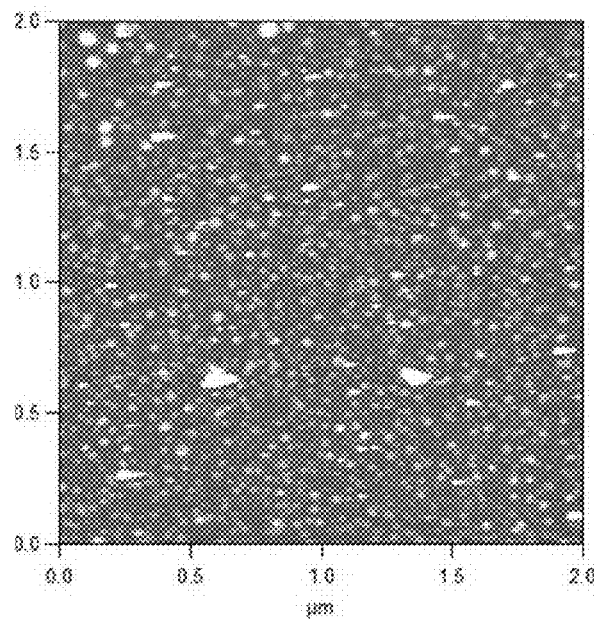
FIGS. 14A and 14B show results obtained from dissolving an exemplary polymer in 75% MeOH and incubating the sample on mica for 5 days.
Figure 14B:
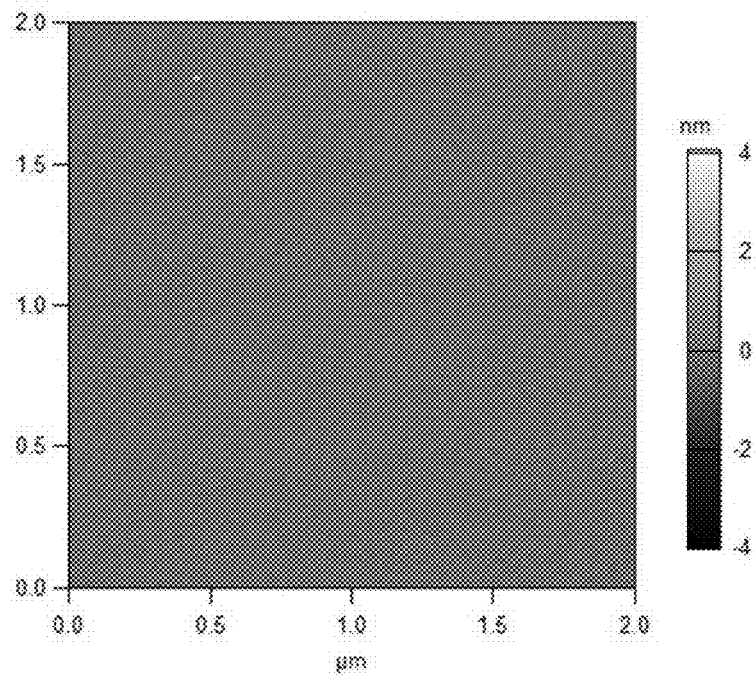
Figure 15A:
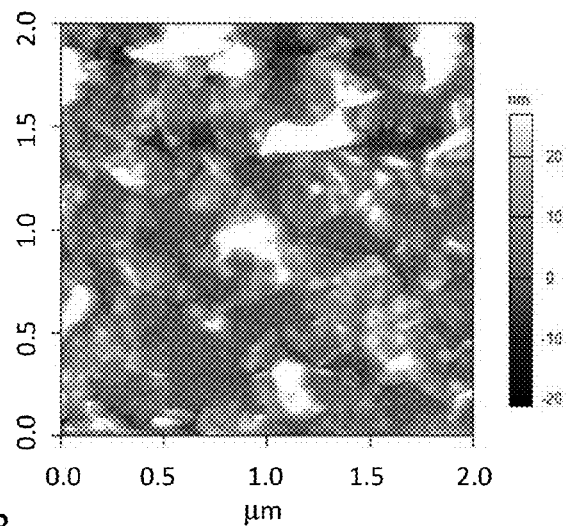
FIGS. 15A-15C show results obtained from dissolving an exemplary polymer in 50% MeOH and incubating the sample on mica for 5 days.
Figure 15B:
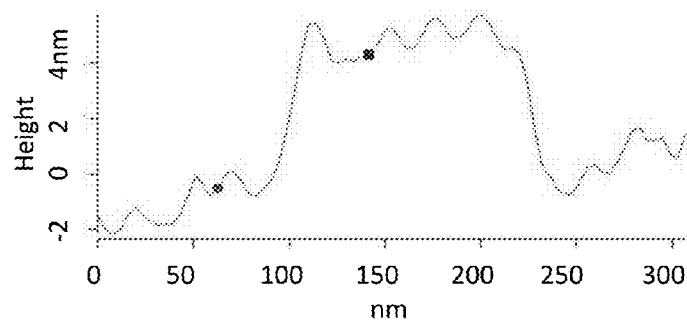
Figure 15C:
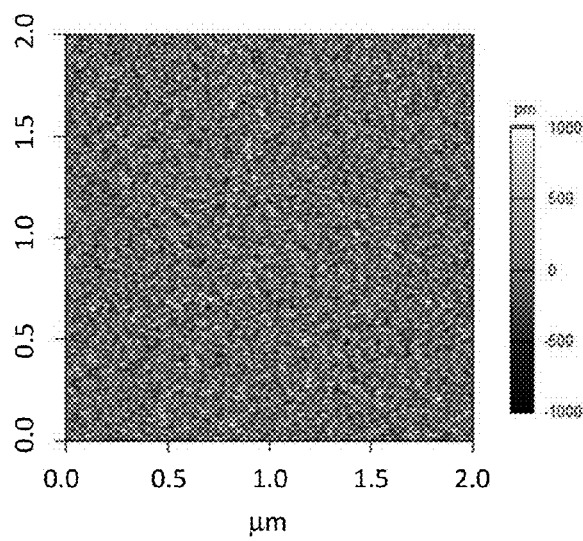
Figure 16A:
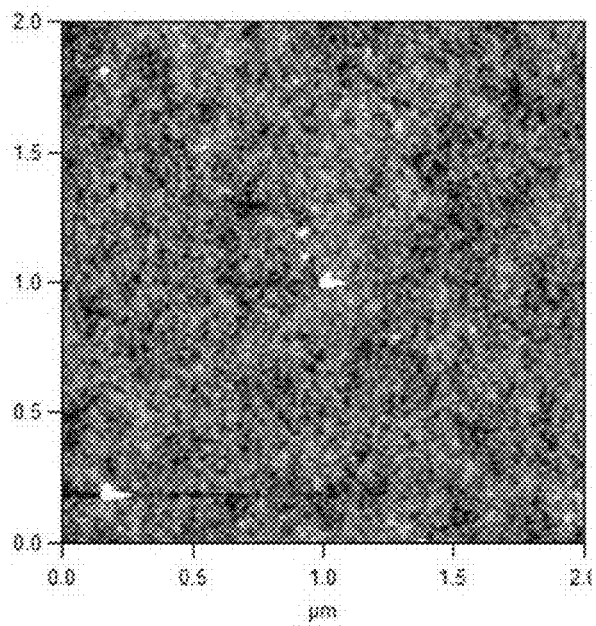
FIGS. 16A and 16B show results obtained from dissolving an exemplary branched polymer in toluene and incubating the sample on mica for 7 days.
Figure 16B:
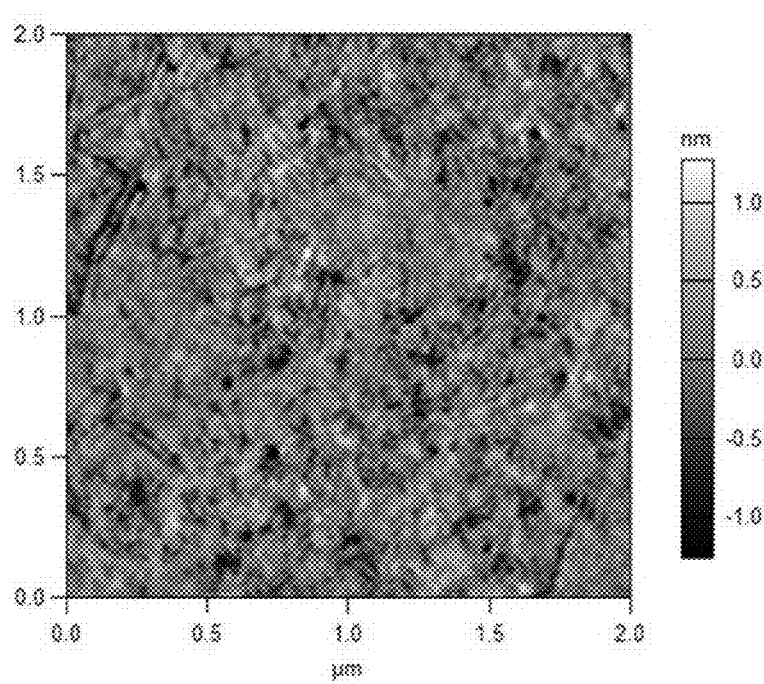
Figure 17:
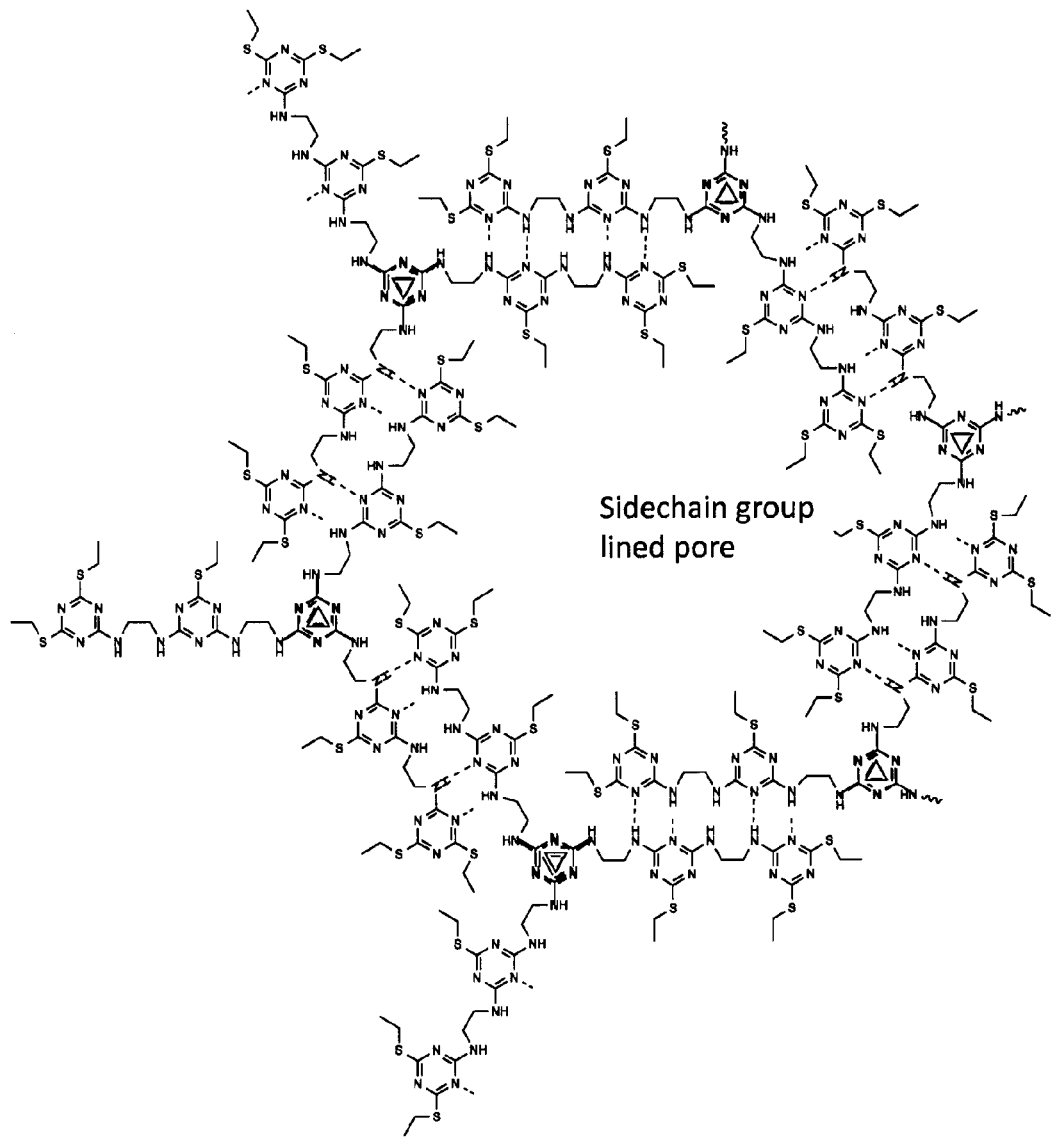
FIG. 17 illustrates an exemplary network of branched macromolecules.

Whereas FIGS. 1 and 2 showed the assembly of an exemplary polymer into crystals, platelets, or membranes, FIGS. 12A and 12B show assembly of an exemplary polymer of defined length on a mica surface, using atomic force microscopy for imaging. A hexamer with ethane thiol-derived side chains and ethylenediamine-derived linker sections (FIG. 12A) was dissolved in a solution containing methanol and water. Contact of this solution with a freshly cleaved mica surface results in the formation of islands of polymer material assembled on the mica surface. These islands are seen as lighter regions of the image in FIG. 12A, and are of discrete height. Some islands have regions of multiple heights. As shown in the x-y graphical plot in FIG. 12B, representing height above the surface as the AFM tip scans along a line, the surface rises to an island of approximately 4 nm in height, and then again to a region on the island of approximately 8 nm in height. In the main image, additional regions are seen in white with a maximum height of approximately 12 nm. From certain ratios of methanol and water, these assembled structures were observed whether the solution contacted the surface for 5 hours or just one minute. Thus, self-assembly of an examplary polymer into orderly solid structures on a surface has been demonstrated in this example. Additional embodiments are shown in FIGS. 13-16.

VII. EXAMPLES

Molecular Precursors and Monomer Syntheses

Reagents and General Procedures.

Reagents were obtained from commercial sources and used as purchase. Organic solvents were purchased anhydrous and used without further purification. Unless otherwise noted, all reactions were carried out at room temperature in oven-dried glassware with magnetic stifling. Organic solutions were concentrated under diminished pressure with bath temperatures <40° C. Flash column chromatography was carried out on silica gel G60 (Silicycle, 60-200 µm, 60 Å). Thin-layer chromatography (TLC) was carried out on Silica gel 60 $F_{254}$ (EMD Chemicals Inc.) with detection by UV absorption (254 nm) were applicable, and by spraying with 20% sulfuric acid in ethanol followed by charring at ~150° C. or by spraying with a solution of $(NH_4)_6Mo_7O_{24} \cdot H_2O$ (25 g/L) in 10% sulfuric acid in ethanol followed by charring at ~150° C. $^1H$ and $^{13}C$ NMR spectra were recorded on a Varian Inova-500 (500/125 MHz) equipped with sun workstations. Multiplicities are quoted as singlet (s), broad singlet (br s), doublet (d), doublet of doublets (dd), triplet (t), or multiplet (m). Spectra were assigned using COSY, DEPT and HSQC experiments. All chemical shifts are quoted on the δ-scale in parts per million (ppm). Residual solvent signals were used as an internal reference. Reverse-Phase HPLC was performed on an Aglient 1100 series system equipped with an autosampler, fraction-collector, UV-detector and Aquasil-C18 column (5 µm particle size, 4.6×250 mm, 100 Å pore size) at a flow rate of 1.0 mL/min. Mass spectra were recorded on an Agilent Technologies 6530 Accurate-Mass Q-TOF LC/MS. The calibrant is Standard ESI-L low concentration Tuning Mix with addition of 0.1 mM HP-0321.

General Procedure for Synthesis of Mono-Substituted s-Triazine.

To a stirred and cooled (0° C.) solution of cyanuric chloride (2.60 g, 14.1 mmol) and N,N-diisopropylethylamine (2.70 mL, 15.5 mmol) in THF (40 mL) was added thiol or amine compounds (14.1 mmol in 20 mL THF) dropwise for 45 minutes. The resulting reaction mixture was stirred at the same temperature for 3 hours. The reaction mixture was diluted with 0.5 M HCl (40 mL) and DCM (200 mL). The organic solution was washed with saturated $NaHCO_3$ (200 mL) and brine (200 mL). The organic phase was dried ($MgSO_4$), filtered and the filtrate was concentrated under reduced pressure. The resulting oil/solid was purified by flash chromatography over silica gel (EtOAc/hexanes) to give the pure product.

General Procedure for Synthesis of Di-Substituted s-Triazine.

To a stirred and cooled (0° C.) solution of mono-substituted s-triazine compound (4.52 mmol) and N,N-diisopropylethylamine (1.05 mL, 5.88 mmol) in THF (15 mL) was added tert-butyl 2-aminoethylcarbamate (3) (796 mg, 4.97 mmol in 5 mL THF) dropwise for 15 minutes. After stifling at room temperature for 2 hours, the reaction mixture was diluted with 0.5 M HCl (10 mL) and DCM (100 mL). The organic solution was washed with saturated $NaHCO_3$ (100 mL) and brine (100 mL). The organic phase was dried ($MgSO_4$), filtered and the filtrate was concentrated under reduced pressure. The resulting oil/solid was purified by flash chromatography over silica gel (EtOAc/hexanes) to give pure product.

General Procedure for Synthesis of Tri-Substituted s-Triazine.

A mixture of compound containing ethylenediamine linker (10, 12, 14 and 16) (1 equivalent), compound 2b (1.5 equivalents) and N,N-diisopropylethylamine (2 equivalents) in acetonitrile was heated to reflux until ESI-MS analysis indicated disappearance of starting material (~1 hour). The reaction mixture was diluted with 0.5 M HCl and DCM. The organic solution was washed with saturated $NaHCO_3$ and brine. The organic phase was dried ($MgSO_4$), filtered and the filtrate was concentrated under reduced pressure. The resulting oil/solid was purified by flash chromatography over silica gel (EtOAc/hexanes) to give pure product.

General Procedure for Deprotection of Boc Carbamate.

To a stirred and cooled (0° C.) solution of starting material in DCM (~0.05-0.1 M solution) was added trifluoroacetic acid (TFA) (final concentration=50%) dropwise. After stifling at room temperature for 1 hour, the reaction mixture was diluted with DCM and was washed with water (2 times), saturated $NaHCO_3$ (2 times) and brine. The organic phase was dried ($MgSO_4$), filtered and the filtrate was concentrated under reduced pressure. The resulting oil/solid was used with any further purification.

[a]Experimental Scheme A

Preparation of mono and di-substituted s-triazine compounds.
[a]Reagents and conditions: (a) DIPEA, THF, 0° C.; ethanethiol (1a, 91%); thiophenol (1b, 87%), 1-decanethiol (1c, 89%); 4-chlorobenzenemethanethiol (1d, 90%); aniline (1e, 91%); (b) DIPEA, THF; (2a, 88%); (2b, 91%).

Scheme A

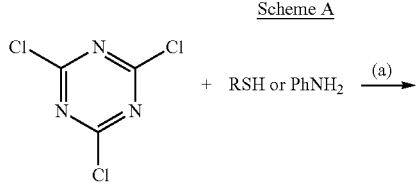

-continued

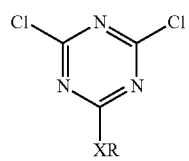

1a XR = SEt
1b XR = SPh
1c XR = SC₁₀H₂₁
1d XR = 4-chlorobenzylthio
1e XR = HNPh

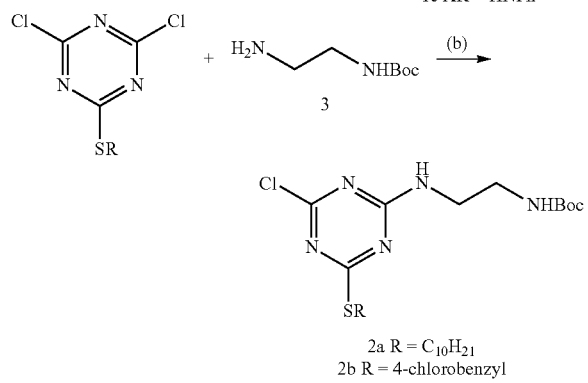

2a R = C₁₀H₂₁
2b R = 4-chlorobenzyl

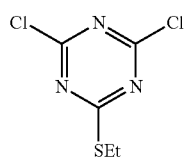

2-ethylthio-4,6-dichloro-s-triazine (1a)

According to general procedure for synthesis of mono-substituted s-triazine, compound 1a was prepared from ethanethiol (1.02 mL, 14.1 mmol). The resulting oil was purified by flash chromatography over silica gel (EtOAc/hexanes, 1/25→1/20, v/v) to give 1a (2.69 g, 91%) as a colorless oil: $R_f$=0.29 (EtOAc/hexanes, 1/50, v/v); HRMS of 1a: m/z: calcd for $C_5H_5Cl_2N_3S$ $[M+H]^+$: 209.9654. found: 209.9653.

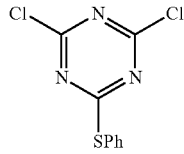

2-phenylthio-4,6-dichloro-s-triazine (1b)

According to general procedure for synthesis of mono-substituted s-triazine, compound 1b was prepared from thiophenol (1.44 mL, 14.1 mmol). The resulting solid was purified by flash chromatography over silica gel (EtOAc/hexanes, 1/25→1/20, v/v) to give 1b (3.17 g, 87%) as an amorphous white solid: $R_f$=0.51 (EtOAc/hexanes, 1/20, v/v); HRMS of 1b: m/z: calcd for $C_9H_5Cl_2N_3S$ $[M+H]^+$: 257.9654. found: 257.9659.

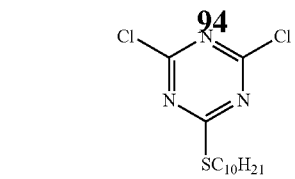

2-(1-decyl)thio-4,6-dichloro-s-triazine (1c)

According to general procedure for synthesis of mono-substituted s-triazine, compound 1c was prepared from 1-decanethiol (2.46 g, 14.1 mmol). The resulting oil was purified by flash chromatography over silica gel (EtOAc/hexanes, 25/1→20/1, v/v) to give 1c (4.04 g, 89%) as a colorless oil: $R_f$=0.31 (EtOAc/hexanes, 1/50, v/v). HRMS of 1c: m/z: calcd for $C_{13}H_{21}Cl_2N_3S$ $[M+H]^+$: 322.0906. found: 322.0918.

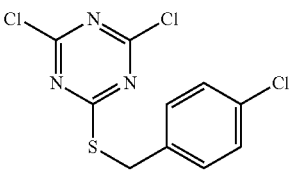

2-(4-chlorobenzyl)thio-4,6-dichloro-s-triazine (1d)

According to general procedure for synthesis of mono-substituted s-triazine, compound 1d was prepared from 4-chlorobenzenemethanethiol (1.41 mL, 14.1 mmol). The resulting solid was purified by flash chromatography over silica gel (EtOAc/hexanes, 1/25→1/20, v/v) to give 1d (3.89 g, 90%) as an amorphous white solid: $R_f$=0.41 (EtOAc/hexanes, 1/20, v/v); HRMS of 1d: m/z: calcd for $C_{10}H_6Cl_3N_3S$ $[M+H]^+$: 305.9421. found: 305.9436.

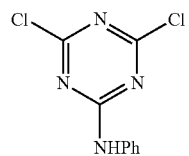

2-phenylamino-4,6-dichloro-s-triazine (1e)

According to general procedure for synthesis of mono-substituted s-triazine, compound 1e was prepared from aniline (1.3 mL, 14.1 mmol). The resulting solid was purified by flash chromatography over silica gel (EtOAc/hexanes, 1/20→1/9, v/v) to give 1e (3.09 g, 91%) as an amorphous white solid: $R_f$=0.32 (EtOAc/hexanes, 1/8, v/v); HRMS of 1: m/z: calcd for $C_9H_6Cl_2N_4$ $[M+H]^+$: 241.0042. found: 241.0037.

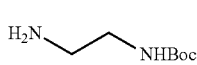

tert-Butyl 2-aminoethylcarbamate (3)

To a stirred and cooled (0° C.) solution of ethylenediamine (26.7 mL, 400 mmol) in DCM (300 mL) was added di-tert-butyl dicarbonate (8.7 g, 40 mmol in 200 mL DCM) dropwise for 3 hours. After stirring at room temperature for 24 hours, the solvent was removed under reduced pressure. The crude product was dissolved in saturated NaHCO₃ (100 mL) and was extracted with DCM (3×100 mL). The organic phase was dried (MgSO₄), filtered and the filtrate was concentrated under reduced pressure to give crude 3 (6.4 g, 100%) as a colorless oil. Compound 3 was used with any purification. HRMS of 3: m/z: calcd for $C_7H_{16}N_2O_2$ [M+H]⁺: 161.1285. found: 161.1277.

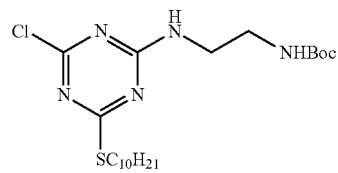

2a 2-(1-decyl)thio-4-(tert-butyl 2-aminoethylcarbamate)-6-dichloro-s-triazine (2a)

According to general procedure for synthesis of di-substituted s-triazine, compound 2a was prepared from mono-substituted compound 1c (1.46 g, 4.52 mmol). The resulting oil was purified by flash chromatography over silica gel (EtOAc/hexanes, 1/3→1/4, v/v) to give 2a (1.78 g, 88%) as an amorphous white solid: $R_f$=0.31 (EtOAc/hexanes, 1/4, v/v); HRMS of 2a: m/z: calcd for $C_{20}H_{36}ClN_5O_2S$ [M+H]⁺: 446.2351. found: 446.2354.

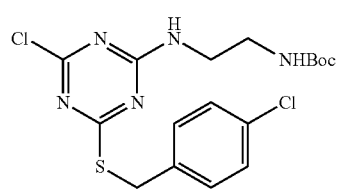

2b 2-(4-chlorobenzyl)thio-4-(tert-butyl 2-aminoethylcarbamate)-6-dichloro-s-triazine (2b)

According to general procedure for synthesis of di-substituted s-triazine, compound 2b was prepared from mono-substituted compound 2b (1.38 g, 4.52 mmol). The resulting crude product was purified by flash chromatography over silica gel (EtOAc/hexanes, 1/3→1/2, v/v) to give 2b (1.77 g, 91%) as an amorphous white solid: $R_f$=0.45 (EtOAc/hexanes, 1/2, v/v); HRMS of 2b: m/z: calcd for $C_{17}H_{21}Cl_2N_5O_2S$ [M+H]⁺: 430.0866. found: 430.0878.

Stepwise Synthesis of Triazine Polymer Using Protected Monomers

In this example, triazine polymers are made using the synthetic methods illustrated below. The triazine polymers can be made to have more than three monomers and either can be homopolymers or heteropolymers.

ᵃExperimental Scheme B

Stepwise solution phase synthesis using a deprotection method.

ᵃReagents and conditions: (a) 7, toluene, Dean Stark, 120° C.; (b) NaBH₄, MeOH then Ac₂O, Et₃N, MeOH (3 steps, 86%); (c) TFA/DCM; (d) 2b, DIPEA, CH₃CN, reflux (11, 88%; 13, 93%, 15, 86%).

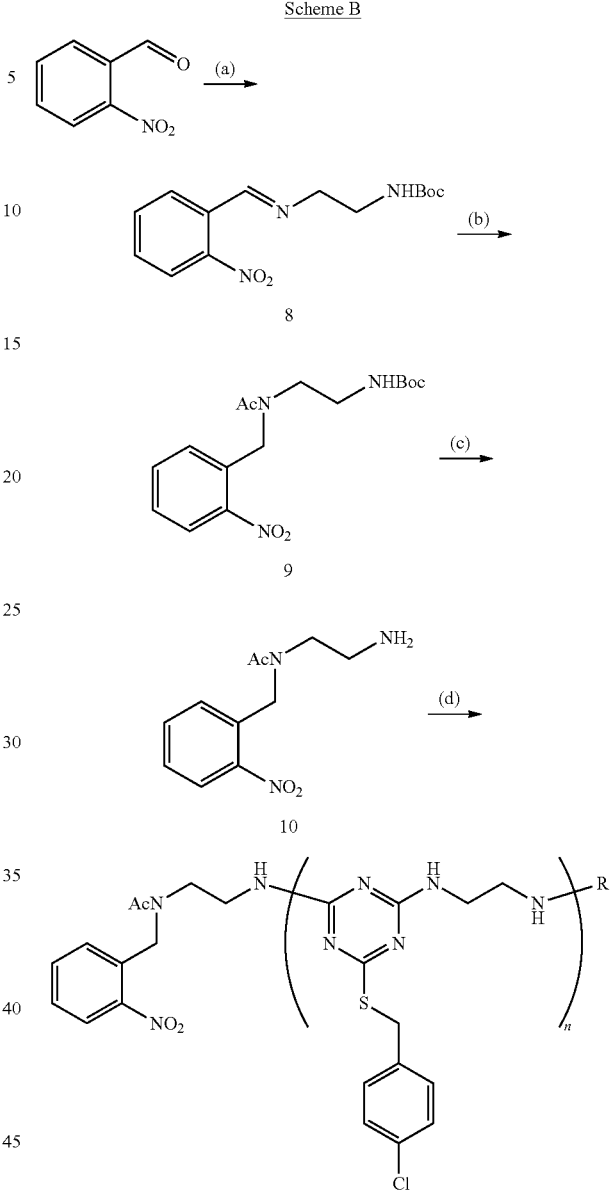

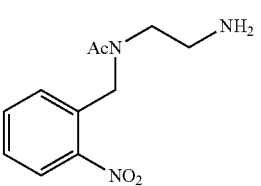

Compound 10.

A stirred solution of 2-nitrobenzaldehyde (1.98 g, 13.1 mmol) and tert-butyl 2-aminoethylcarbamate (3) (2.1 g, 13.1 mmol) in toluene (80 mL) was heated to 120° C. with Dean Stark apparatus for 5 hours. The reaction mixture was concentrated under reduced pressure to give crude 8 as a brown syrup. Crude compound 8 was dissolved in MeOH (80 mL) and sodium borohydride (510 mg, 13.5 mmol) was added in small portion. After stirring for 1 hour, the reaction mixture was diluted with acetone (20 mL). The solvent was removed under reduced pressure to give an amorphous brown solid. Without purification, this crude product was dissolved in MeOH (80 mL), and triethylamine (4 mL) and acetic anhydride (4 mL, excess) were added. After stirring for 2 hours, the reaction mixture was diluted with DCM (150 mL). The organic solution was washed with saturated NaHCO$_3$ (150 mL), and brine (120 mL). The organic phase was dried (MgSO$_4$), filtered and the filtrate was concentrated under reduced pressure. The resulting brown oil was purified by flash chromatography over silica gel (EtOAc/hexanes/DCM, 2/1/1, v/v) to give 9 (3.80 g, 86% over 3 steps) as an amorphous yellow solid: R$_f$=0.24 (EtOAc/hexanes, 5/2, v/v); HRMS of 9: m/z: calcd for C$_{16}$H$_{23}$N$_3$O$_5$ [M+Na]$^+$: 360.1530. found: 360.1522. According to general procedure for deprotection of Boc carbamate, compound 10 was prepared from compound 9 (398 mg, 1.18 mmol) in DCM (5 mL) and TFA (5 mL). HRMS of 10: m/z: calcd for C$_{11}$H$_{15}$N$_3$O$_3$ [M+H]$^+$: 238.1186. found: 238.1179.

Compound 11.

According to general procedure for synthesis of tri-substituted s-triazine, compound 11 was prepared from 10 (crude, 1.18 mmol), 2b (759 mg, 1.77 mmol) and N,N-diisopropylethylamine (0.4 mL, 2.36 mmol) in CH$_3$CN (15 mL). The resulting solid was purified by flash chromatography over silica gel (EtOAc/hexanes, 2/1→MeOH/DCM, 1/30, v/v) to give 11 (655 mg, 88%) as an amorphous yellow solid: R$_f$=0.41 (MeOH/DCM, 1/20, v/v); HRMS of 11: m/z: calcd for C$_{28}$H$_{35}$ClN$_8$O$_5$S [M+H]$^+$: 631.2212. found: 631.2223.

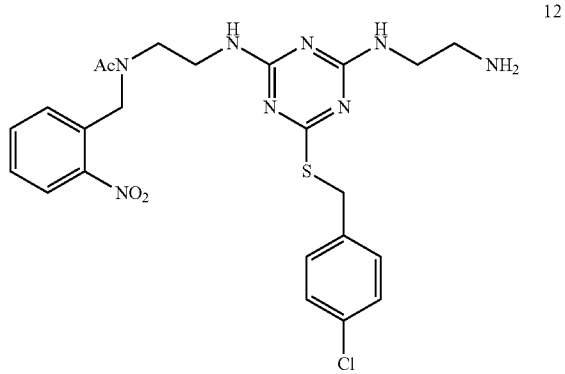

12

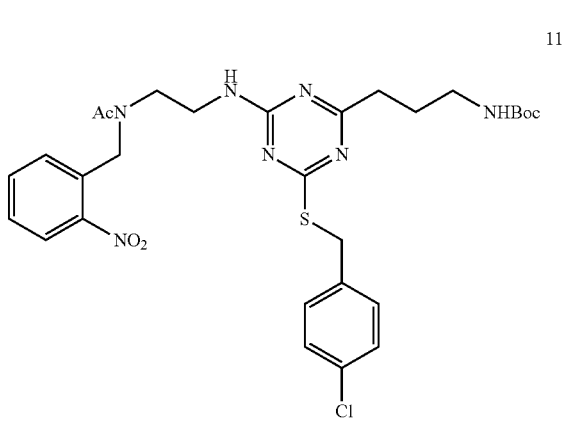

11

Compound 12.

According to general procedure for deprotection of Boc carbamate, compound 12 was prepared from compound 11 (436 mg, 0.692 mmol) in DCM (4 mL) and TFA (4 mL). HRMS of 12: m/z: calcd for C$_{23}$H$_{27}$ClN$_8$O$_3$S [M+H]$^+$: 531.1688. found: 531.1671.

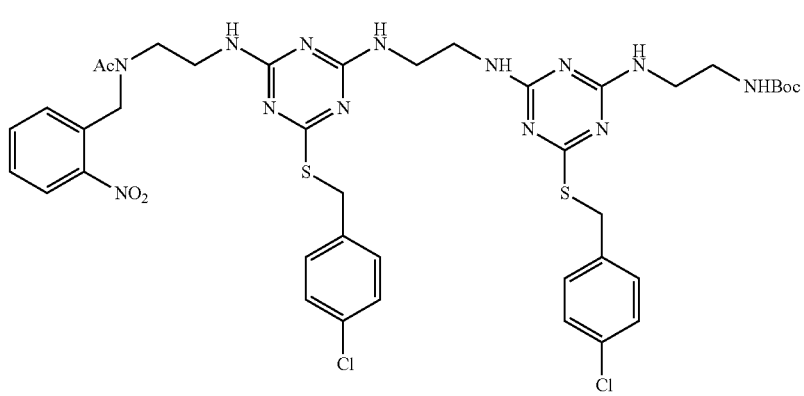

13

Compound 13.

According to general procedure for synthesis of tri-substituted s-triazine, compound 13 was prepared from 12 (crude, 0.692 mmol), 2b (446 mg, 1.04 mmol) and N,N-diisopropylethylamine (0.18 mL, 1.38 mmol) in $CH_3CN$ (12 mL). The resulting solid was purified by flash chromatography over silica gel (EtOAc/hexanes, 2/1→MeOH/DCM, 1/30, v/v) to give 13 (595 mg, 93%) as an amorphous yellow solid: $R_f$=0.35 (MeOH/DCM, 1/20, v/v); HRMS of 13: m/z: calcd for $C_{40}H_{47}Cl_2N_{13}O_5S_2$ [M+H]$^+$: 924.2714. found: 924.2677.

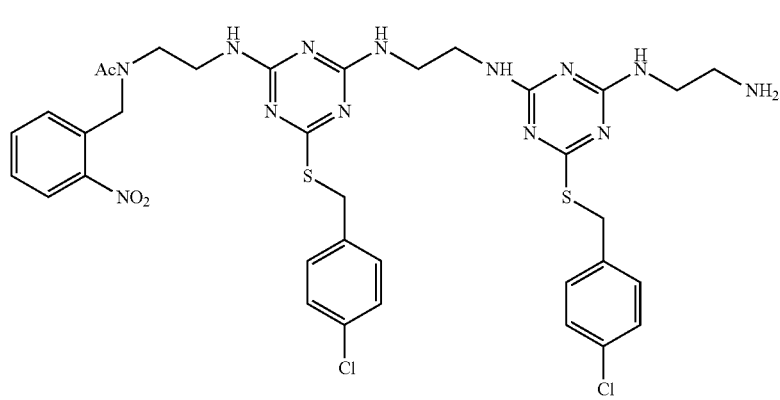

14

Compound 14.

According to general procedure for deprotection of Boc carbamate, compound 14 was prepared from compound 13 (475 mg, 0.514 mmol) in DCM (4 mL) and TFA (4 mL). HRMS of 14: m/z: calcd for $C_{35}H_{39}Cl_2N_{13}O_3S_2$ [M+H]$^+$: 824.2190. found: 824.2184.

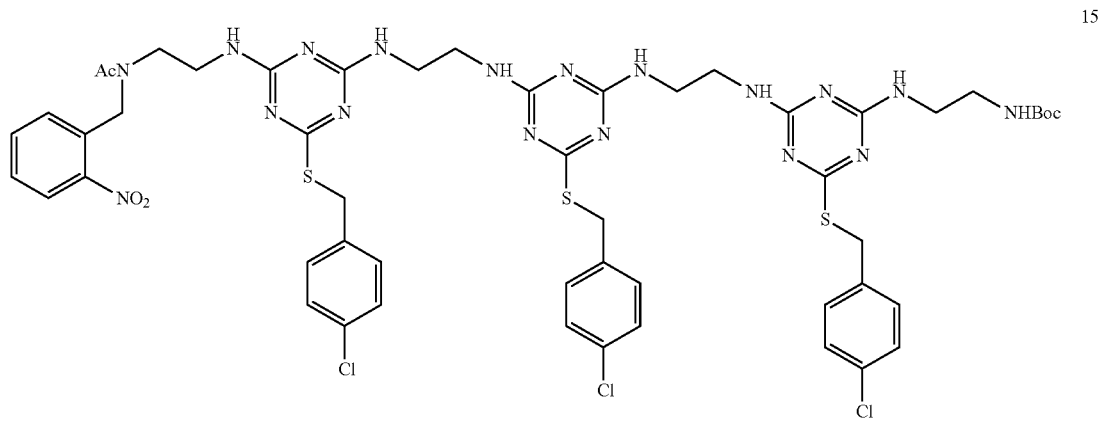

15

Triazine Polymer 15.

According to general procedure for synthesis of tri-substituted s-triazine, compound 15 was prepared from 14 (crude, 0.514 mmol), 2b (330 mg, 0.771 mmol) and N,N-diisopropylethylamine (0.18 mL, 1.03 mmol) in $CH_3CN$ (12 mL). The resulting solid was purified by flash chromatography over silica gel (EtOAc/hexanes, 2/1→MeOH/DCM, 1/30, v/v) to give 15 (539 mg, 86%) as an amorphous yellow solid: $R_f$=0.31 (MeOH/DCM, 1/20, v/v); HRMS of 15: m/z: calcd for $C_{52}H_{59}Cl_3N_{18}O_5S_3$ [M+H]$^+$: 1217.3216. found: 1217.3255.

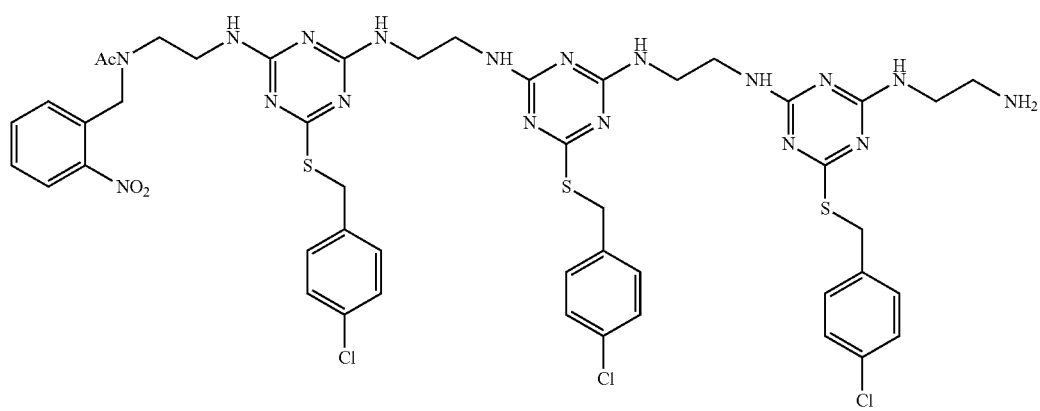

16

Triazine Polymer 16.

According to general procedure for deprotection of Boc carbamate, compound 16 was prepared from compound 15 (324 mg, 0.266 mmol) in DCM (3 mL) and TFA (3 mL). HRMS of xx: m/z: calcd for $C_{47}H_{51}Cl_3N_{18}O_3S_3$ [M+H]$^+$: 1117.2692. found: 1117.2747.

Stepwise Synthesis of Triazine Polymers by a Submonomer Method, Including a Sequence-Defined Polymer In this example, triazine polymers are made using the synthetic methods illustrated below. The triazine polymers can be made to have more than six monomers and either can be homopolymers or heteropolymers; linkers also can be modified within the polymer chain.

General Procedure for Submonomer Solid Phase Synthesis.

Triazine polymers were synthesized manually on Rink amide resin (60 mg, 0.046 mmol, loading: 0.77 mmol/g) involving a 2-step iterative process. Step 1: a mixture of mono-substituted s-triazine (10 equivalents), N,N-diisopropylethylamine (10 equivalents) and Rink amide resin was suspended in THF (1.2 mL). The resulting mixture was shaken at room temperature for 16 hours. The resin was filtered and washed successively with DCM and MeOH (3 times). Step 2: a mixture of ethylenediamine (20 equivalents), N,N-diisopropylethylamine (10 equivalents) and Rink amide resin was suspended in N-methyl-2-pyrrolidone (1.2 mL). The resulting mixture was shaken at 80° C. for 5 hours. The resin was filtered and washed successively with DCM and MeOH (3 times). Steps 1 and 2 were repeated until desired polymer sequence was obtained.

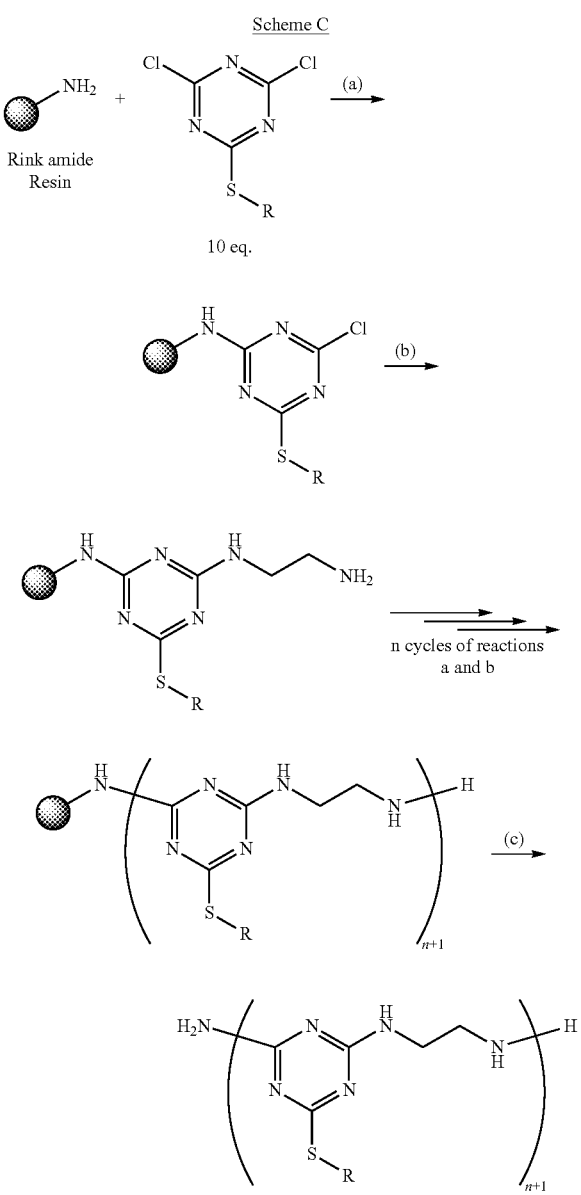

Scheme C $^a$Scheme C

Stepwise synthesis on a solid phase using a submonomer approach.
$^a$Reagents and conditions: (a) DIPEA, THF (b) DIPEA, ethylenediamine (20 equivalents), NMP, 80° C.; (c) TFA/DCM.

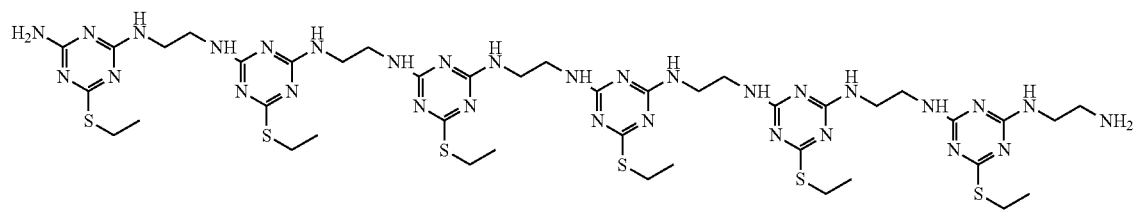

17

Polymer 17 was made using the conditions disclosed above for Scheme 5 using the general submonomer solid phase synthesis method. The crude product was purified by reversed phase HPLC on an analytical C-18 column to give, after evaporation of solvents under reduced pressure, 17 (39 mg, 71%, based on initial loading of the resin) as an amorphous white solid: HRMS of 20: m/z: calcd for $C_{42}H_{69}N_{31}S_6$ [M+H]$^+$: 1200.4749. found: 1200.4771.

HRMS of 19: m/z: calcd for $C_{55}H_{70}ClN_{31}S_6$ [M+H]$^+$: 1392.4516. found: 1392.4537.

In yet other embodiments, the following general procedure was used. Triazine polymers were synthesized manually on Rink amide resin (60 mg, 0.046 mmol, loading: 0.77 mmol/g) involving a 2-step process. Step 1: a mixture of mono-substituted s-triazine (10 equivalents), N,N-diisopropylethylamine (10 equivalents) and Rink amide resin was suspended in THF

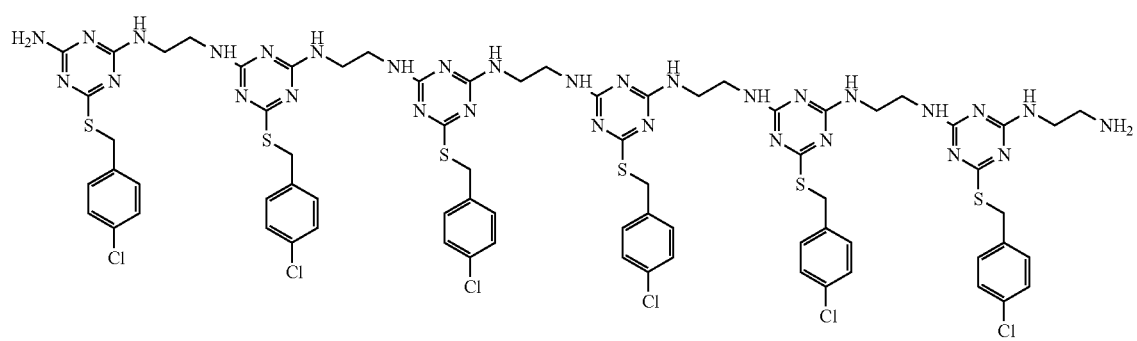

18

According to the general procedure for submonomer solid phase synthesis, triazine polymer 18 was prepared using triazine compound 1d: HRMS of 18: m/z: calcd for $C_{72}H_{75}Cl_6N_{31}S_6$ [M+H]$^+$: 1776.3350. found: 1776.3343.

(1.2 mL). The resulting mixture was shaken at 35° C. for 1 hour. The resin was filtered and washed successively with DCM and MeOH (3 times). Step 2: a mixture of ethylenediamine (20 equivalents), N,N-diisopropylethylamine (10

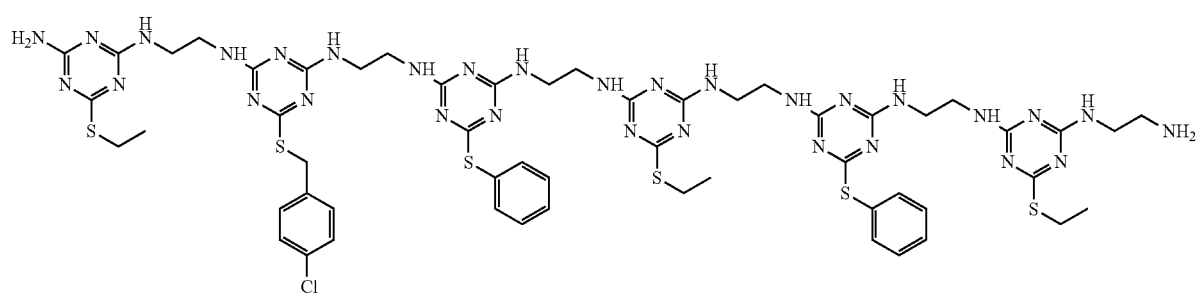

19

According to the general procedure for submonomer solid phase synthesis, sequence-defined triazine polymer 19 was prepared using triazine compound 1a, 1b and 1d in a defined sequence. The crude product was purified by reversed phase HPLC on an analytical C-18 column to give, after evaporation of solvents under reduced pressure, 19 (48 mg, 75%, based on initial loading of the resin) as an amorphous white solid:

equivalents) and Rink amide resin was suspended in N-methyl-2-pyrrolidone (1.2 mL). The resulting mixture was shaken at 80° C. for 30 minutes. The resin was filtered and washed successively with DCM and MeOH (3 times). Steps 1 and 2 were repeated until desired polymer sequence was obtained. The final product was cleaved from the resin by the reaction with 50% TFA/DCM for 20 minutes.

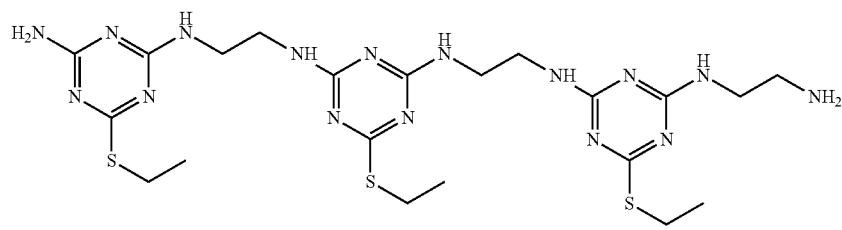

20

According to the general procedure for modified submonomer solid phase synthesis, compound 20 was prepared using triazine compound 1a. The crude product was purified by reversed phase HPLC on an analytical C-18 column to give, after evaporation of solvents under reduced pressure, 20 (23 mg, 81%, based on initial loading of the resin) as an amorphous white solid: HRMS of 20: m/z: calcd for $C_{21}H_{36}N_{16}S_3$ [M+H]$^+$: 609.2544. found: 609.2537.

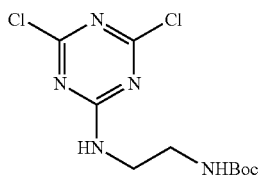

1f 2-(tert-butyl 2-aminoethylcarbamate)-4,6-dichloro-s-triazine (1f)

According to general procedure for synthesis of monosubstituted s-triazine, compound if was prepared from tert-Butyl 2-aminoethylcarbamate (2.26 g, 14.1 mmol). The resulting yellow solid was purified by flash chromatography over silica gel (EtOAc/hexanes, 1/4→1/2, v/v) to give 1f (3.87 g, 89%) as a pale yellow solid: $R_f$=0.27 (EtOAc/hexanes, 1/2, v/v); HRMS of 1f: m/z: calcd for $C_{10}H_{15}Cl_2N_5O_2$ [M+H]$^+$: 308.0676. found: 308.0662.

Triazine polymer 21

21

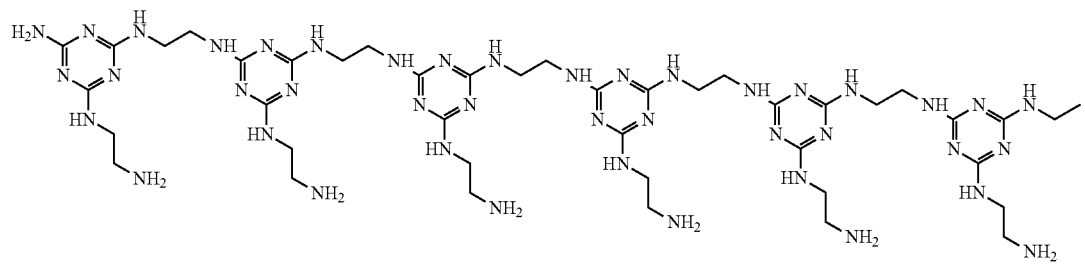

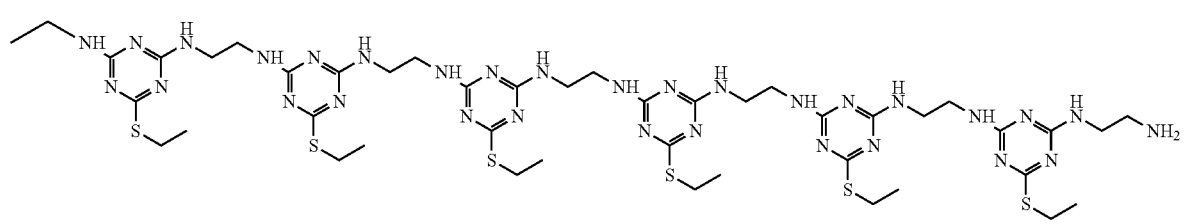

According to the general procedure for modified submonomer solid phase synthesis, triazine polymer 21 was prepared using triazine compounds 1a and 1f. In this embodiment, the functionalized group present in compound 1f acts as a side chain and not as a linker group. The crude product was purified by reversed phase HPLC on an analytical C-18 column to give, after evaporation of solvents under reduced pressure, 21 as an amorphous white solid: HRMS of 21: m/z: calcd for $C_{84}H_{147}N_{73}S_6$ $[M+2H]^{2+}$: 1186.1109. found: 1186.1066.

Scheme D

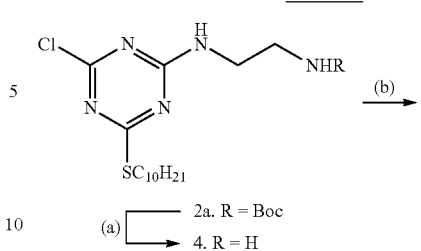

(a) ⟶ 2a. R = Boc
(b) ⟶ 4. R = H

Triazine polymer 22

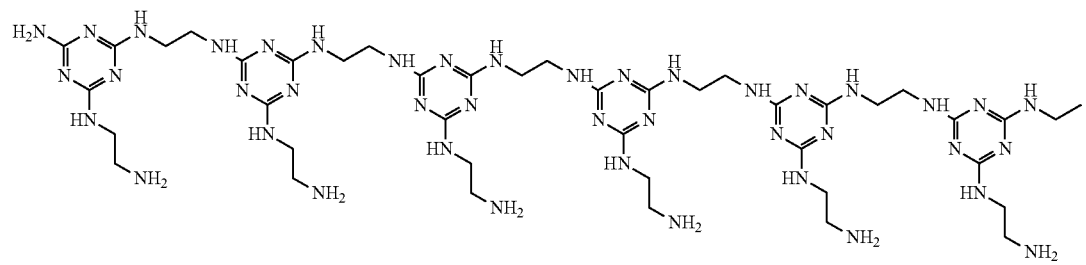

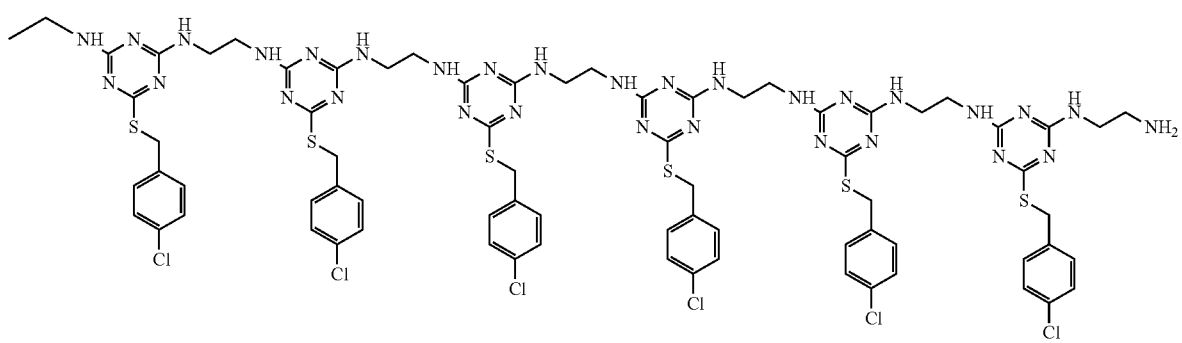

22

According to the general procedure for modified submonomer solid phase synthesis, triazine polymer 22 was prepared using triazine compounds 1d and 1f. The crude product was purified by reversed phase HPLC on an analytical C-18 column to give, after evaporation of solvents under reduced pressure, 22 as an amorphous white solid: HRMS of 22: m/z: calcd for $C_{114}H_{153}Cl_6N_{73}S_6$ $[M+2H]^{2+}$: 1474.0409. found: 1474.0452.

-continued

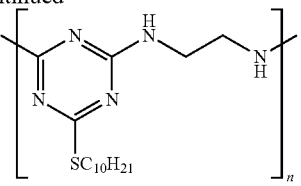

5

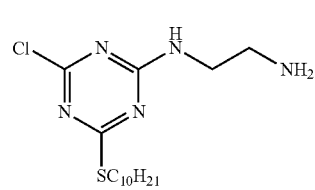

4

Synthesis of a Triazine Homopolymer with Long Hydrophobic Side Chains

*a*Scheme D

Synthesis of homopolymer 5.

*a*Reagents and conditions: (a) TFA/DCM; (b) KO*t*Bu, NMP, 120° C.

Compound 4.

According to general procedure for deprotection of Boc carbamate, compound 4 was prepared from di-substituted compound 2a (1.28 g, 2.87 mmol) in DCM (14 mL) and TFA (14 mL). HRMS of 2a: m/z: calcd for $C_{20}H_{36}ClN_5O_2S$ [M+H]$^+$: 446.2351. found: 446.2344.

Triazine Homopolymer 5.

To a stirred solution of crude 4 in N-methyl-2-pyrrolidone (28 mL) was added potassium tert-butoxide (644 mg, 5.74 mmol, 2 equivalents). The reaction mixture was heated to 120° C. for 16 hours. The reaction was added dropwise into water (120 mL) to remove excess potassium tert-butoxide and precipitate out the polymer. The crude product was collected by centrifugation, re-dissolved into N-methyl-2-pyrrolidone (20 mL) and re-precipitated by adding into water (200 mL). The resulting yellowish polymer 5 (470 mg, 53%) was collected by centrifugation and washed with water. GPC data: Mn=5330, Mw=6980, PDI=1.31.

Synthesis of Triazaine Polymer Via Dimer Precursors $^a$Scheme E

Synthesis of homopolymer from s-triazine dimer.
$^a$Reagents and conditions: (a) NaOH (2M), acetone/H$_2$O (75%); (b) Et$_3$N, CH$_3$CN, reflux Scheme E

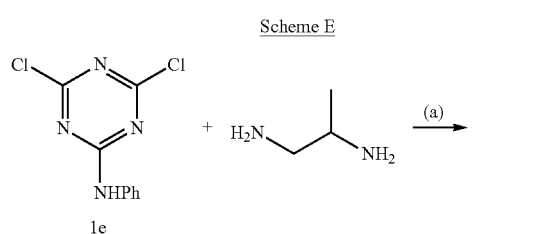

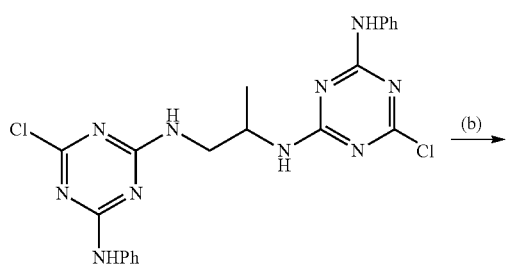

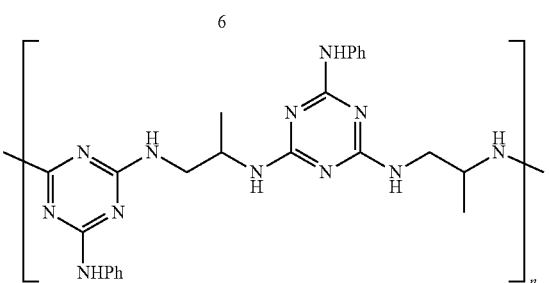

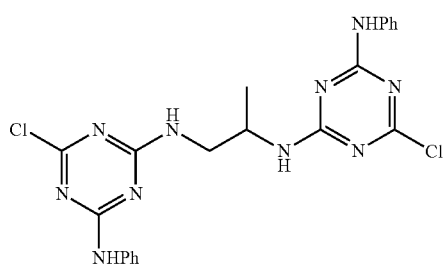

Compound 6.

To a stirred solution of 1e (1.00 g, 4.16 mmol) in acetone/H$_2$O (3/1, v/v, 20 mL) were added 1,2-diaminopropane (177 µL, 2.08 mmol, in 2.2 mL acetone) and 2 M sodium hydroxide (2.2 mL, 4.4 mmol) simultaneously dropwise. After stirring for 5 hours, the reaction mixture was diluted with DCM (70 mL) and washed successively with 0.1M HCl (70 mL), water (70 mL) and brine (50 mL). The organic phase was dried (MgSO$_4$), filtered and the filtrate was concentrated under reduced pressure. The resulting solid was purified by flash chromatography over silica gel (EtOAc/hexanes, 10/1→6/1, v/v) to give 6 (753 mg, 75%) as an amorphous white solid.

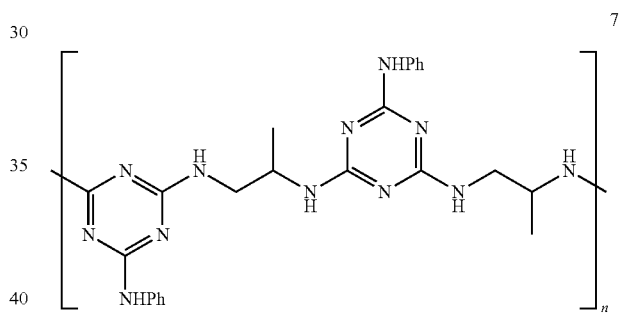

Triazine Polymer 7.

To a stirred and refluxing solution of 6 (120 mg, 0.248 mmol) in CH$_3$CN (5 mL) were added a mixture of 1,2-diaminopropane (21 µL, 0.248 mmol) and Et$_3$N (69 µL, 0.49 mmol) in CH$_3$CN (0.5 mL) dropwise. The reaction mixture was refluxed 16 hours. The resulting pale yellow solid 7 (71 mg, 65%) was collected by centrifugation washed with water and THF.

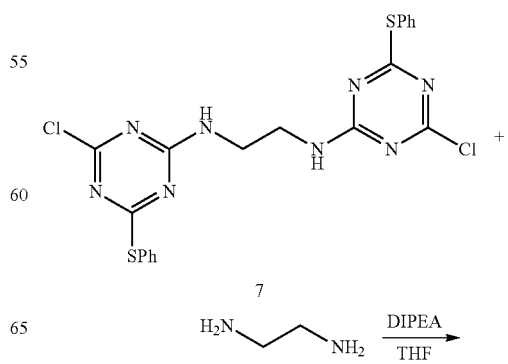

-continued

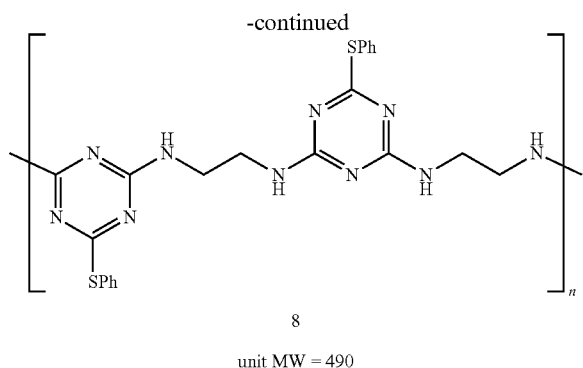

8 unit MW = 490

In this embodiment, refluxing (66° C.) THF was used for the polymerization step. The polymer precipitated out of the reaction as a yellow solid and was washed with water. In this particular embodiment, the molecular weight of polymer 8 likely indicates that polymer may be a mix of tetramer to tetradecamers.

Simulations

Detailed simulation tools and methods are described below, starting with parameterizing structural features and generating force fields and generating partial charges; and ending with describing how favored conformations were identified from the simulation.

Simulation Compound 1

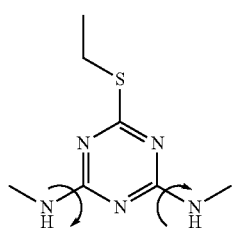

Simulation Compound 1, illustrated above is a model compound used for GAFF parameterization of TZPs. Ethylene diamine linker nitrogens are represented by the N-methyl side groups. The N-methyl groups are conjugated with the triazine ring, leading to restricted rotation of the ring/linker N bond.

Simulations of polymers with model triazine residues TSE (R=S-ethyl), TSP (R=S-pentyl) with ethylene diamine ($EN_2$) linkers between residues were performed. As triazine polymer topologies and parameters are not present in standard MD forcefields, they were generated using the generalized amber forcefield (GAFF) and the programs ACPYPE and Antechamber. The AM1-BCC model was used to generate partial charges. For parameterizing the triazine core, linker nitrogens and S-aliphatic sidechains, Simulation Compound 1, 2,6-di-N-methyl,4-S-ethyl-triazine (TSE-$NM_2$), was used. ACPYPE was also used to generate GROMACS-compatible topologies.

Replica-exchange implicit solvent simulations using GROMACS 4.6.4 were performed. First, polymers were constructed in extended starting conformations using an in-house python script. The AMBER03 forcefield was used with GAFF atom types and parameters added for triazines as necessary. The GBSA implicit solvent model with the Onufriev/Bashford/Case algorithm was used for calculating Born radii and a dielectric of 78.3, and infinite Van der Waals and Coulomb cutoffs. Non-periodic NVT simulations with velocity-rescale temperature coupling and a 0.2 ps coupling time were used.

Due to the high free energy barrier for rotating the bond between the linker nitrogen and the triazine ring, replica-exchange MD (REMD) was used to accelerate sampling. Prior to the replica exchange production run, the polymer was equilibrated for 200 ps at each temperature. For the production run, 16 replicas spanning 300 to 800K were used, with exchanges occurring every 1000 steps (2 ps). This resulted in a Metropolis acceptance rate of about 50% for the hexameric simulations. The simulations were performed for 500 ns at each temperature, saving conformations every 100 ps. The last 400 ns of the simulation at 300 K were used for analysis, resulting in an ensemble of 4000 conformers that were clustered. In some embodiments, 200 ps equilibration, simulations were run for 500 ns at each temperature with replica exchange every 2 ps during that 500 ns period of simulation. Data from the last 400 ns of the simulation at 300K were used to define a population of conformers, consisting of 4000 conformers, obtained once every 100 ps during the 400 ns period. This population of structures is called an ensemble.

For the explicit solvent simulations, the starting structure was solvated in a 1.5-nm thick layer of SPC water in a dodecahedral box and then 0.115 M KCl was added. 1.0-nm cutoffs for van der Waals and Coulombic interactions were used and the particle-mesh Ewald method was used for long-range electrostatic interactions. The simulations were performed in the NPT ensemble with a Parrinello-Rahman barostat with a 1 ps coupling time at 1 bar. A Nose-Hoover thermostat with 0.2 ps coupling time was applied separately to the polymer and to the solution (including ions). The simulations were performed for 100 ns with a timestep of 2 fs.

To identify favored conformations from the simulation, k-means clustering of the 4000 ensemble structures in R was performed, using the root mean square distance of the triazine rings as a distance metric. The parameter k, the number of clusters, is optimized by clustering using a range of k and identifying the "knee" in a plot of F(k) vs. k, where F(k) is a "goodness of clustering" metric such as within-group sum of squares. @@ A knee is a point at which the slope of F(k) vs. k greatly decreases.

For the goodness of clustering metric, the "order ratio," that is, the fraction of the ensemble that is in a "compact" cluster with an "internal RMSD" of 0.15 nm or less was used. Internal RMSD was defined as the root mean square distance of all the pairs of structures in the cluster. Such compact clusters are most likely to represent stable conformations rather than unfolded or transient structures. The order ratio also gives an estimate of a given sequence's propensity to form stable, folded structures.

In view of the many possible embodiments to which the principles of the disclosed technology may be applied, it should be recognized that the illustrated embodiments are only preferred examples of the present disclosure and should not be taken as limiting the scope of the disclosure. Rather, the scope of the present disclosure is defined by the following claims. We therefore claim all that comes within the scope and spirit of these claims.

We claim:
1. A polymer having a formula:

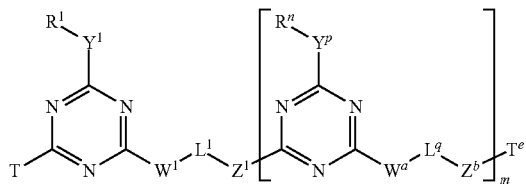

wherein
- each of T and $T^e$ is a terminal group selected from heteroaliphatic, aliphatic, aryl, heteroaryl, aliphatic-aryl, aliphatic-heteroaryl, heteroaliphatic-aryl, or heteroaliphatic-heteroaryl;
- $R^1$ and each $R^n$ independently is selected from heteroaliphatic, aliphatic, aryl, heteroaryl, aliphatic-aryl, aliphatic-heteroaryl, heteroaliphatic-aryl, or heteroaliphatic-heteroaryl;
- $Y^1$ and each $Y^p$ independently is selected from a bond, $-C(R^4)_2$, oxygen, sulfur, or $NR^4$, wherein each $R^4$ independently is selected from hydrogen, aliphatic, heteroaliphatic, aryl, or heteroaryl;
- $W^1$ and each $W^a$ independently is selected from $-C(R^4)_2$, oxygen, sulfur, or $NR^4$, wherein each $R^4$ independently is selected from hydrogen, aliphatic, heteroaliphatic, aryl, or heteroaryl;
- $Z^1$ and each $Z^b$ independently is selected from heteroaryl, oxygen, sulfur, or $NR^4$, wherein $R^4$ is selected from hydrogen, aliphatic, cyclic heteroaliphatic comprising one or more heteroatoms selected from oxygen, sulfur, selenium, phosphorous, or oxidized forms thereof, acyclic heteroaliphatic, heteroaryl, or aryl;
- $L^1$ and each $L^q$ independently is selected from aliphatic, heteroaliphatic, aryl, or heteroaryl;
- m ranges from 2 to 1000; and
- wherein at least one of $R^1$, $Y^1$, $W^1$, $Z^1$, or $L^1$ is different from at least one $R^n$, $Y^p$, $W^a$, $Z^b$, or $L^q$, respectively.

2. The polymer of claim 1, wherein two or more $R^n$ groups are different.

3. The polymer of claim 1, wherein two or more $W^a$ groups, $L^q$ groups, or $Z^b$ groups are different.

4. The polymer of claim 1, wherein T and $T^e$ independently are selected from an amine, an alkylene oxide, an alkylene amino, or an alkylene thio.

5. The polymer of claim 1, wherein T and $T^e$ independently are or comprise a solid support.

6. The polymer of claim 1, wherein $R^1$ and each of $R^n$ independently is selected from $C_{1-25}$alkyl, $C_{1-25}$heteroalkyl, or $C_{6-15}$aryl.

7. The polymer of claim 1, wherein $R^1$ and each of $R^n$ independently is selected from methyl, ethyl, propyl, butyl, pentyl, hexyl, septyl, octyl, nonyl, decyl, phenyl, propyne, $-(CH_2)-C_6H_4-Cl$, $-(CH_2)_2NH_2$, $-(CH_2)_2NHBOC$, $-(CH_2)_2COOH$, or $-(CH_2)_2COO^tBu$.

8. The polymer of claim 1, wherein each of $W^1$, $W^a$, $Z^1$, and $Z^b$ independently are selected from NH, S, or O.

9. The polymer of claim 1, wherein each of $L^1$ and $L^q$ independently are selected from $-(CH_2)_2-$, $-(CH_2)_3-$, $-C(Me)H-CH_2-$, $-CH_2-C(Me)H-$, $-C(Me)H-C(Me)H-$, $-C(Naphthyl)H-C(Naphthyl)H-$, and $-(CH_2)_2-O-(CH_2)_2-$.

10. The polymer of claim 1, wherein the polymer has a formula

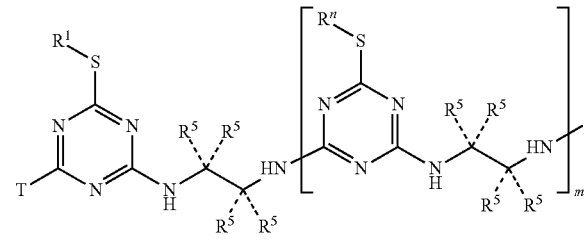

wherein each $R^5$ independently is selected from aliphatic, heteroaliphatic, heteroaryl, or aryl.

11. The polymer of claim 10, wherein the polymer comprises at least one $R^5$ group and $R^5$ is ethyl or naphthyl.

12. The polymer of claim 1, wherein the polymer is a heteropolymer having a formula selected from

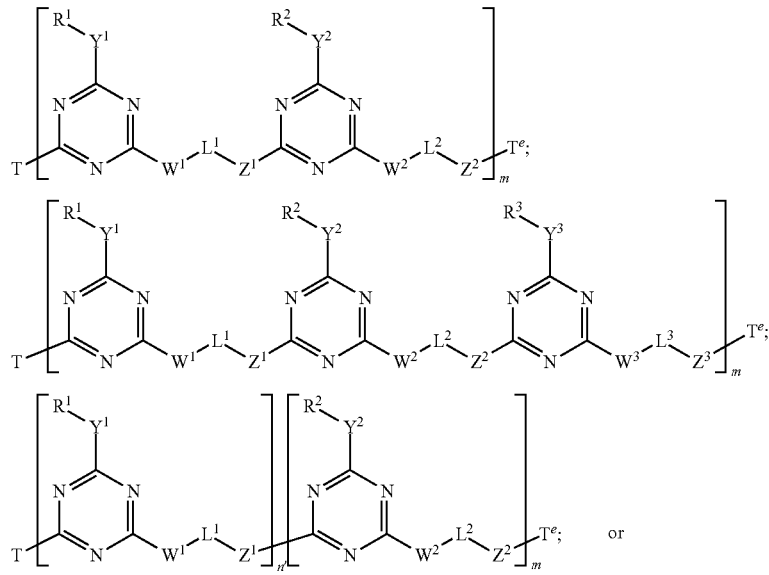

-continued

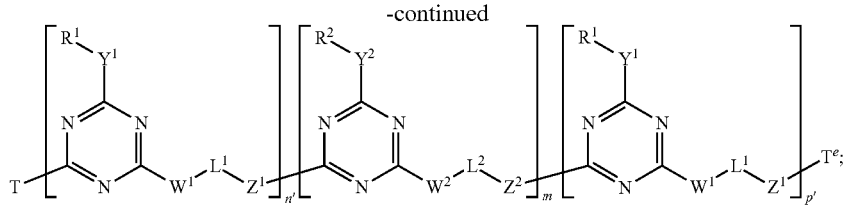

wherein
- each $R^2$ and $R^3$ independently is selected from heteroaliphatic, aliphatic, aryl, heteroaryl, aliphatic-aryl, aliphatic-heteroaryl, heteroaliphatic-aryl, or heteroaliphatic-heteroaryl;
- each $Y^2$ and $Y^3$ independently is selected from $—C(R^4)_2$, oxygen, sulfur, or $NR^4$, wherein each $R^4$ independently is selected from hydrogen, aliphatic, heteroaliphatic, aryl, or heteroaryl;
- each $W^2$ and $W^3$ independently is selected from $—C(R^4)_2$, oxygen, sulfur, or $NR^4$, wherein each $R^4$ independently is selected from hydrogen, aliphatic, heteroaliphatic, aryl, or heteroaryl;
- each $Z^2$ and $Z^3$ independently is selected from heteroaryl, oxygen, sulfur, or $NR^4$, wherein $R^4$ is selected from hydrogen, aliphatic, cyclic heteroaliphatic comprising one or more heteroatoms selected from oxygen, sulfur, selenium, phosphorous, or oxidized forms thereof, acyclic heteroaliphatic, heteroaryl, or aryl;
- each $L^2$ and $L^3$ independently is selected from aliphatic, heteroaliphatic, aryl, or heteroaryl;
- at least one of $R^1$, $Y^1$, $W^1$, $Z^1$, or $L^1$ is different from at least one of $R^2$ or $R^3$, at least one of $Y^2$ or $Y^3$, at least one of $W^2$ or $W^3$, at least one of $Z^2$ or $Z^3$, or at least one of $L^2$ or $L^3$, respectively; and
- n' and p' independently are 1 to 1000.

13. A homopolymer having a formula

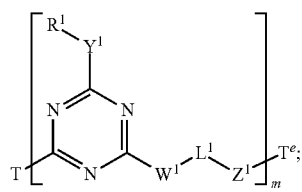

wherein each of T and $T^e$ is a terminal group selected from heteroaliphatic, aliphatic, aryl, heteroaryl, aliphatic-aryl, aliphatic-heteroaryl, heteroaliphatic-aryl, or heteroaliphatic-heteroaryl;
- each $R^1$ is the same and is selected from cyclic heteroaliphatic; acyclic heteroaliphatic selected from $C_{5-25}$alkoxy, $C_{4-25}$hydroxyl, $C_{2-25}$thioether, $C_{1-25}$thiol, $C_{1-25}$amine, or $C_{1-25}$haloalkyl; aryl; heteroaryl; aliphatic-aryl; aliphatic-heteroaryl; heteroaliphatic-aryl; or heteroaliphatic-heteroaryl;
- each $Y^1$ is the same and is selected from $—C(R^4)_2$, oxygen, sulfur, or $NR^4$, wherein each $R^4$ independently is selected from hydrogen, aliphatic, heteroaliphatic, aryl, or heteroaryl;
- each $W^1$ is the same and is selected from $—C(R^4)_2$, oxygen, sulfur, or $NR^4$, wherein each $R^4$ independently is selected from hydrogen, aliphatic, heteroaliphatic, aryl, or heteroaryl;
- each $Z^1$ is the same and is selected from heteroaryl, oxygen, sulfur, or $NR^4$, wherein $R^4$ is selected from hydrogen, aliphatic, cyclic heteroaliphatic comprising one or more heteroatoms selected from oxygen, sulfur, selenium, phosphorous, or oxidized forms thereof, acyclic heteroaliphatic, heteroaryl, or aryl;
- each $L^1$ is the same and is selected from aliphatic, heteroaliphatic, aryl, or heteroaryl; and
- m ranges from 2 to 1000.

14. The polymer of claim 1, wherein:
- any one or more of $R^1$ or $R''$ is not butyl if any one or more of $Y^1$ or $Y^p$ is $NR^4$ where $R^4$ is butyl and any one or more of $L^1$ or $L^q$ is phenyl or -Ph-O-Ph-;
- any one or more of $L^1$ or $L^q$ does not form a piperazine ring with $W^1$, $W^a$, $Z^1$ or $Z^b$;
- any one or more of $R^1$ or $R''$ is not $—(CH_2)_2[O(CH_2)]_3NH_2$ if $Y^1$ or $Y^p$ is $NR^4$ where $R^4$ is hydrogen;
- any one or more of $L^1$ or $L^q$ is not $—C(O)—$ if $Y^1$ or $Y^p$ is a bond and $R^1$ or $R''$ is phenyl; or
- the polymer is not a dendrimer.

15. The polymer of claim 1, having a structure selected from

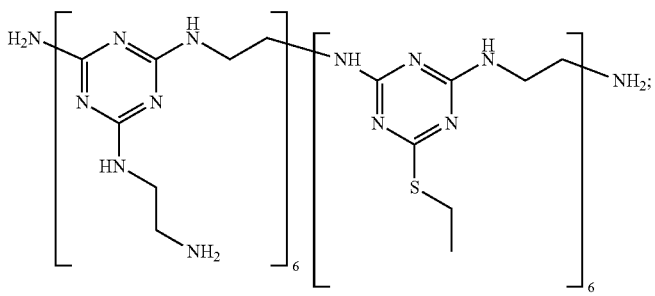

117
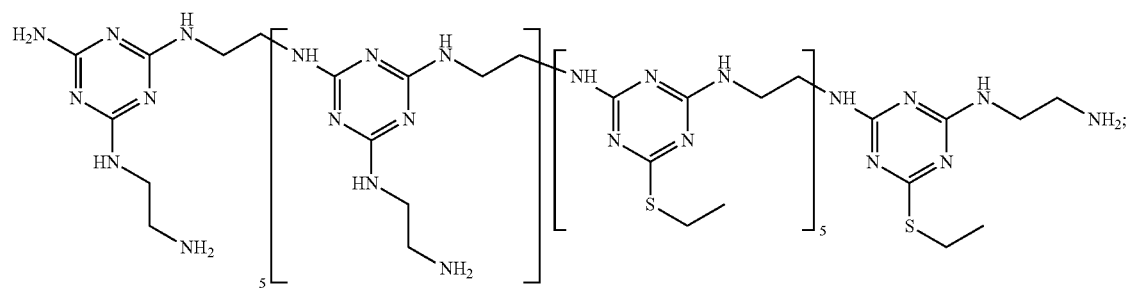
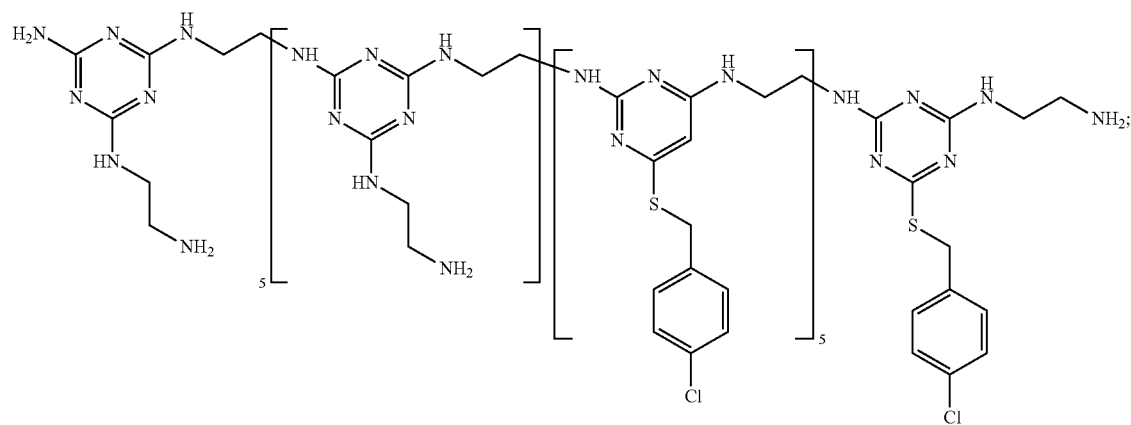
118
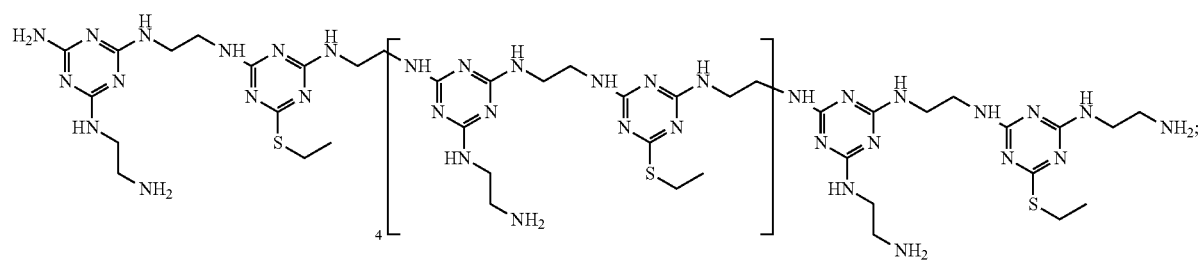
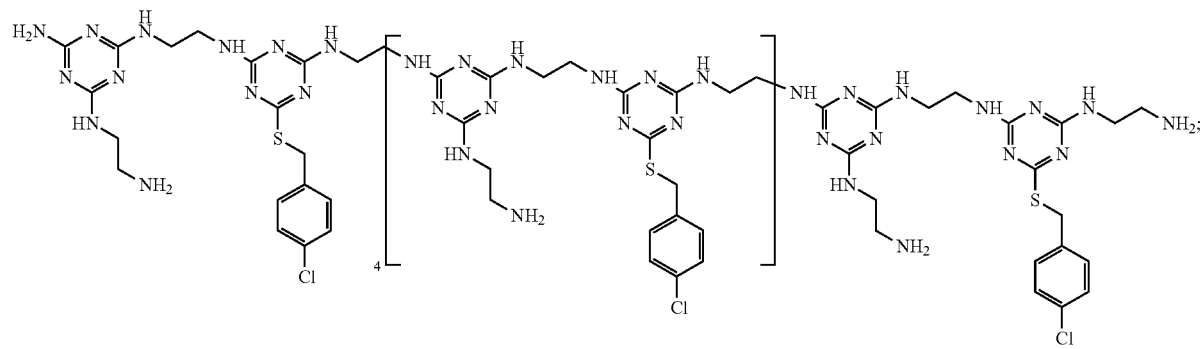

-continued

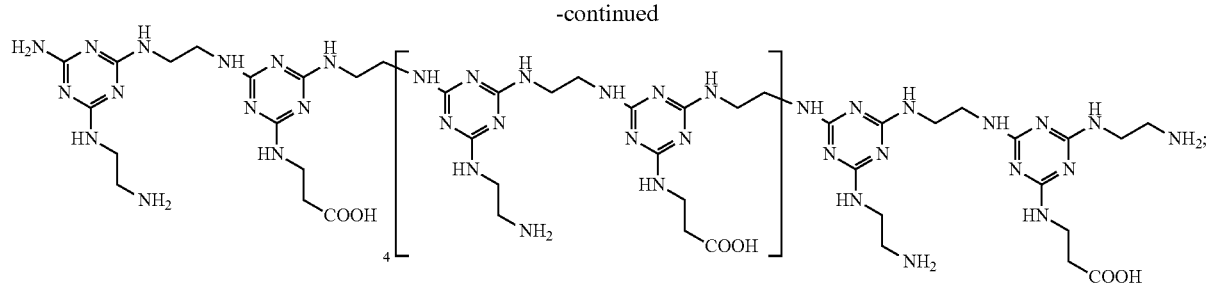

or

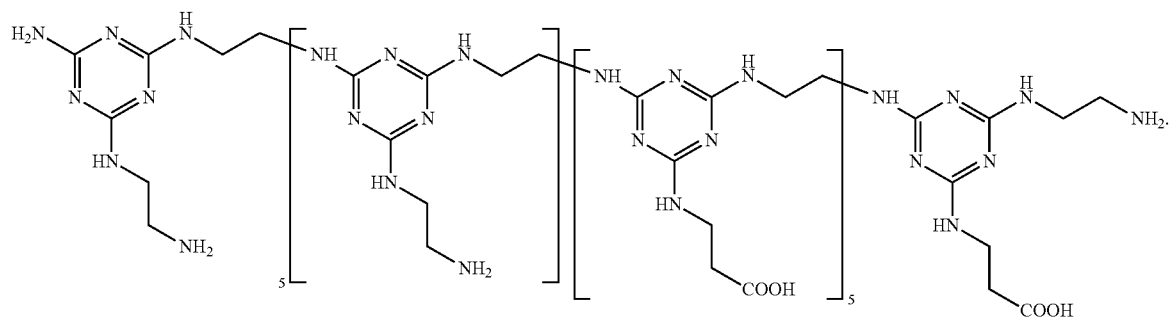

16. The polymer of claim 1, wherein the polymer forms a membrane, amorphous particles, or crystals.

17. A method of making a linear heteropolymer, comprising:
    coupling, at a first temperature, a first position of a first starting material with a terminal group;
    coupling, at a second temperature, a second position of the first starting material with a linker group or a side chain group;
    coupling, at a third temperature, a third position of the first starting material with a linker group or a side chain group to form a first monomer unit of the polymer;
    coupling, at the first temperature, the first monomer unit of the polymer with a first position of a second starting material;
    coupling, at the second temperature, a second position of the second starting material with a linker group or a side chain group;
    coupling, at the third temperature, a third position of the second starting material with a linker group or a side chain group to form a second monomer unit of the polymer;
    coupling, at the first temperature, the second monomer unit of the polymer with a first position of a third starting material;
    coupling, at the second temperature, a second position of the third starting material with a linker group or a side chain group; and
    coupling, at the third temperature, a third position of the third starting material with a linker group or a side chain group to form a third monomer unit of the polymer;
    wherein the polymer has a formula

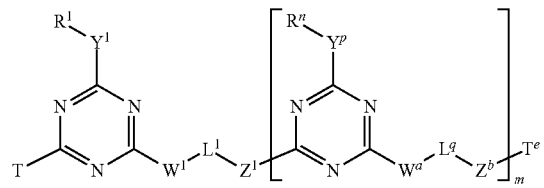

wherein
    each of T and $T^e$ is a terminal group selected from heteroaliphatic, aliphatic, aryl, heteroaryl, aliphatic-aryl, aliphatic-heteroaryl, heteroaliphatic-aryl, or heteroaliphatic-heteroaryl;
    $R^1$ and each $R^n$ independently is selected from heteroaliphatic, aliphatic, aryl, heteroaryl, aliphatic-aryl, aliphatic-heteroaryl, heteroaliphatic-aryl, or heteroaliphatic-heteroaryl;
    $Y^1$ and each $Y^p$ independently is selected from a bond, —$C(R^4)_2$, oxygen, sulfur, or $NR^4$, wherein each $R^4$ independently is selected from hydrogen, aliphatic, heteroaliphatic, aryl, or heteroaryl;
    $W^1$ and each $W^a$ independently is selected from —$C(R^4)_2$, oxygen, sulfur, or $NR^4$, wherein each $R^4$ independently is selected from hydrogen, aliphatic, heteroaliphatic, aryl, or heteroaryl;
    $Z^1$ and each $Z^b$ independently is selected from heteroaryl, oxygen, sulfur, or $NR^4$, wherein $R^4$ is selected from hydrogen, aliphatic, cyclic heteroaliphatic comprising one or more heteroatoms selected from oxygen, sulfur, selenium, phosphorous, or oxidized forms thereof, acyclic heteroaliphatic, heteroaryl, or aryl;
    $L^1$ and each $L^q$ independently is selected from aliphatic, heteroaliphatic, aryl, or heteroaryl;
    m ranges from 2 to 1000; and wherein at least one of $R^1$, $Y^1$, $W^1$, $Z^1$, or $L^1$ is different from at least one $R^n$, $Y^p$, $W^a$, $Z^b$, or $L^q$, respectively.

18. The method of claim 17, wherein the first temperature ranges from −25° C. to 5° C., the second temperature ranges from 18° C. to 40° C., and the third temperature ranges from 70° C. to 140° C.

19. The method of claim 17, wherein the linker group comprises a protecting group and the method further comprises exposing the linker group to an acid or a base to remove the protecting group.

20. The method of claim 17, wherein the terminal group comprises a solid support and the method further comprises exposing the polymer to an acid to remove the solid support.

21. A method of making a linear heteropolymer, comprising:
coupling a first position of a first molecular precursor comprising a first side chain, a first linker group, or both with a terminal group;
coupling a second position of the first molecular precursor with a second molecular precursor comprising a second side chain, a second linker group, or both thereby forming a covalent bond between the first molecular precursor and the second molecular precursor; and
coupling the second molecular precursor with a third molecular precursor comprising a third side chain, a third linker group, or both thereby forming a covalent bond between the second molecular precursor and the third molecular precursor;
wherein the first side chain is different from one or both of the second side chain or the third side chain, and wherein the heteropolymer has a formula

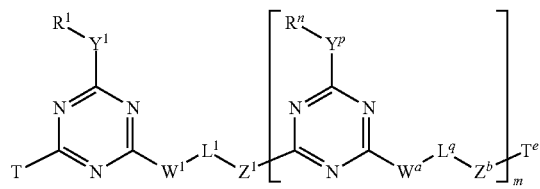

wherein
each of T and $T^e$ is a terminal group selected from heteroaliphatic, aliphatic, aryl, heteroaryl, aliphatic-aryl, aliphatic-heteroaryl, heteroaliphatic-aryl, or heteroaliphatic-heteroaryl;

$R^1$ and each $R^n$ independently is selected from heteroaliphatic, aliphatic, aryl, heteroaryl, aliphatic-aryl, aliphatic-heteroaryl, heteroaliphatic-aryl, or heteroaliphatic-heteroaryl;

$Y^1$ and each $Y^p$ independently is selected from a bond, $-C(R^4)_2$, oxygen, sulfur, or $NR^4$, wherein each $R^4$ independently is selected from hydrogen, aliphatic, heteroaliphatic, aryl, or heteroaryl;

$W^1$ and each $W^a$ independently is selected from $-C(R^4)_2$, oxygen, sulfur, or $NR^4$, wherein each $R^4$ independently is selected from hydrogen, aliphatic, heteroaliphatic, aryl, or heteroaryl;

$Z^1$ and each $Z^b$ independently is selected from heteroaryl, oxygen, sulfur, or $NR^4$, wherein $R^4$ is selected from hydrogen, aliphatic, cyclic heteroaliphatic comprising one or more heteroatoms selected from oxygen, sulfur, selenium, phosphorous, or oxidized forms thereof, acyclic heteroaliphatic, heteroaryl, or aryl;

$L^1$ and each $L^q$ independently is selected from aliphatic, heteroaliphatic, aryl, or heteroaryl;

wherein at least one of $R^1$, $Y^1$, $W^1$, $Z^1$, or $L^1$ is different from at least one $R^n$, $Y^p$, $W^a$, $Z^b$, or $L^q$, respectively; and m ranges from 2 to 1000.

22. The method of claim 21, wherein each of the first linker group, the second linker group, and the third linker group comprises a protecting group and the method further comprises exposing the protecting group to an acid or a base to facilitate coupling the first molecular precursor, the second molecular precursor, and the third molecular precursor.

23. The method of claim 21, wherein the terminal group comprises a solid support, and the method further comprises exposing the solid support to an acid to cleave the solid support from the terminal group.

24. The polymer of claim 13, wherein the polymer is selected from

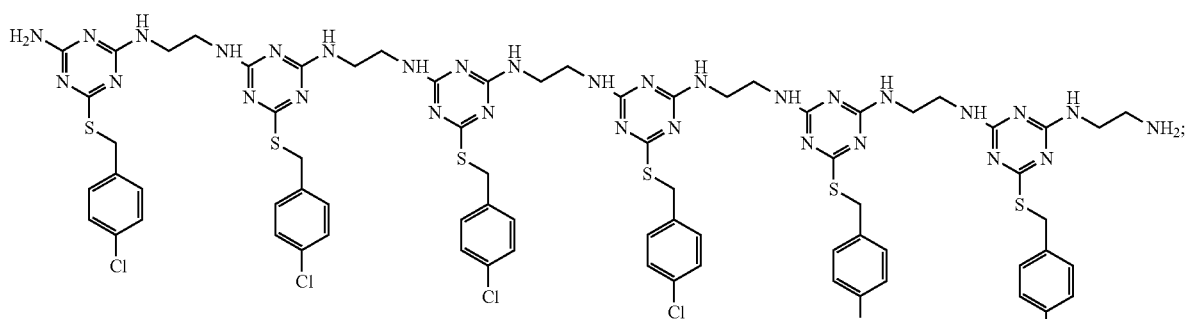

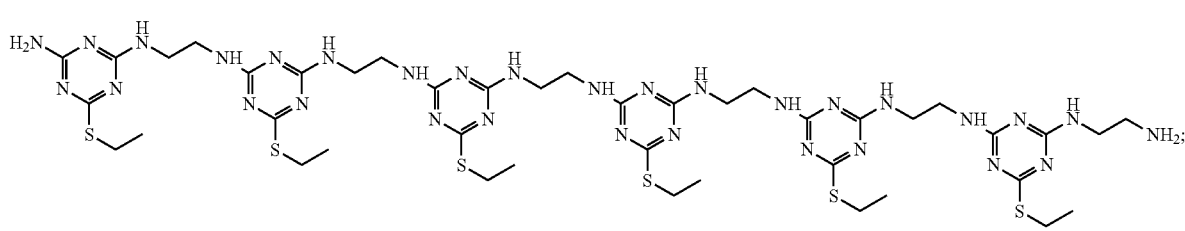

-continued
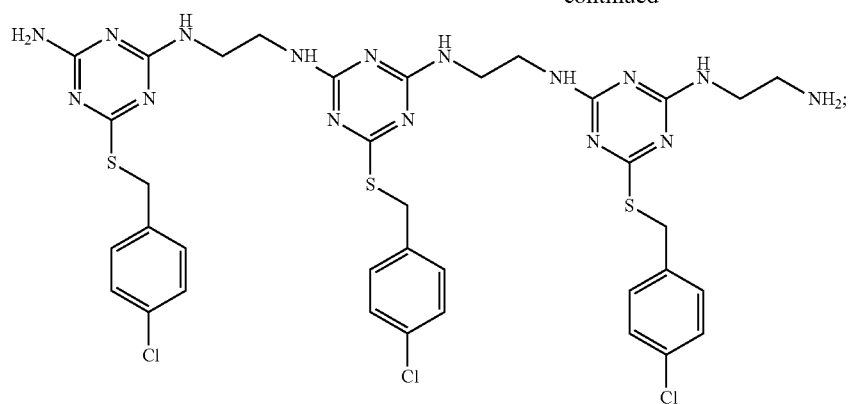
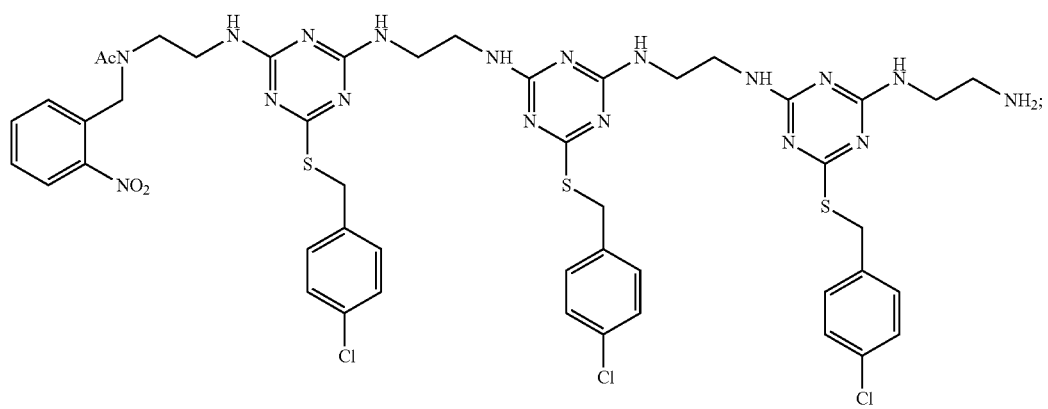
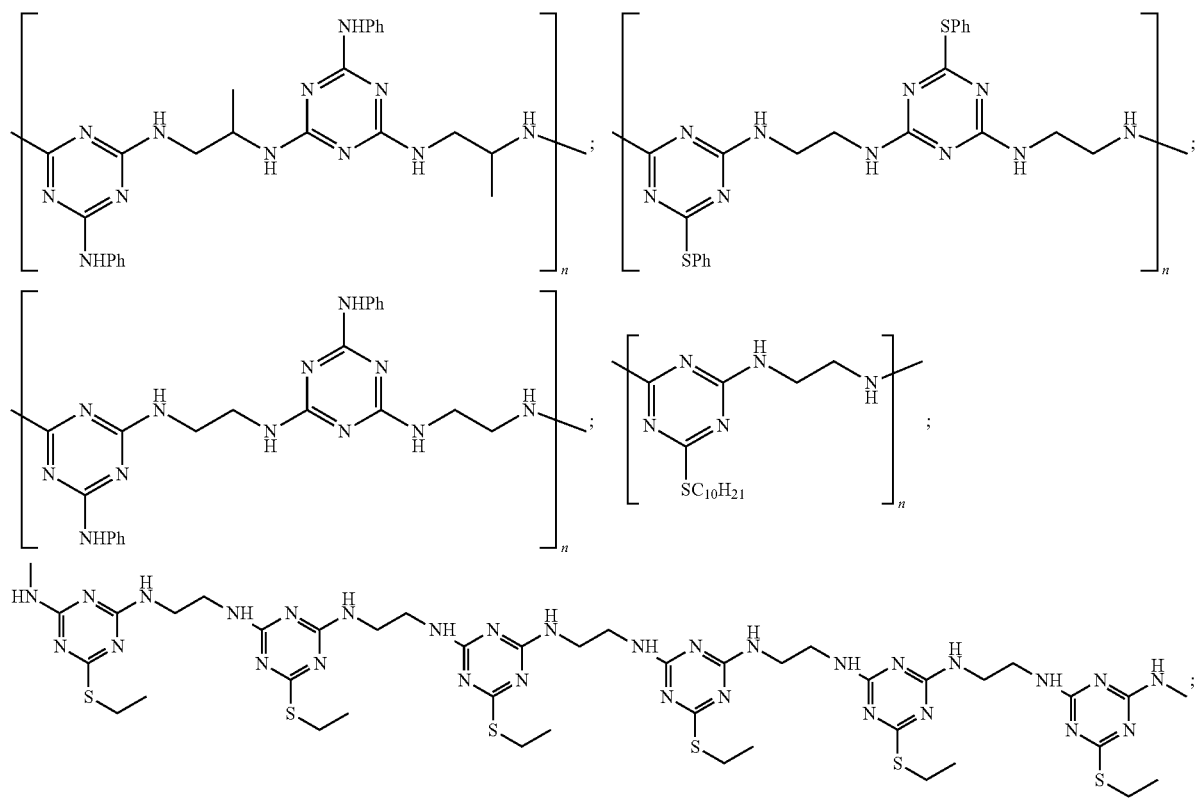

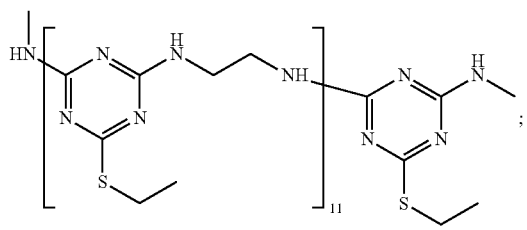
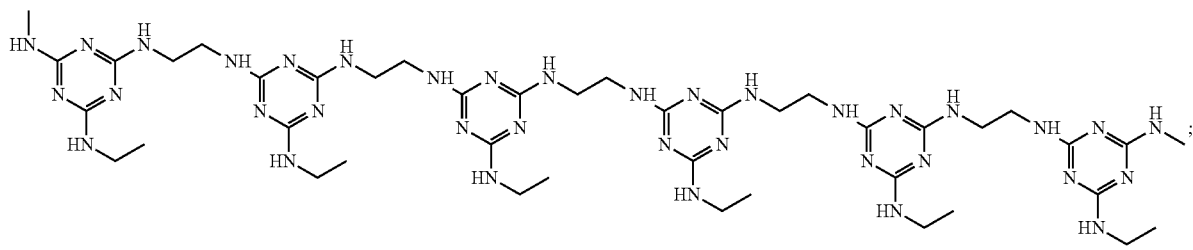
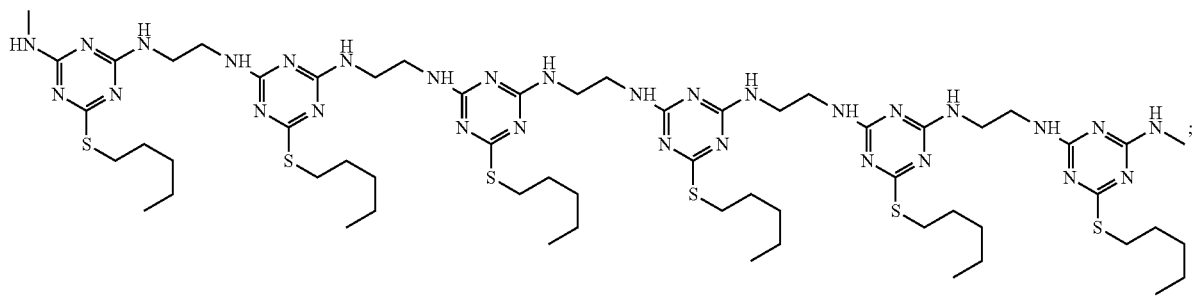
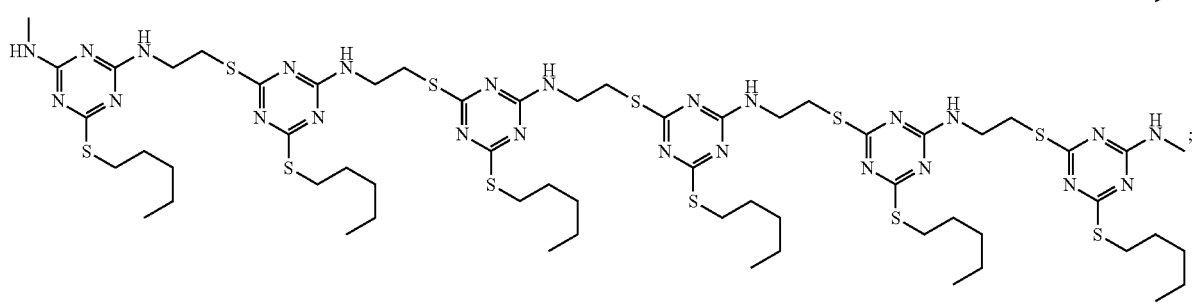
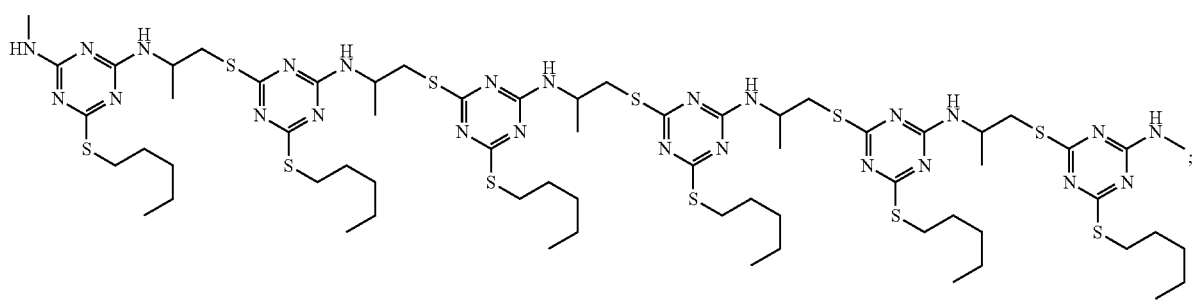
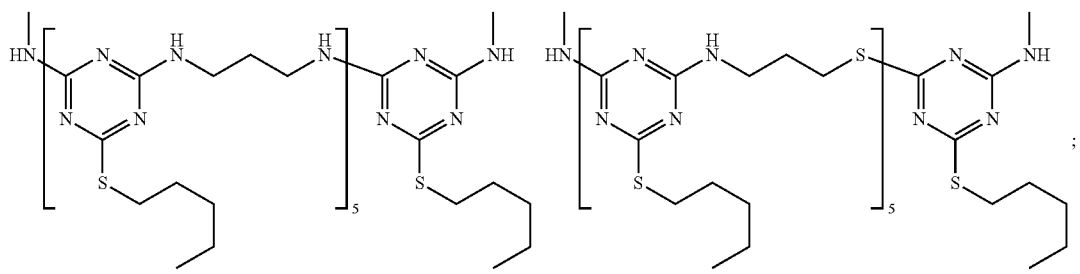

-continued
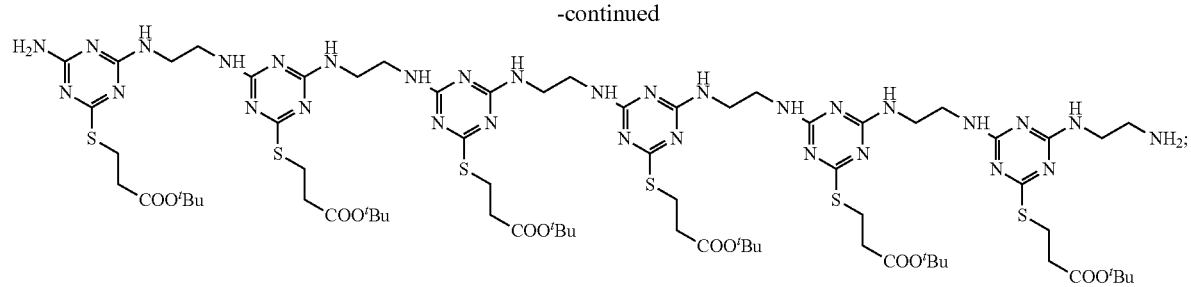
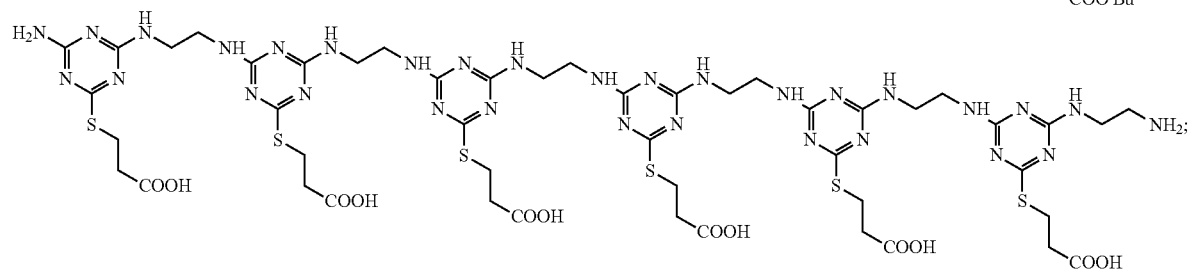
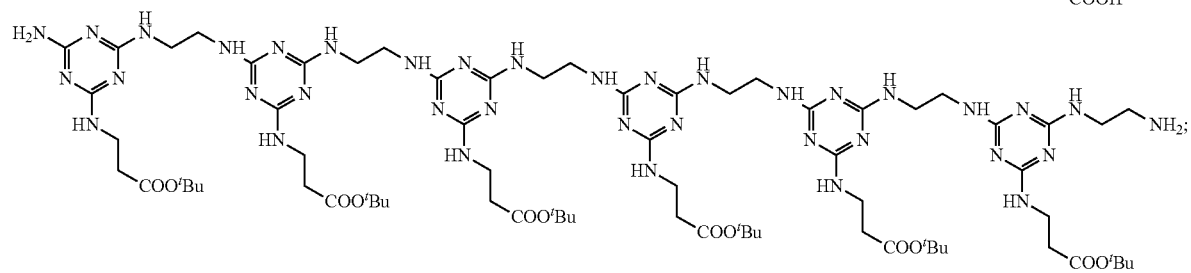
or
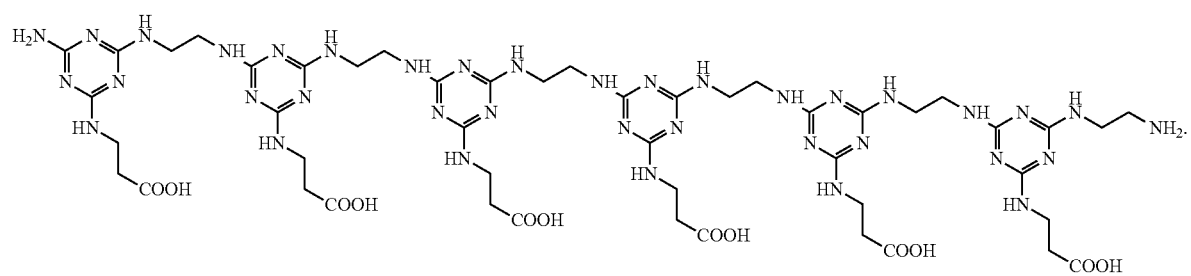
* * * * *